(12) United States Patent
Feng et al.

(10) Patent No.: US 12,525,646 B2
(45) Date of Patent: Jan. 13, 2026

(54) IONIC CYCLIC NITROXYL RADICAL OLIGOMERS

(71) Applicant: Wisconsin Alumni Research Foundation, Madison, WI (US)

(72) Inventors: Dawei Feng, Madison, WI (US); Patrick Sullivan, Madison, WI (US); Wenjie Li, Ithaca, NY (US); Xiuliang Lyu, Madison, WI (US)

(73) Assignee: Wisconsin Alumini Research Foundation, Madison, WI (US)

( * ) Notice: Subject to any disclaimer, the term of this patent is extended or adjusted under 35 U.S.C. 154(b) by 767 days.

(21) Appl. No.: 17/826,600

(22) Filed: May 27, 2022

(65) Prior Publication Data

US 2023/0006250 A1  Jan. 5, 2023

Related U.S. Application Data

(60) Provisional application No. 63/194,378, filed on May 28, 2021.

(51) Int. Cl.
 *H01M 10/0565* (2010.01)
 *C08G 73/06* (2006.01)

(52) U.S. Cl.
 CPC .... *H01M 10/0565* (2013.01); *C08G 73/0633* (2013.01); *H01M 2300/0082* (2013.01)

(58) Field of Classification Search
 CPC ..... H01M 10/0565; H01M 2300/0082; H01M 8/18–188; Y02E 60/50; C07D 413/14; C07D 417/12; C07D 487/08; C07D 211/94; C07D 401/14
 See application file for complete search history.

(56) References Cited

U.S. PATENT DOCUMENTS

| | | |
|---|---|---|
| 2018/0072669 A1 | 3/2018 | Liu et al. |
| 2022/0020990 A1 | 1/2022 | Schubert et al. |
| 2022/0384834 A1 | 12/2022 | Schubert |

FOREIGN PATENT DOCUMENTS

| | | | | |
|---|---|---|---|---|
| CN | 102134233 A | * | 7/2011 | |
| CN | 110668996 A | * | 1/2020 | ............ H01M 8/188 |
| CN | 112103546 A | | 12/2020 | |

(Continued)

OTHER PUBLICATIONS

Kim, Jae-Kwang et. Al; 2012; RSC Advances vol. 2, Issue: 27; The Royal Society of Chemistry; http://dx.doi.org/10.1039/C2RA20795H (Year: 2012).*

(Continued)

*Primary Examiner* — Marla D Mcconnell
*Assistant Examiner* — Olivia A Jones
(74) *Attorney, Agent, or Firm* — Bell & Manning, LLC

(57) ABSTRACT

Ionic cyclic nitroxyl radical oligomers, methods of making the ionic cyclic nitroxyl radical oligomers, and electrochemical cells, such as aqueous organic redox flow batteries (AORFBs) that use the ionic nitroxyl radical oligomers as catholytes are provided. The oligomers are larger than individual cyclic nitroxyl radical molecules, but maintain a high density nitroxyl radical groups within the molecule. As a result, when the oligomers are used as catholytes in an AORFB, they are able to reduce catholyte permeation through the ion-conducting membrane, while providing a high volumetric capacity and cycling stability.

25 Claims, 56 Drawing Sheets

(56) References Cited

FOREIGN PATENT DOCUMENTS

| | | | | |
|---|---|---|---|---|
| CN | 114195704 A | 3/2022 | | |
| DE | 102018003493 A1 | * 10/2019 | ............ | H01M 8/188 |
| WO | WO 2017/025177 A1 | 2/2017 | | |
| WO | WO 2020/108788 A2 | 6/2020 | | |

OTHER PUBLICATIONS

Seo Hwan Lee et. al; Electrochemical properties of new organic radical materials for lithium secondary batteries, Journal of Power Sources, vol. 184, Issue 2, pp. 503-507, ISSN 0378-7753, https://doi.org/10.1016/j.jpowsour.2008.04.003. (Year: 2008).*

Translation Relied Upon for CN-110668996-A. (Year: 2020).*

Translation Relied Upon for CN-102134233-A. (Year: 2011).*

Rauckman, E. J., Rosen, G. M., & Hord, W. W. (1977). Use of Sodium Cyanoborohydride in the Synthesis of Biradical Nitroxides. Organic Preparations and Procedures International, 9(2), 53-56. https://doi.org/10.1080/00304947709355664 (Year: 1977).*

Millar, B. C., Jenkins, T. C., Fielden, E. M., & Jinks, S. (1983). Polyfunctional Radiosensitizers: VI. Dexamethasone Inhibits Shoulder Modification by Uncharged Nitroxyl Biradicals in Mammalian Cells Irradiated in Vitro. Radiation Research, 96(1), 160-172. https://doi.org/10.2307/3576175 (Year: 1983).*

Beh, E. S.; De Porcellinis, D.; Gracia, R. L.; Xia, K. T.; Gordon, R. G.; Aziz, M. J. A Neutral PH Aqueous Organic-Organometallic Redox Flow Battery with Extremely High Capacity Retention. ACS Energy Lett. 2017, 2 (3), 639-644. https://doi.org/10.1021/acsenergylett.7b00019.

Hu, B.; Debruler, C.; Rhodes, Z.; Liu, T. L. Long-Cycling Aqueous Organic Redox Flow Battery (AORFB) toward Sustainable and Safe Energy Storage. J. Am. Chem. Soc. 2017, 139 (3), 1207-1214. https://doi.org/10.1021/jacs.6b10984.

Extended European Search Report in EP Patent Application No. 22812242.0 dated Jul. 19, 2024, 10 pages.

Baran, Miranda J., et al. "Designing redox-active oligomers for crossover-free, nonaqueous redox-flow batteries with high volumetric energy density." Chemistry of Materials 30.11 (2018): 3861-3866.

Feng, Dawei. "Battery technologies for grid scale energy storage: inorganic or organic? flow or non-flow?" University of Wisconsin-Madison Materials Science and Engineering. pp. 31; presentation on Apr. 6, 2022.

Millar, B. C. et al., "Polyfunctional radiosensitizers: V. Sensitization of hypoxic chinese hamster cells, V.79-753B, in vitro by a series of bifunctional nitroxyl compounds", Radiation Research, 1982, vol. 90, No. 2, pp. 271-283.

Rauckman, E. J. et al., "Use of sodium cyanoborohydride in the synthesis of biradical nitroxides", Organic Preparations and Procedures Int., 1977, vol. 9, No. 2, pp. 53-56.

Rey, P. et al., "Clustering of nitroxide spin labels in lipid bilayer membranes", Journal of the American Chemical Society, 1977, vol. 99, No. 5, pp. 1637-1642.

Sinha, B. K. et al., "Synthesis and biological activity of spin-labeled analogs of biotin, hexamethonium, decamethonium, dichlorisoproterenol, and propranolol", Journal of Medicinal Chemistry, 1975, vol. 18, No. 7, pp. 669-673.

* cited by examiner

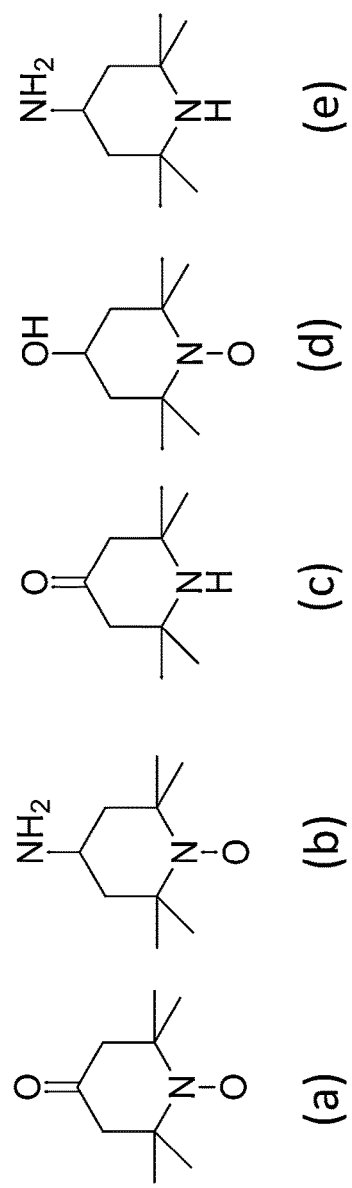
FIG. 7
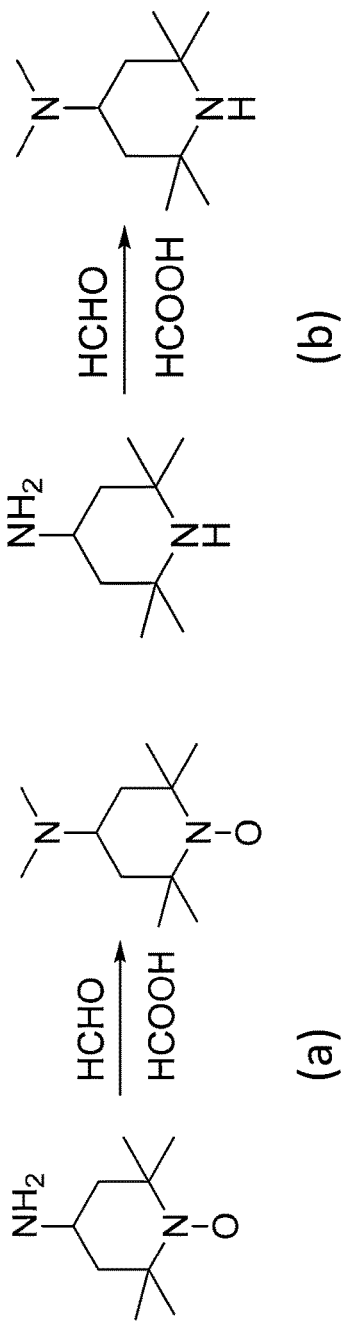
FIG. 8
FIG. 9

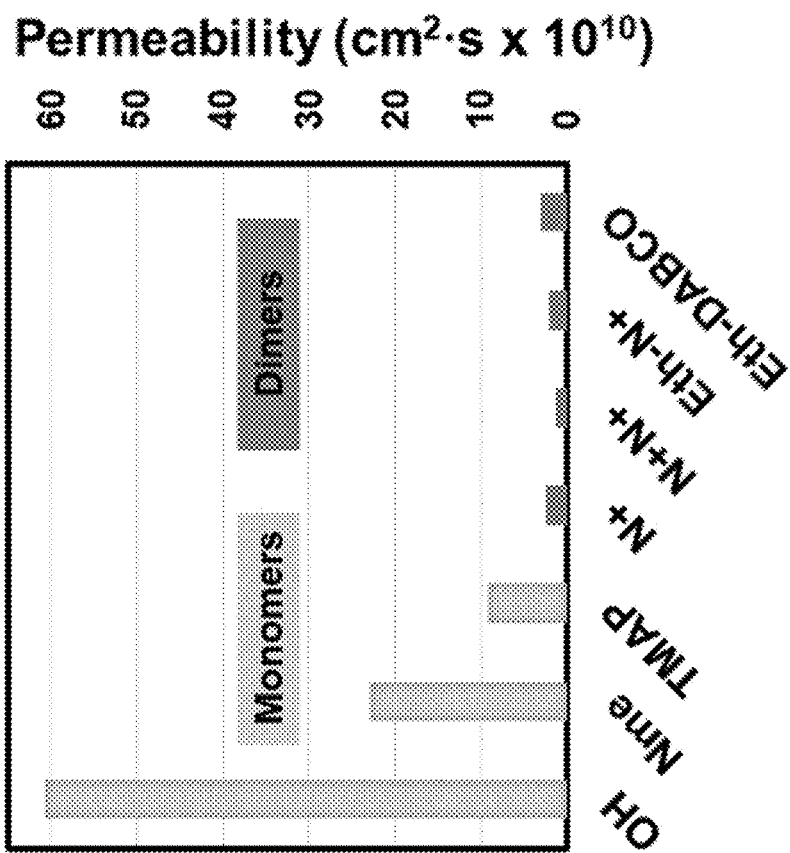
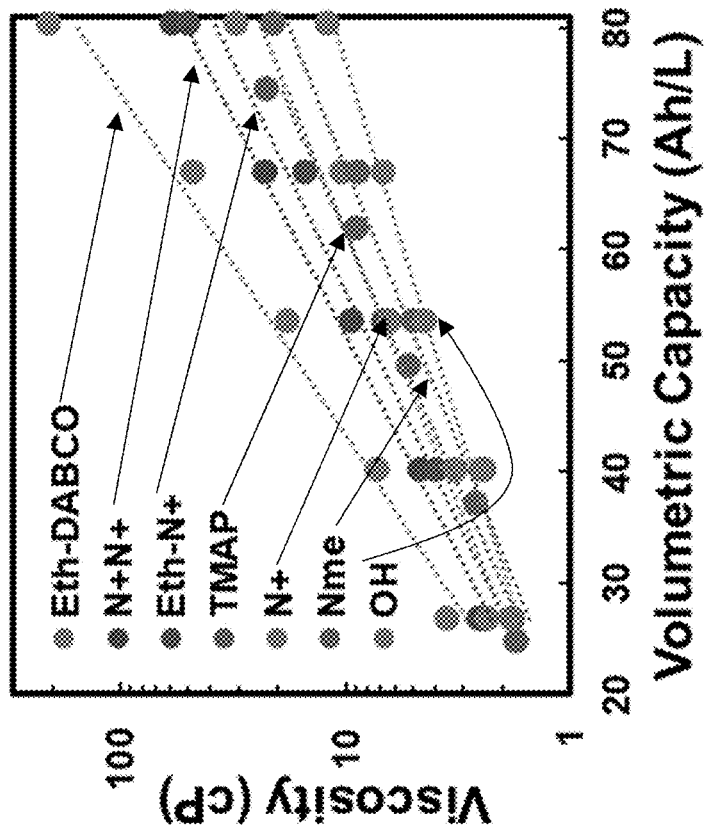
FIG. 35B
FIG. 35A

IONIC CYCLIC NITROXYL RADICAL OLIGOMERS

CROSS-REFERENCE TO RELATED APPLICATIONS

The present application claims priority to U.S. provisional patent application No. 63/194,378 that was filed May 28, 2021, the entire contents of which are incorporated herein by reference.

BACKGROUND

An increasing number of renewable energy sources are being integrated into the electric grid in the US and around the world. In addition to environmental and health concerns regarding emissions of dirty fuels and the reliability issues surrounding importing fossil fuels, the development of low cost solar and wind power generation has been the main driving force. However, as intermittent wind and solar begin to approach more than a quarter of grid energy production, significant energy storage technology must be employed to mitigate the unbalanced energy production and demand on the grid.

One approach to grid energy storage is the use of redox flow batteries (RFBs), which have decoupled energy and power scaling because the capacity can be enlarged by simply expanding the size of the storage tanks. This decoupling of capacity and power allows for simplified design of long-storage-duration devices by increasing the amount of active energy storage materials without concurrently needing to increase the electrode sizes. Despite this practical advantage, RFBs have only been commercially implemented in a handful of experimental grid applications. This is partially due to the high and volatile cost of active materials in most commercial RFBs. Aqueous Organic Redox Flow Batteries (AORFBs) are a promising approach to utilizing the scalability of liquid-state energy storage while reducing the materials cost by utilizing organic redox molecules. However, developing organic redox active species that are simultaneously aqueous soluble, chemically stable, membrane compatible, and cost effective remains difficult.

SUMMARY

Charge-bearing cyclic nitroxyl radical oligomers and methods of making the oligomers are provided. Also provided are electrochemical cells that use the oligomers as an electrolyte.

One embodiment of an ionic cyclic nitroxyl radical oligomer has between two and twelve cyclic nitroxyl radical groups, wherein the cyclic nitroxyl radical groups are connected by a cationic quaternary ammonium group, a cationic nitrogen-containing heteroaromatic group, or an organic linker comprising one or more cationic quaternary ammonium groups, one or more cationic nitrogen-containing heteroaromatic groups, or a combination thereof.

One embodiment of an electrochemical cell includes: an anode; an anolyte in contact with the anode; a cathode; and a catholyte in contact with the cathode. The catholyte includes an ionic cyclic nitroxyl radical oligomer comprising between two and twelve cyclic nitroxyl radical groups, wherein the cyclic nitroxyl radical groups are connected by a cationic quaternary ammonium group, a cationic nitrogen-containing heteroaromatic group, or an organic linker comprising one or more cationic quaternary ammonium groups, one or more cationic nitrogen-containing heteroaromatic groups, or a combination thereof.

One embodiment of a method of making an ionic cyclic nitroxyl radical oligomer, the method includes the step of: reacting: a first cyclic nitroxyl radical derivative having a single cyclic nitroxyl radical group with a ring substituent comprising a secondary or tertiary amine, or having two cyclic nitroxyl radical groups connected by a common substituent comprising a tertiary amine; with: a second cyclic nitroxyl radical derivative having a single cyclic nitroxyl radical group with a ring substituent comprising a leaving group, or having two cyclic nitroxyl radical groups connected by a common substituent comprising a leaving group; wherein the reaction forms an ionic cyclic nitroxyl radical oligomer comprising between two and four cyclic nitroxyl radical groups.

Another embodiment of a method of making an ionic cyclic nitroxyl radical oligomer includes the steps of: (a) reacting a first cyclic nitroxyl radical precursor having a single cyclic amine group with a ring substituent comprising a secondary or tertiary amine, or having two cyclic amine groups connected by a common substituent comprising a tertiary amine group, with a second cyclic nitroxyl radical precursor having a single cyclic amine group with a ring substituent comprising a leaving group, or having two cyclic amine groups connected by a common substituent comprising a leaving group, wherein the reaction forms an ionic cyclic nitroxyl radical oligomer precursor comprising between two and four cyclic amine groups; and (b) oxidizing the cyclic amine groups to nitroxyl groups to form an ionic cyclic nitroxyl radical oligomer comprising between two and four cyclic nitroxyl radical groups.

Another embodiment of a method of making an ionic cyclic nitroxyl radical oligomer includes the step of reacting an organic linker having at least two tertiary amine groups with one or more cyclic nitroxyl radical derivatives, wherein the cyclic nitroxyl radical derivatives have a single cyclic nitroxyl radical group with a ring substituent comprising a leaving group, or have two cyclic nitroxyl radical groups connected by a common substituent comprising a leaving group, wherein the reaction forms an ionic cyclic nitroxyl radical oligomer with at least two cyclic nitroxyl radical groups.

Another embodiment of a method of making an ionic cyclic nitroxyl radical oligomer includes the step of reacting an organic linker having at least two leaving groups with one or more cyclic nitroxyl radical derivatives, wherein the cyclic nitroxyl radical derivatives have a single cyclic nitroxyl radical group with a ring substituent comprising a tertiary amine, or have two cyclic nitroxyl radical groups connected by a common substituent comprising a tertiary amine, wherein the reaction forms an ionic cyclic nitroxyl radical oligomer with at least two cyclic nitroxyl radical groups.

Another embodiment of a method of making an ionic cyclic nitroxyl radical oligomer includes the steps of: (a) reacting an organic linker having at least two tertiary amine groups with one or more cyclic nitroxyl radical precursors, wherein the cyclic nitroxyl radical precursors have a single cyclic amine group with a ring substituent comprising a leaving group, or have two cyclic amine groups connected by a common a substituent comprising a leaving group, wherein the reaction forms an ionic cyclic nitroxyl radical oligomer precursor comprising at least two cyclic amine groups and at least one cationic quaternary ammonium group; and (b) oxidizing the cyclic amine groups to nitroxyl groups, to form an ionic cyclic nitroxyl radical oligomer comprising at least two cyclic nitroxyl radical groups.

Another embodiment of a method of making an ionic cyclic nitroxyl radical oligomer includes the steps of: (a) reacting an organic linker having at least two leaving groups with one or more cyclic nitroxyl radical precursors, wherein the cyclic nitroxyl radical precursors have a single cyclic amine group with a ring substituent comprising a tertiary amine, or have two cyclic amine groups connected by a common substituent comprising a tertiary amine, wherein the reaction forms an ionic cyclic nitroxyl radical oligomer precursor comprising at least two cyclic amine groups and at least one cationic quaternary ammonium group; and (b) oxidizing the cyclic amine groups to nitroxyl groups, to form an ionic cyclic nitroxyl radical oligomer comprising at least two cyclic nitroxyl radical groups.

Another embodiment of a method of making an ionic cyclic nitroxyl radical oligomer includes the steps of: (a) forming a dimeric cyclic nitroxyl radical derivative comprising two cyclic nitroxyl radical groups connected by a secondary amine group; and (b) alkylating the secondary amine group to form a cationic quaternary ammonium group.

Another embodiment of a method of making an ionic cyclic nitroxyl radical oligomer includes the steps of: (a) forming a dimeric cyclic nitroxyl radical precursor comprising two cyclic amine groups connected by a secondary amine group; (b) alkylating the secondary amine group to form a cationic quaternary ammonium group; and (c) oxidizing the cyclic amine groups to nitroxyl radicals.

Another embodiment of a method of making an ionic cyclic nitroxyl radical oligomer includes the steps of: (a) forming a dimeric cyclic nitroxyl radical derivative comprising two cyclic nitroxyl radical groups connected by a secondary amine group; and (b) reacting the secondary amine group with an alkane having at least two terminal leaving groups to form a cationic cyclic quaternary ammonium group.

Another embodiment of a method of making an ionic cyclic nitroxyl radical oligomer includes the steps of: (a) forming a dimeric cyclic nitroxyl radical precursor comprising two cyclic amine groups connected by a secondary amine group; (b) reacting the secondary amine group with an alkane having at least two terminal leaving groups to form a cationic cyclic quaternary ammonium group; and (c) oxidizing the cyclic amine groups to nitroxyl radicals.

Another embodiment of a method of making an ionic cyclic nitroxyl radical oligomer includes the steps of: (a) reacting a carbonyl-functionalized cyclic nitroxyl radical precursor with an aliphatic or cyclic amine comprising at least two amine groups via a condensation reaction, followed by a reduction reaction to form a cyclic nitroxyl radical oligomer precursor comprising at least two cyclic amine groups connected by an organic linker comprising at least two tertiary amine groups; (b) reacting the cyclic nitroxyl radical oligomer precursor with an electrophilic reactant comprising a leaving group via an $S_N2$ reaction to form an ionic cyclic nitroxyl radical oligomer precursor comprising at least two cationic quaternary ammonium groups; and (c) oxidizing the cyclic amine groups to nitroxyl groups, to form an ionic cyclic nitroxyl radical oligomer comprising at least two cyclic nitroxyl radical groups.

Another embodiment of a method of making an ionic cyclic nitroxyl radical oligomer includes the steps of: (a) reacting a primary amine-functionalized cyclic nitroxyl radical precursor with an organic molecule comprising at least two aldehyde and/or ketone groups via a condensation reaction to form a cyclic nitroxyl radical oligomer precursor having at least two cyclic amine groups connected by an organic linker comprising at least two secondary amine groups; (b) alkylating the secondary amine groups to form an ionic cyclic nitroxyl radical dimer precursor comprising at least two cationic quaternary ammonium groups; and (c) oxidizing the cyclic amine groups to nitroxyl radicals.

Another embodiment of a method of making an ionic cyclic nitroxyl radical oligomer includes the steps of: (a) reacting an amine-functionalized nitroxyl radical derivative or precursor with a diketone and an aldehyde in a multicomponent reaction; and, if the amine-functionalized nitroxyl radical precursor is used, (b) oxidizing the cyclic amine groups to nitroxyl radicals.

Another embodiment of a method of making an ionic cyclic nitroxyl radical oligomer includes the steps of reacting a cyclic nitroxyl radical derivative or precursor bearing a primary amine group and a N-(2,4-dinitrophenyl)pyridinium salt, whereby the N-(2,4-dinitrophenyl)pyridinium salt is converted into an ionic cyclic nitroxyl radical dimer; and, if the cyclic nitroxyl radical precursor is used, (b) oxidizing the cyclic amine groups to nitroxyl radicals.

BRIEF DESCRIPTION OF THE DRAWINGS

Illustrative embodiments of the invention will hereafter be described with reference to the accompanying drawings.

(In FIGS. 3A-3S and other figures herein, the radical symbol (.) is omitted. However, as would be understood by those in the art, the N—O groups with the cyclic nitroxides are radicals.)

FIG. 7, panels (a)-(e), shows the structures of various TEMPO derivatives and precursors.

FIG. 8 shows the oxidation of the secondary ring amine of a TEMPO group to a nitroxyl radical.

FIG. 9, panels (a) and (b) show the alkylation of a primary amine on a TEMPO derivative and a TEMPO precursor, respectively.

In FIG. 27A, a carbonyl-functionalized TEMPO precursor undergoes a condensation reaction with either an aliphatic diamine or a cyclic diamine. FIG. 27B shows other examples of diamine linkers that can be used.

In FIG. 28A an amine-functionalized TEMPO precursor undergoes a condensation reaction with an aliphatic diketone. FIG. 28B shows other examples of aliphatic, cyclic, and aromatic diketones that can be used.

FIGS. 35A-35B show key electrochemical and physiochemical metrics of TEMPO dimers. FIG. 35A shows logarithmic viscosity-volumetric capacity relationship for different TEMPOs monomers and dimers with empirical exponential fits. FIG. 35B shows permeability of different TEMPOs through high-power DSVN anion-exchange membrane tested in H-cells. The TEMPO dimers showed orders of magnitude decreased permeability versus TEMPO monomers.

DETAILED DESCRIPTION

Figure 1A:
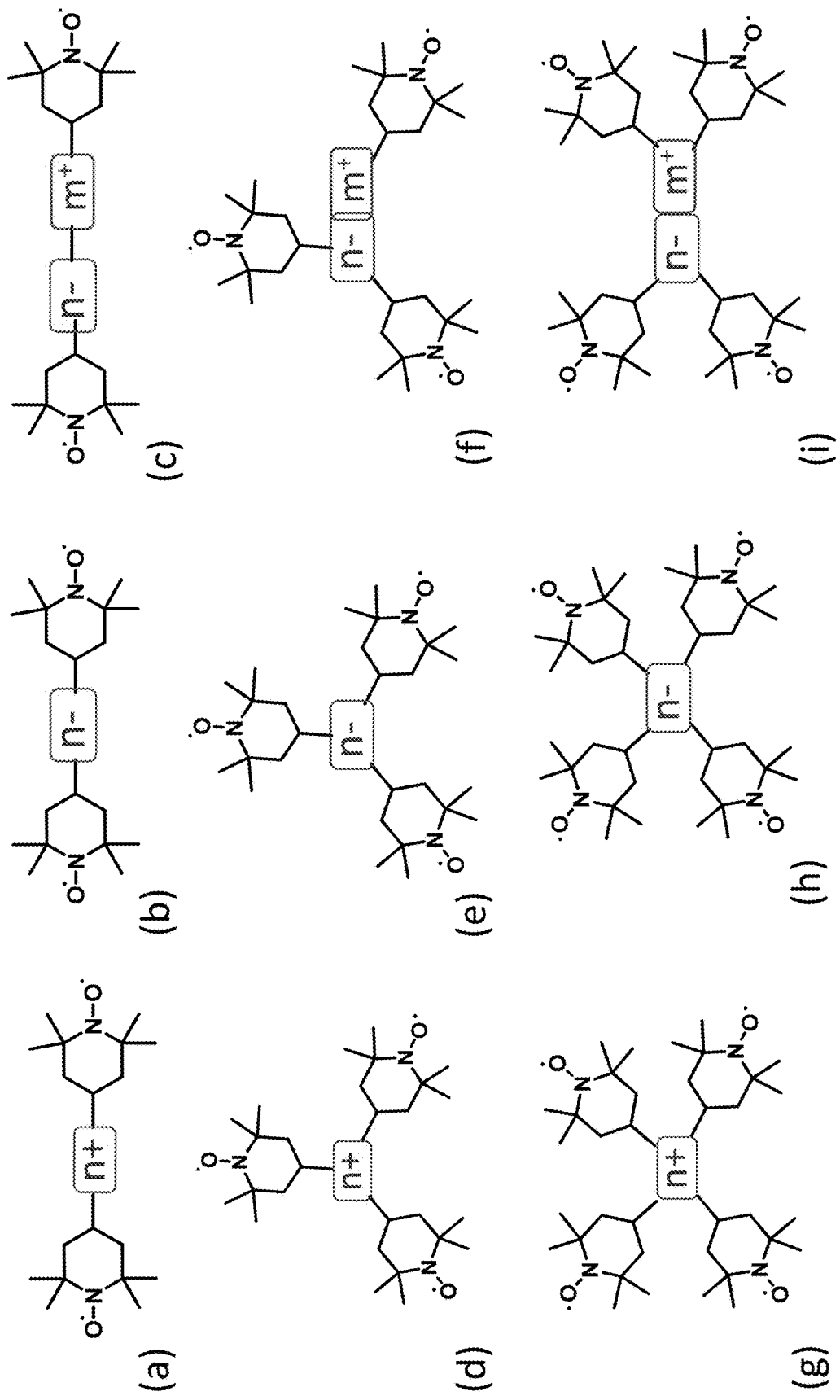
FIG. 1A, panels (a)-(i), and FIG. 1B, panels (a)-(f), show the structures of illustrative positively charged (left), negatively charged (center), and zwitterionic (right) TEMPO dimers (FIG. 1A, panels (a)-(c)), trimers (FIG. 1A, panels (d)-(f)), tetramers (FIG. 1A, panels (g)-(i)), pentamers (FIG. 1B, panels (a)-(c)), and hexamers (FIG. 1B, panels (d)-(f). The cores of the TEMPO oligomers are represented generically the central rectangles, which indicate whether the oligomers have a net positive (n+), net negative (m−), or zwitterionic (n+)(m−) charge state.

Charge-bearing cyclic nitroxyl radical oligomers, such as 2,2,6,6-tetramethylpiperidine-1-oxyl (TEMPO) oligomers, 2,2,5,5-tetramethyl-1-pyrrolidinyloxyl (PROXYL) oligomers, and imidazolidine oligomers, having between two and twelve cyclic nitroxide radical groups are provided. Methods of making the oligomers and electrochemical cells, such as aqueous organic redox flow batteries (AORFBs), that use the oligomers as catholytes are also provided.

The charge-bearing (ionic) cyclic nitroxyl radical oligomers are larger than individual cyclic nitroxyl radicals, but still maintain a high density of redox active cyclic nitroxyl radical groups within the molecule. As a result, when the oligomers are used as catholytes in an AORFB, they are able to reduce catholyte permeation through an ion-conducting membrane, while maintaining a high volumetric capacity and cycling stability. In addition, the cyclic nitroxyl radical oligomers have sufficient water solubility to be used in aqueous electrolyte solutions.

The ionic cyclic nitroxyl radical oligomers can be made using a modular synthesis in which monomeric and/or dimeric nucleophiles and electrophiles, which are made from cyclic nitroxyl radical derivatives or precursors, react with one another (heterooligomerization) or react with organic linkers (homodimerization). This modular synthesis can be carried out using simple, efficient substitution and elimination reaction steps. Alternatively, the ionic cyclic nitroxyl radical oligomers can be synthesized from the cyclic nitroxyl radical derivatives or precursors via multi-component reactions, Zincke reactions, or ketone diamine condensation reactions.

Some general structural characteristics of the cyclic nitroxyl radical dimers and higher order oligomers are discussed below, followed by chemical structures that represent various embodiments of the oligomers. A discussion of methods of synthesizing the oligomers is also provided, including Examples with detailed procedures.

Ionic Cyclic Nitroxyl Radical Oligomers
General Structural Characteristics:

The ionic cyclic nitroxyl radical oligomers are organic molecules bearing at least two, and up to twelve, cyclic nitroxyl radical groups. Thus, the oligomers include cyclic nitroxyl radical dimers, trimers, tetramers, pentamers, hexamers, and higher order oligomers. The oligomers further include a core to which the two or more cyclic nitroxyl radical groups are covalently bonded. The core may by uncharged, positively charged, negatively charged, or may be zwitterionic—carrying both positive and negative charges. For oligomers bearing a positive charge, the core includes at least one cationic nitrogen atom. The cationic nitrogen atom may be, for example, the nitrogen of a cationic quaternary ammonium group or a nitrogen-containing heteroaromatic cation. In some embodiments of the oligomers, the core is itself a cationic quaternary ammonium group or a nitrogen-containing heteroaromatic cation. In other embodiments, the core is a larger organic group that includes one or more cationic quaternary ammonium groups and/or one or more nitrogen-containing heteroaromatic cations. Negatively charged and zwitterionic cores include one or more anionic core substituents.

Figure 1B:
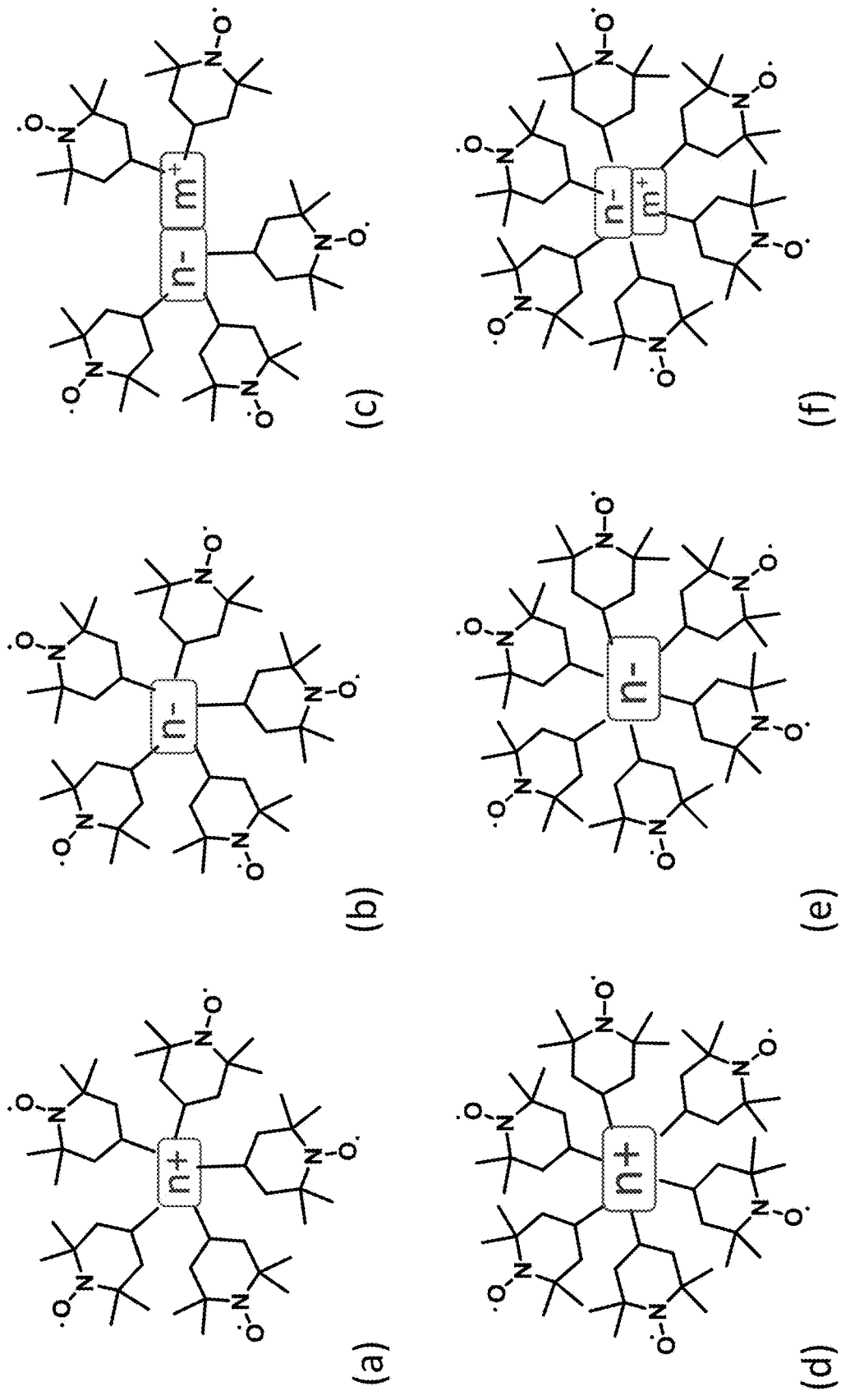

An schematic illustration of the fundamental structure of ionic cyclic nitroxyl radical oligomers is provided in FIGS. 1A and 1B, where the cores of the ionic oligomers are represented generically by the central rectangles, which indicate whether the oligomers have a net positive (n+), net negative (m−), or zwitterionic (n+)(m−) charge state. FIG. 1A, panels (a)-(i), and FIG. 1B, panels (a)-(f), show the structures of illustrative positively charged (left), negatively charged (center), and zwitterionic (right) TEMPO dimers (FIG. 1A, panels (a)-(c)), trimers (FIG. 1A, panels (d)-(f)), tetramers (FIG. 1A, panels (g)-(i)), pentamers (FIG. 1B, panels (a)-(c)), and hexamers (FIG. 1B, panels (d)-(f)). TEMPO is used as the cyclic nitroxyl radical oligomer of FIGS. 1A and 1B for illustration only. Other cyclic nitroxyl radical groups can also be used.

Various embodiments of the ionic cyclic nitroxyl radical oligomers have from one to 12, or even more, positive charges and from 0 to 12, or even more, negative charges. For some applications, including applications where a low viscosity is desired, it is advantageous to use oligomers having a low charge density per redox active electron. Therefore, some embodiments of the present ionic oligomers, have an average of one or fewer positive charges per nitroxyl radical group, as determined when the nitroxyl radical groups are in a reduced state. This includes ionic oligomers having an average of 0.25 to 0.75 positive charges per nitroxyl radical group, when the nitroxyl radical groups are in a reduced state.

The cationic quaternary ammonium groups may be aliphatic quaternary ammonium groups, cyclic quaternary ammonium groups, or a combination thereof. Aliphatic quaternary ammonium groups include alkyl quaternary ammonium groups, such as dimethyl quaternary ammonium groups. The cyclic quaternary ammonium groups and nitrogen-containing heteroaromatic cations may be monovalent (containing one cationic nitrogen atom) or divalent (containing two cationic nitrogen atoms). Examples of nitrogen-containing heteroaromatic cations include imidazolium groups, pyridinium groups, and bipryridinium groups. Examples of cyclic quaternary ammonium groups include 1,4-diazabicyclo[2.2.2]octane-1,4-diium groups, aziridinium groups, azetidinium groups, pyrrolidinium groups, piperidinium groups, and morpholinium groups, and further include piperazinium groups, and imidazolidinium groups. The quaternary ammonium groups and nitrogen-containing heteroaromatic cation groups may be substituted or unsubstituted. For example, the carbon atoms of an alkyl chain of an aliphatic quaternary ammonium group or the ring carbons of a cyclic quaternary ammonium group or a nitrogen-containing heteroaromatic cation may have hydroxyl substituents or anionic substituents, such as sulfonate, phosphonate, or carboxylate substituents. The anionic substituents may be directly bonded to a ring carbon, or may be bonded via an organic group, such as an alkyl chain.

The heterocyclic rings of the nitroxyl radical groups are non-conjugated and, therefore, have weak intermolecular interactions. The use of non-conjugated cyclic nitroxyl radical groups is advantageous because non-conjugated rings do not promote aggregation, which can lead to an undesirable increase in the viscosity of an electrolyte. In addition, non-conjugated nitroxyl radical groups tend to have good water miscibility when attached to a hydrophilic ionic group. Examples of non-conjugated cyclic nitroxyl radical groups include piperidine radical groups, pyrrolidine radical groups, and imidazolidine radical groups, the structures of which are shown below.

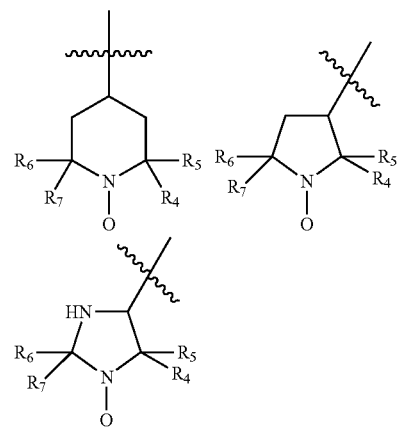

where $R_4$, $R_5$, $R_6$, and $R_7$ are independently selected from alkyl groups having 1 to 12 carbon atoms, including alkyl groups having 1 to 6 carbon atoms, or where $R_4$ and $R_5$ together with the ring carbon to which they are attached form a cycloaliphatic ring or a heterocyclic ring, and/or where $R_6$ and $R_7$ together with the ring carbon to which they are attached form a cycloaliphatic ring or a heterocyclic ring. When $R_4$, $R_5$, $R_6$, and $R_7$ in the structures above are methyl groups, the structures above are (from left to right) a TEMPO group (—CH(CH$_2$)$_2$(CMe$_2$)$_2$NO), a PROXYL group (—CHCH$_2$(CMe$_2$)$_2$NO groups), and an imidazolidine groups (—CHNH(CMe$_2$)$_2$NO group).

Cyclic nitroxyl radical groups in which $R_4$ and $R_5$ together with the ring carbon to which they are attached and/or the $R_6$ and $R_7$ together with the ring carbon to which they are attached form a cycloaliphatic ring or a heterocyclic ring, include nitroxyl radical groups having the structures:

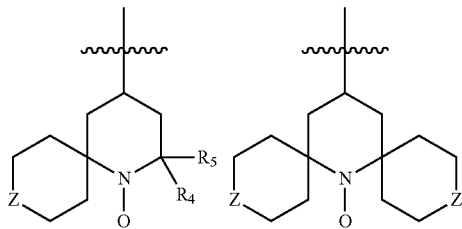

where the Zs are —CH$_2$— groups, oxygen atoms, —NC(O)CH$_3$ groups, sulfur atoms, or —SO$_2$ groups and $R_4$ and $R_5$ are as defined above.

In oligomers bearing piperidine radical groups, such as TEMPO groups, the piperidine groups are covalently bonded to the core at the 4-position, the 3-position, or the 5-position of the piperidine ring. In oligomers bearing pyrrolidine radical groups, such as PROXYL oligomers, the pyrrolidine groups are covalently bonded to the core at the 3-position of the pyrrolidine ring. In oligomers bearing imidazolidine radical groups, the imidazolidine groups are covalently bonded to the core at the 4-position of the imidazolidine ring.

A branched core may have three branches (tri-branched), four branches (tetra-branched), five branches (penta-branched), or six or more branches, and the branches extending from the core (main branches) may themselves terminate in sub-branches. The branches may extend from a single central atom, a single aromatic ring, or a single central heterocyclic ring, and/or they may extend from a linear backbone within the core. The cyclic nitroxyl radical groups may be present as terminal groups on a linear core or as terminal groups on branches of a branched core and/or may be present as pendant groups along an alkyl chain within the core. The two or more cyclic nitroxyl radical groups that are covalently bonded to the core may be the same or different. For example, in cyclic nitroxyl radical oligomers with branched cores, each branch may terminate in the same cyclic nitroxyl radical group. Alternatively, one or more of the branches my terminate in a different cyclic nitroxyl radical group.

The heterocyclic rings of the nitroxyl radical groups are covalently bonded to the core and the groups that form the bond between the cyclic nitroxyl radicals and the core are referred to herein as bonding groups or linkages. If the bonding group is a quaternary ammonium group or a nitrogen-containing heteroaromatic cation, a carbon or oxygen atom of the heterocyclic ring of the nitroxyl radical is covalently bonded to a nitrogen of the quaternary ammonium of the heteroaromatic cation. As previously discussed, the cationic quaternary ammonium groups may be aliphatic quaternary ammonium groups and/or cyclic quaternary ammonium groups. The nitrogen atom of an aliphatic quaternary ammonium bonding group can be directly bonded to one, two, or three cyclic nitroxyl radical groups. The nitrogen atom of a cyclic quaternary ammonium bonding group can be directly bonded to one or two cyclic nitroxyl radical groups, depending upon the cyclic quaternary ammonium group being used. The cationic nitrogen atom of a nitrogen-containing heteroaromatic cation bonding group can be directly bonded to one cyclic nitroxyl radical group. If a net negatively charged oligomer or a zwitterionic oligomer is desired, the nitrogen atoms of a quaternary ammonium group may be a negatively charged substituents.

In some embodiments of the oligomers the bonding groups are organic linkages, rather than quaternary ammonium or nitrogen-containing heteroaromatic groups. Organic linkages that can provide bonding groups include amide linkages (—C(O)N(R$_{10}$)—, where R$_{10}$ is an H atom, an alkyl group, or an organic substituent comprising an anionic group, such as an alkyl sulfonate, alkyl phosphonate, or alkyl carbonate), ether linkages (—O—), or ester linkages (—C(O)O—). In some embodiments of the oligomers having amide linkages, the R of the amide linkage is another cyclic nitroxyl radical group, such that the amide linkage is connected to two cyclic nitroxyl radical groups. If the linkage is an amide linkage, a carbon or oxygen atom of the heterocyclic ring of the nitroxyl radical is covalently bonded the amide nitrogen; if the linkage in an ether linkage, a carbon atom of the heterocyclic ring of the nitroxyl radical is covalently bonded to the ether oxygen; and if the linkage is an ester linkage, a carbon atom of the heterocyclic ring of the nitroxyl radical is covalently bonded to the ester oxygen. Different cyclic nitroxyl radical groups in a given oligomer may be bonded to the core by the same or different bonding groups. If a net negatively charged oligomer or a zwitterionic oligomer is desired, the bonding groups may bear negatively charged substituents.

The bonding groups of the core may be linked by an organic linker that forms the rest of the core. The organic linker increases the size of the core by increasing the length and/or branching of the core. The linker may be positively charged, negatively charged, zwitterionic, or uncharged. For example, if the bonding groups of the core are uncharged, a positively charged linker can be incorporated into the core. If a net negatively charged oligomer or a zwitterionic oligomer is desired, the linkers may bear negatively charged groups. Chemical groups that may form part of an organic linker of the core include substituted or unsubstituted alkyl groups, substituted or unsubstituted cycloalkyl groups, substituted or unsubstituted heterocycloalkyl groups, substituted or unsubstituted cycloalkyl-alkyl groups, substituted or unsubstituted heterocycloalkyl-alkyl groups, substituted or unsubstituted aryl groups, substituted or unsubstituted heteroaryl groups, substituted or unsubstituted arylalkyl groups, substituted or unsubstituted heteroarylalkyl groups, ether groups, quaternary carbons, quaternary ammonium groups, tertiary alkylamine groups, and secondary alkylamine groups.

As used herein, the term alkyl refers to a straight or branched aliphatic hydrocarbon. The term cycloalkyl refers to a non-aromatic cyclic alkyl group that forms one or more rings. The term heterocycloalkyl refers to a non-aromatic cyclic alkyl group that forms one or more rings, wherein a ring includes a non-carbon atom. A cycloalkyl-alkyl includes a cycloalkyl group bonded to an alkyl group. Similarly, a heterocycloalkyl-alkyl includes a heterocycloalkyl group bonded to an alkyl group. The term aryl refers to an aromatic ring or two or more connected or fused aromatic rings. Heteroaryl refers to an aryl group in which an aromatic ring includes a non-carbon atom, such as a nitrogen or oxygen atom. An arylalkyl includes an alkyl group bonded to an aryl group. Similarly, a heteroarylalkyl group includes an alkyl group bonded to a heteroaryl group. The term ether refers to an alkyl group covalently bonded to an oxygen. As used herein, the term ether includes oligoether groups in which two or more ether groups are bonded in a chain and also includes ether groups that terminate in an alkyl group or chain. The term alkylamine refers to an alkyl group bonded to an amine. As used herein, the term alkyl amine includes oligo(alkylamine) groups in which two or more alkylamine groups are bonded in a chain.

By way of illustration, in some embodiments of the linkers, the alkyl groups are —$(CH_2)_n$— chains, where n has a value in the range from 1 to 12, from 1 to 6, or from 1 to 3. In some embodiments of the linkers, the ether groups comprise —$((CH_2)_n—O)_m$— chains, where n has a value in the range from 1 to 10, from 1 to 6, or from 1 to 3, and m has a value in the range from 1 to 12, from 1 to 6, or from 1 to 3. Ethylene glycol units and oligo(ethylene glycol) chains are examples of ether groups.

The quaternary ammonium groups in the linker may be aliphatic or cyclic, as described and exemplified above with respect to quaternary ammonium bonding groups. Aryl groups that can be present in the linker include nitrogen-containing heteroaromatic cationic groups, as described and exemplified above with respect to nitrogen-containing heteroaromatic cation bonding groups.

Ionic cyclic nitroxyl radical dimers have two non-conjugated cyclic nitroxyl radical groups. By way of illustration, a TEMPO dimer has two TEMPO groups. The two nitroxyl radical groups may be connected by a single common bonding group. For example, both nitroxyl radical groups can be covalently bonded to the same nitrogen atom of a quaternary ammonium group, or both nitroxyl radical groups can be covalently bonded to the same aromatic ring of a nitrogen-containing heteroaromatic cation. Alternatively, the two nitroxyl radical groups can be bonded to the core by two different bonding groups, which may be connected by an organic linker. Illustrative generic structures for examples of ionic TEMPO dimers are shown as the products on the right side of FIG. 2. (As shown in the figure, the dimers are made by converting TEMPO derivatives into TEMPO nucleophiles and electrophiles, which are reacted to form the dimers. This process is described in more detail in the synthesis discussion below.) It should be understood, however, that some or all of the TEMPO groups shown in FIG. 2 and the other figures herein can be replaced by other cyclic nitroxyl radical groups, such as pyrrolidine radical groups and/or imidazolidine radical groups. Although the alkyl chains within the dimer structures shown in FIG. 2 have between 1 and 3 carbon atoms in the chain, the alkyl chains can have more carbon atoms. Thus, the alkyl chains include "chains" of one or more carbon atoms. As illustrated in the figure, the ionic TEMPO dimers include monovalent dimers (having a single positive charge) and divalent dimers (having a double positive charge). However, nitroxyl radical dimers having a higher number of positive charges, a net negative charge, or a zwitterionic charge state can also be made. In the dimer structures of FIG. 2, R' represents an amide linkage, an ester linkage, or an ether linkage, as indicated on the left side of the figure. L in the examples shown in FIG. 2 is selected from:

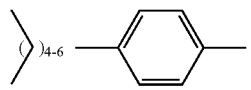

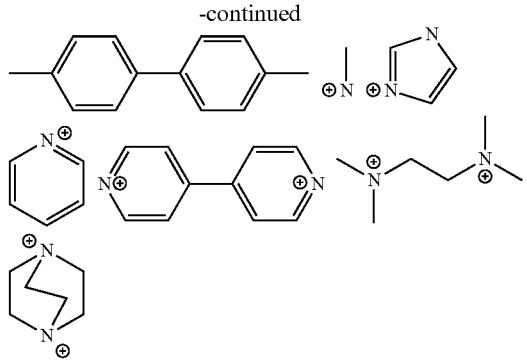

Figure 2:
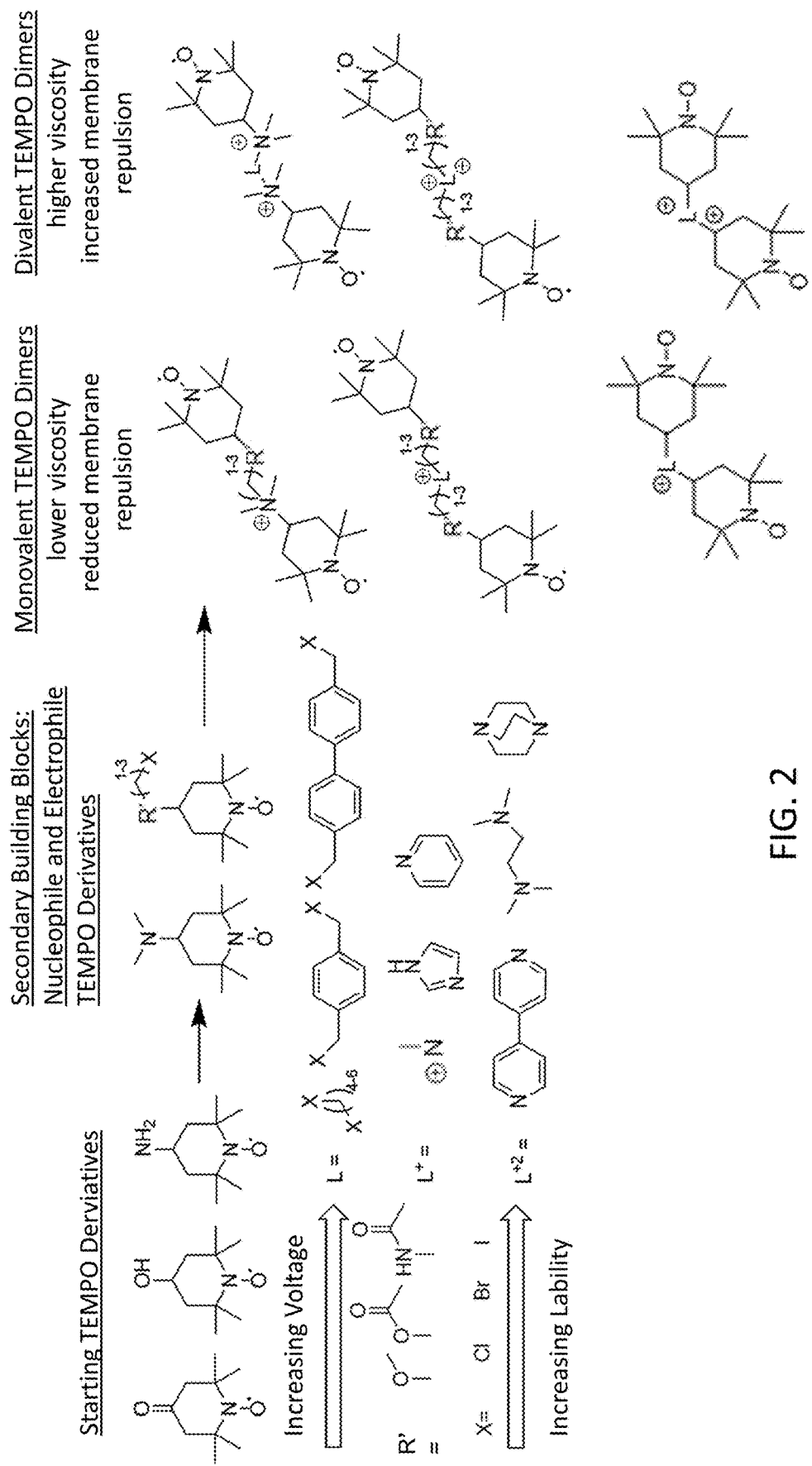
FIG. 2 shows a generic reaction scheme for the synthesis of various positively charged +ionic TEMPO dimers. Charge-balancing counterions that can be associated with the cationic TEMPO dimers shown in the figures and described herein include $I^-$, $Br^-$, $Cl^-$, $NO_3^-$, $SO_4^{2-}$, $CO_3^{2-}$, $ClO_4^-$, $BF_4^-$, $PF_6^-$, $H_2PO_4^-$, $HPO_4^{2-}$, $PO_4^{3-}$, $N_3^-$, $CN^-$, $N(CN)_2^-$, $SCN^-$, $TFSI^-$, R—$COO^-$, and $RSO_3^-$ (where R is an alkyl, alkylaryl, or aryl group).

The R' groups and L groups in the structures of FIG. 2 can be selected to provide either a monovalent or a divalent dimer. Although the alkyl chains shown above have between 4 and 6 carbon atoms in the chain, the alkyl chains can have more or fewer carbon atoms. Thus, the alkyl chains include "chains" of one or more carbon atoms.

Various examples of monovalent and divalent TEMPO dimers are shown in FIGS. 3A-3F and in FIGS. 3G-3M, respectively.

Figure 4A:
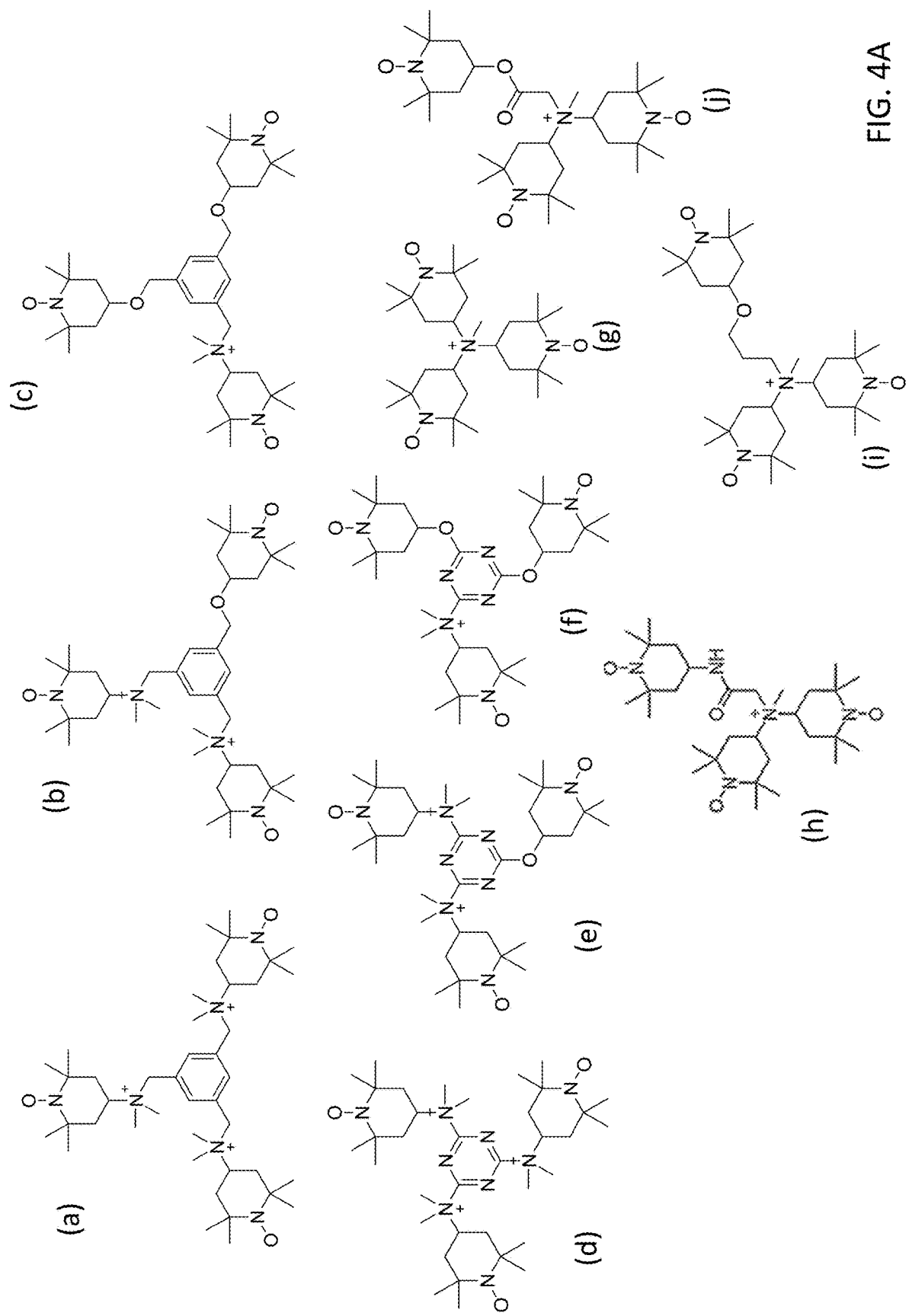
FIGS. 4A and 4B show the structures of various ionic TEMPO trimers.
Figure 4B:
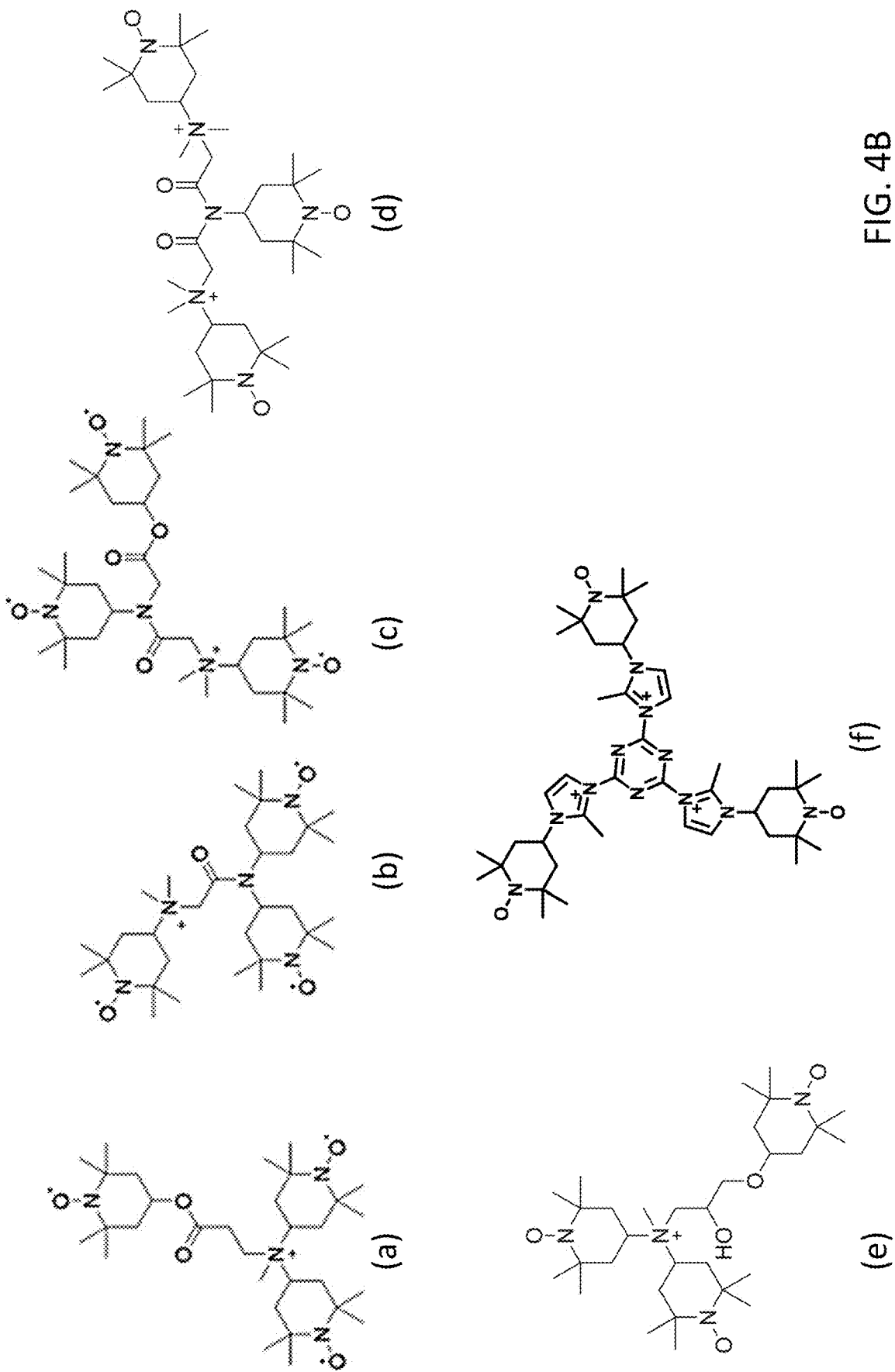

Ionic cyclic nitroxyl radical trimers have three non-conjugated cyclic nitroxyl radical groups. By way of illustration, a TEMPO trimer has three TEMPO groups. The three nitroxyl radical groups may be connected by a single bonding group. For example, three nitroxyl radical groups can be covalently bonded to the same nitrogen atom of an aliphatic quaternary ammonium group. Alternatively, the three nitroxyl radical groups can be bonded to the core by different bonding groups, which may be connected by an organic linker. Illustrative examples of TEMPO trimers in which the core comprises a quaternary ammonium, an aromatic ring, or a heterocyclic ring are shown in FIGS. 4A and 4B. In these examples, the aromatic ring is a benzene ring having TEMPO substituents at the 1,3,5-positions or a triazine ring having TEMPO substituents at the 2,4,6-positions.

Figure 5A:
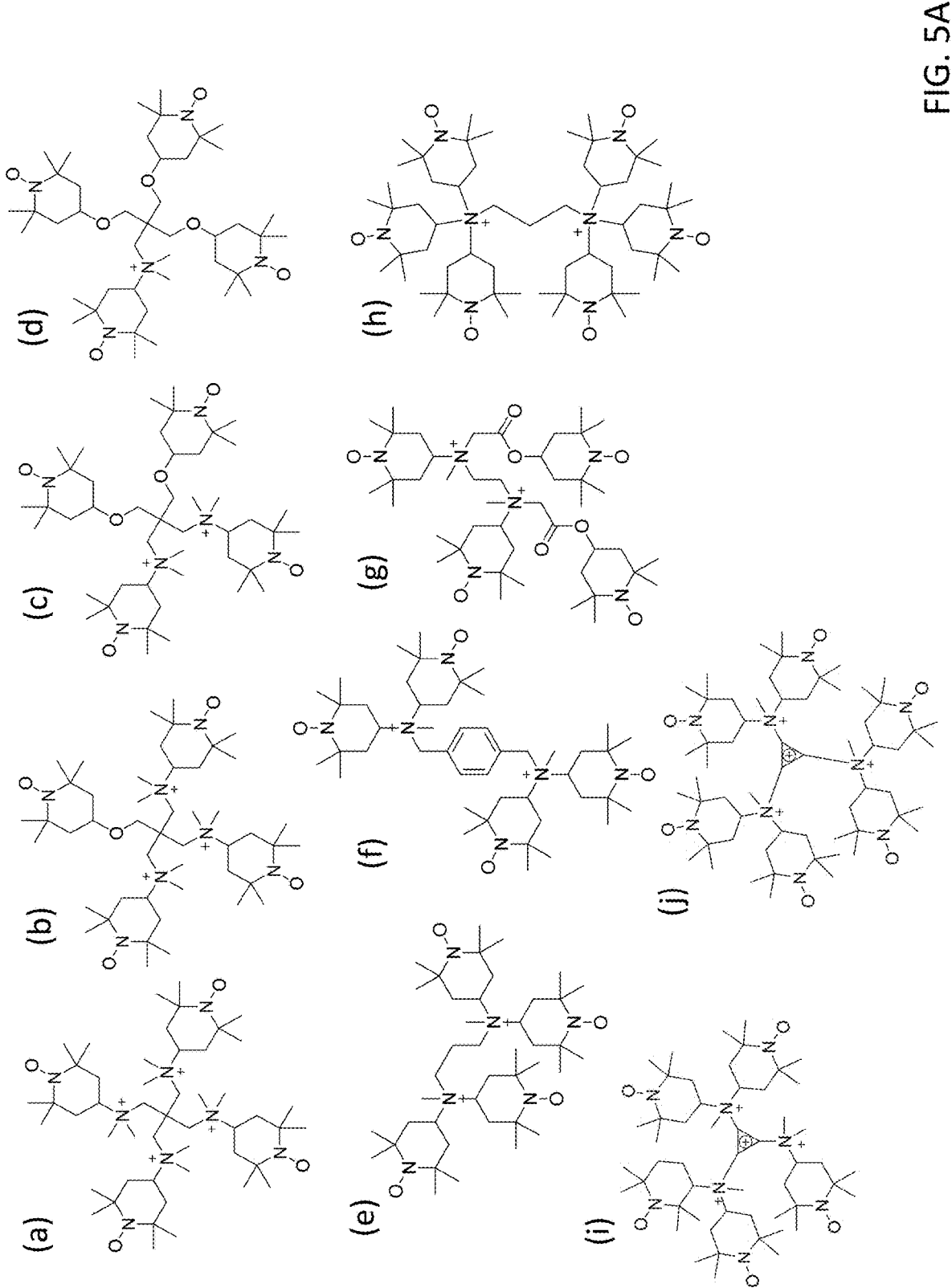
FIGS. 5A and 5B show the structures of various ionic TEMPO tetramers and an ionic TEMPO hexamer.
Figure 5B:
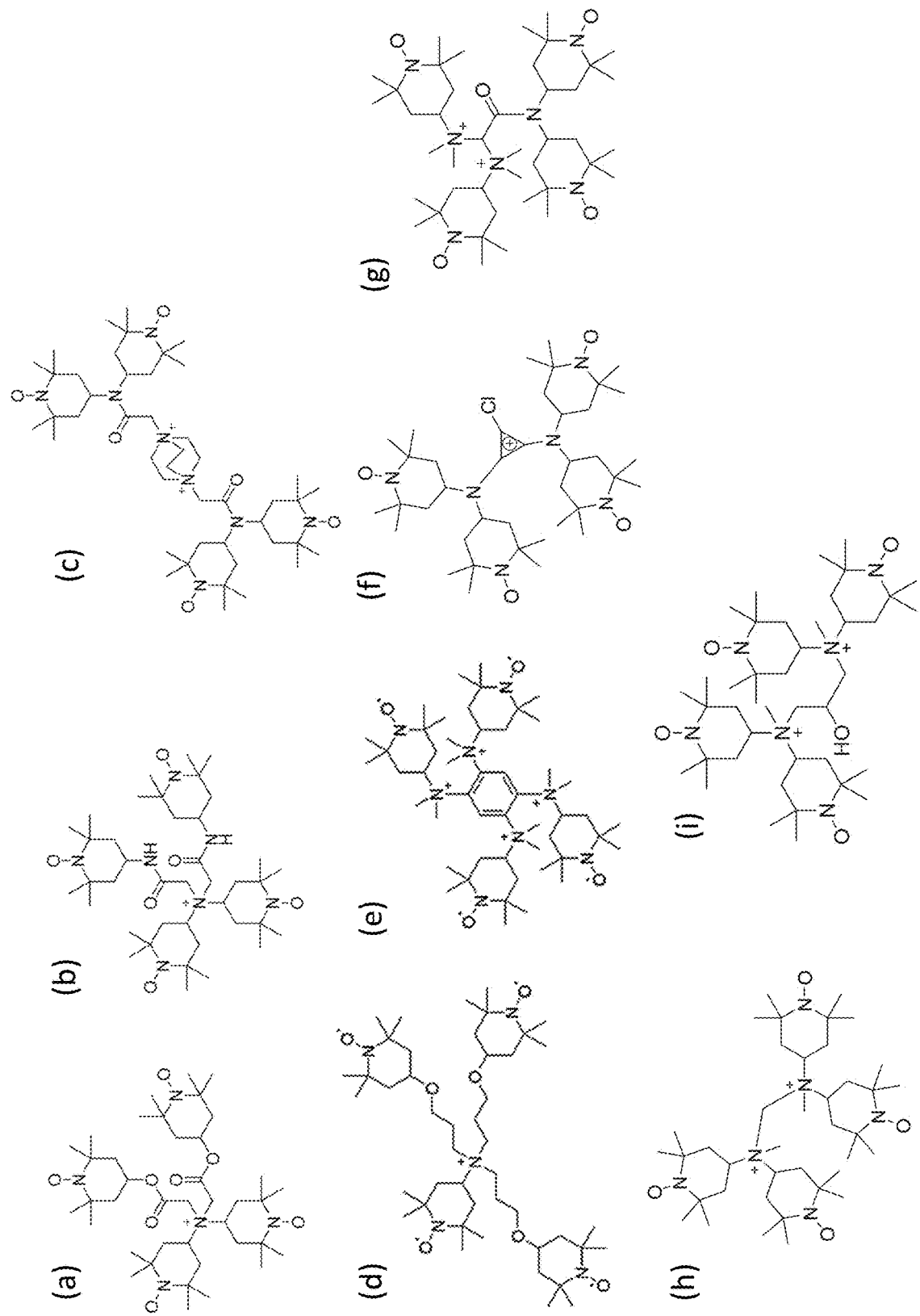

Ionic cyclic nitroxyl radical tetramers have four non-conjugated cyclic nitroxyl radical groups. By way of illustration, a TEMPO tetramer has four TEMPO groups. Branching in the core of the tetramers can be provided, for example, by a branched alkyl group, a quaternary carbon atom and/or the nitrogen of a quaternary amine. Illustrative examples of TEMPO tetramers, and one TEMPO hexamer, are shown in FIGS. 5A and 5B.

Figure 6A:
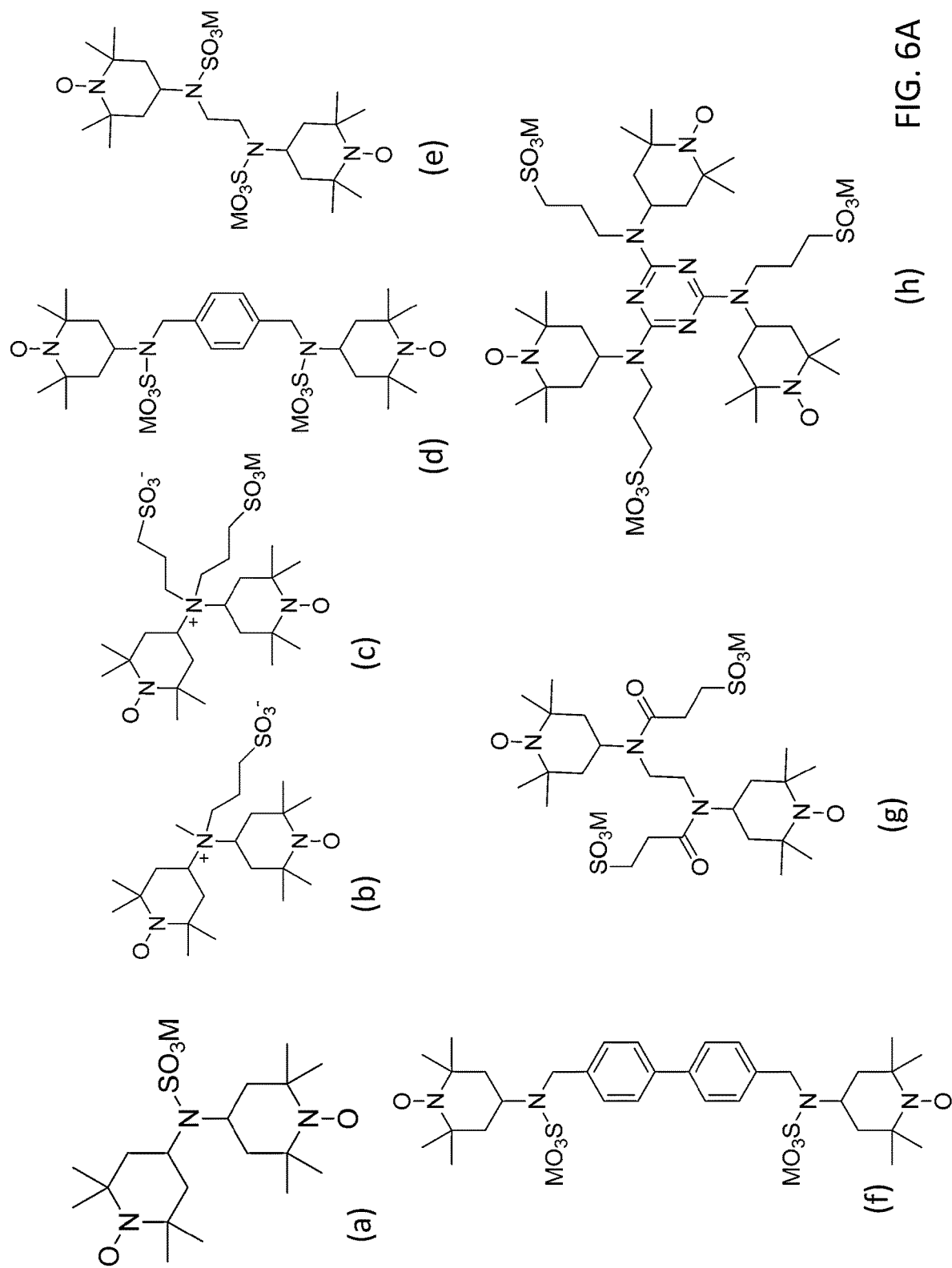
FIGS. 6A and 6B show the structures of various negatively charged and zwitterionic TEMPO oligomers. The "M" in the structures represents a charge-balancing cation. Charge-balancing counterions that can be associated with the anionic TEMPO dimers shown in the figures and described herein include, but are not limited to, $Li^+$, $Na^+$, $K^+$, $NH_4^+$, $Zn^{2+}$, and $Al^{3+}$.
Figure 6B:
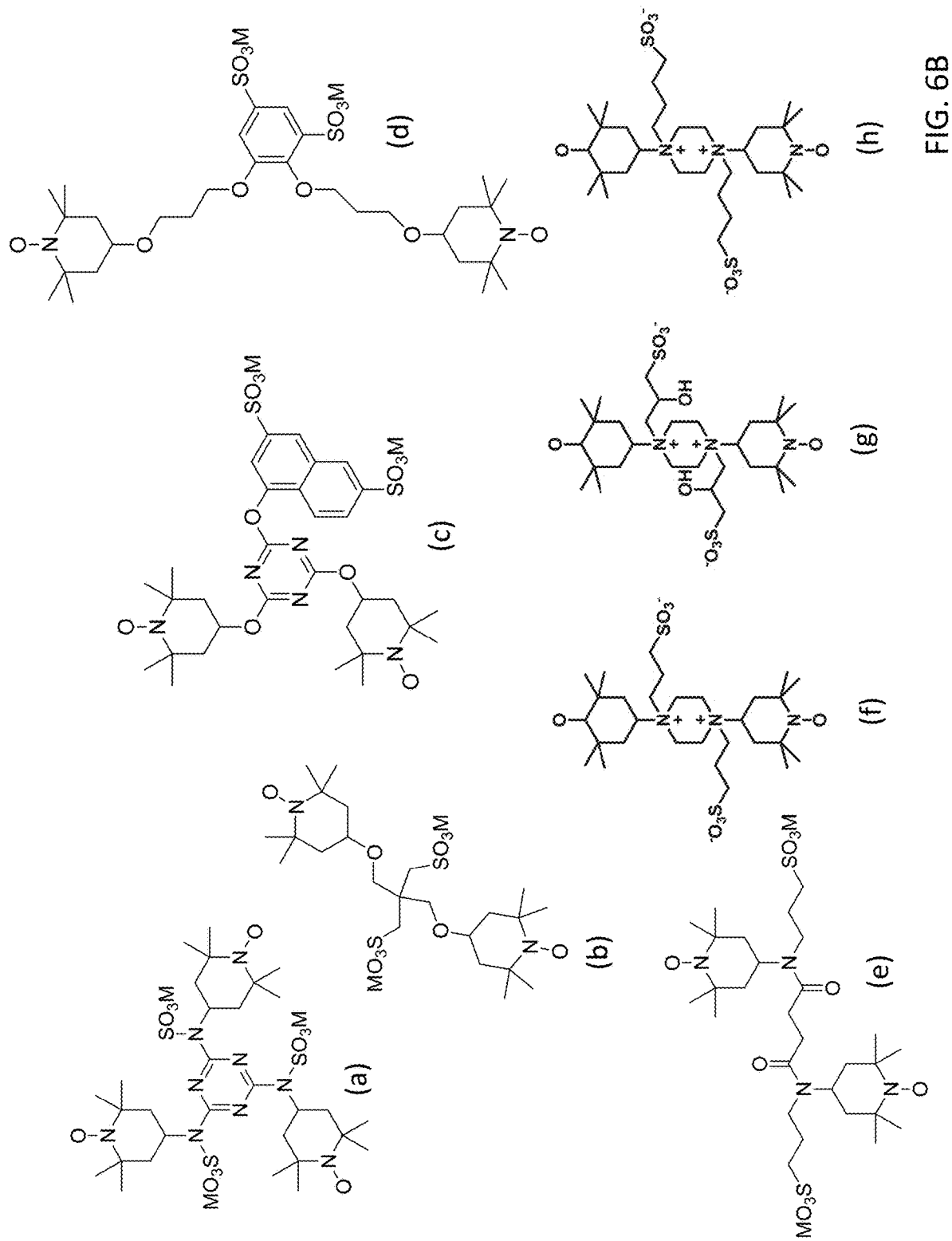

Optionally, the bonding groups, the organic linkers, or both may be substituted. For example, the bonding groups and/or organic linkers may have one or more negatively charged substituents to impart the ionic oligomer with a net negative charge or to form a zwitterionic oligomer. Introducing negative charges may be useful, for example, to produce a negatively charged catholyte. By way of illustration, alkyl groups, aromatic groups, or heterocyclic groups of the organic linkers, or the nitrogen atom of a tertiary amine, a quaternary ammonium in a bonding group or an organic linker may be substituted with one or more sulfonate groups (—$SO_3^-$), one or more phosphonate groups (—$PO_3^{2-}$), one or more carboxylate groups (—$CO_2^-$), or a combination thereof. Illustrative examples of TEMPO oligomers having anionic substituents on the oligomer core are shown in FIGS. 6A and 6B, where "M" represents a generic charge balancing cation.

Illustrative Oligomer Chemical Structures.

Some embodiments of the cyclic nitroxyl radical oligomers have the general structure:

    (Structure I)

where ·Rad is a cyclic nitroxyl radical group, $N_{cat}$ is an aliphatic quaternary ammonium group, a cyclic quaternary ammonium group, or a nitrogen-containing heteroaromatic group. R" in Structure I is a substituted or unsubstituted alkyl group, an anionic group, or a —(CH$_2$)$_w$—R'—·Rad group, where R' is an amide linkage, an ester linkage, or an ether linkage and w is an integer having a value from 1 to 12 (e.g., 1 to 6). If $N_{cat}$ in Structure I is an aliphatic quaternary ammonium group, s is 1, 2, or 3 and m=(4−s); if $N_{cat}$ in Structure I is a cyclic quaternary ammonium group, such as a 1,4-diazabicyclo[2.2.2]octane-1,4-diium group or a aziridinium groups, s is 1 or 2 and t is, correspondingly, 1 or 0, provided that, if t is 1, R" is a —(CH$_2$)$_w$—R'—·Rad group; and if $N_{cat}$ in Structure I is a nitrogen-containing heteroaromatic cationic group, such as an imidazolium group or a bipyridinium group, s is 2 and t=0.

Figure 3A:
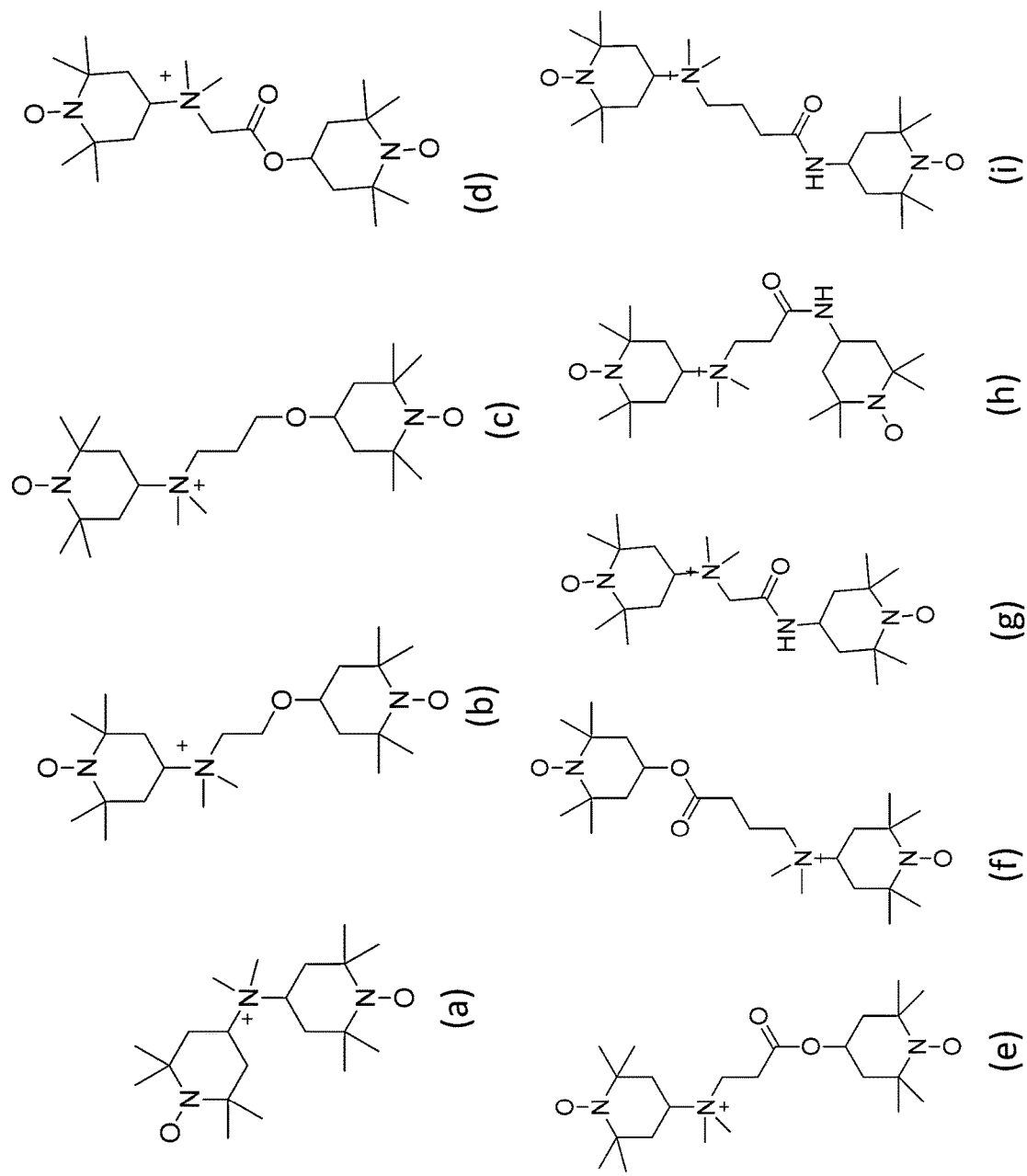
FIGS. 3A-3S show the structures of various monovalent and divalent cationic TEMPO dimers.
Figure 26:
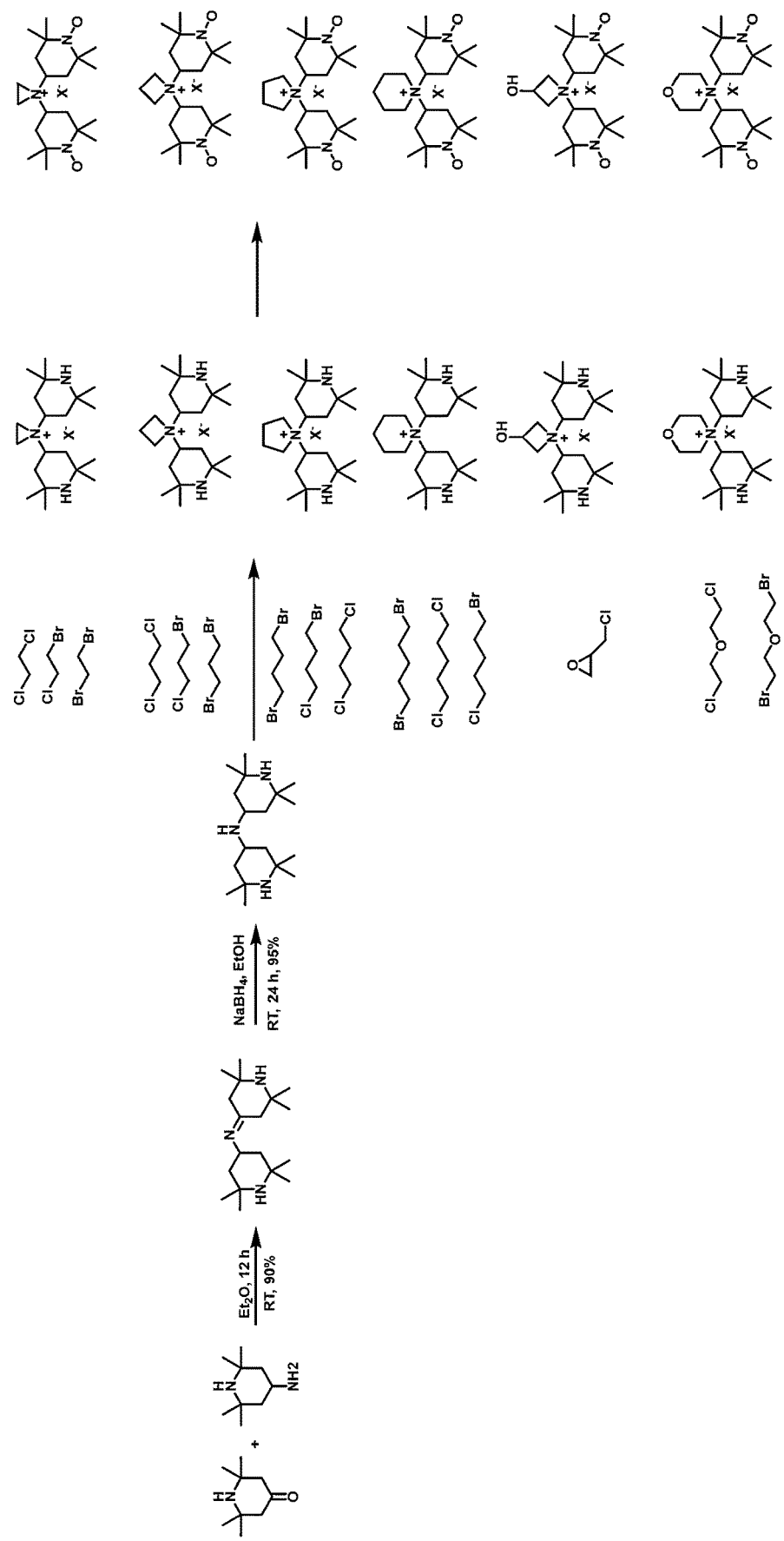
FIG. 26 illustrates the synthesis of a cyclic nitroxyl radical dimer having a cyclic quaternary ammonium group, starting from a carbonyl-functionalized TEMPO precursor and a primary amine-functionalized TEMPO precursor.

The ·Rad groups, R" groups, and R' groups in an oligomer of Structure I and the other Structures discussed below, may be the same or different. Substituents that may be present on the groups include anionic groups. Anionic groups include sulfonate groups, alkyl sulfonate groups, phosphonate groups, alkyl phosphonate groups, carboxylate groups, and alkyl carboxylate groups. Examples of cyclic nitroxyl radicals having Structure I, wherein ·Rad is a TEMPO group, are shown in FIG. 3A, panel (a), FIG. 3C, panel (a), FIG. 3M, panel (i), FIG. 3N, panel (j), FIG. 3P, panel (b), FIG. 4A, panels (g), (h), (i), and (j), FIG. 5B, panel (d), FIG. 6A, panels (b) and (c), FIG. 6B, panels (f)-(h), and as the products on the right side of FIG. 26.

Other embodiments of the cyclic nitroxyl radical oligomers have the general structure:

    (Structure II)

where each ·Rad is a cyclic nitroxyl radical group, each $N_{cat}$ is an aliphatic quaternary ammonium group, a cyclic quaternary ammonium group, or a nitrogen-containing heteroaromatic cation group, each R' is an amide linkage, an ester linkage, or an ether linkage, q is 1, 2, or 3, l is an integer with a value in the range from 0 to 12 (for example, 1 to 6), p is an integer with a value in the range from 0 to 12 (for example, 1 to 6), and L' is an organic linking group. The value of r depends on the nature of the linkage in the bonding group as follows: for an R' that is an amide linkage, r is 1 or 2; and for an R' that is an ester or ether linkage, r is 1. Thus, each amide linkage may have one or two cyclic nitroxyl radical groups directly bonded to the amide nitrogen. In some embodiments of Structure II in which only a single cyclic nitroxyl radical group is directly bonded to the amide nitrogen, an anionic group, such as an alkyl chain bearing a sulfonate, phosphonate, or carboxylate group is also present on the nitrogen atom of the amide to provide a negative charge. The nitrogen atom of each $N_{cat.}$ group is directly bonded to one, two, or three cyclic nitroxyl radical groups. In some embodiments of Structure II in which only one or two cyclic nitroxyl radical groups are directly bonded to the nitrogen atom of the $N_{cat.}$ group, said nitrogen atom is also bonded to alkyl substituents, which may optionally be functionalized with ionic groups, such as sulfonate, phosphonate, or carboxylate groups.

The L' linking group can be an $L_R$ or $L_{N+}$ type of linking group. An $L_R$ linking group does not include quaternary ammonium groups or nitrogen-containing heteroaromatic cations, while an $L_{N+}$ linking group includes one or more quaternary ammonium groups and/or one or more nitrogen-containing heteroaromatic cations.

Each $L_R$ in an oligomer is independently selected from a substituted or unsubstituted alkyl group, a substituted or unsubstituted cycloalkyl group, a substituted or unsubstituted heterocycloalkyl group, a substituted or unsubstituted cycloalkyl-alkyl group, a substituted or unsubstituted heterocycloalkyl-alkyl group, a substituted or unsubstituted aryl group, a substituted or unsubstituted heteroaryl group, a substituted or unsubstituted arylalkyl group, a substituted or unsubstituted heteroarylalkyl group, an ether group, a quaternary carbon, a tertiary alkylamine group, and a secondary alkylamine group. In some of the oligomers, $L_R$ is a single —CH$_2$— group.

Substituents that may be present on the alkyl, cycloalkyl, heterocycloalkyl, cycloalkyl-alkyl, heterocycloalkyl-alkyl, aryl, heteroaryl, arylalkyl, heteroarylalkyl, ether, quaternary carbon, tertiary alkylamine, and/or secondary alkylamine groups include, for example, anionic groups, such as sulfonate, phosphonate, and/or carboxylate groups, and/or hydroxyl groups. The anionic groups may be bound directly to a carbon atom on said groups, or may be bonded via an organic group, such as an alkyl chain. By way of illustration, alkyl sulfonate chains (e.g., propyl sulfonate or butylsulfonate), alkyl phosphonate chains, or alkyl carbonate chains may be covalently bonded to the nitrogen atom of an amine group.

$L_{N+}$ is a linking group having at least one cationic quaternary ammonium group and/or at least one nitrogen-containing heteroaromatic cationic group, where the at least one cationic quaternary ammonium group or nitrogen-containing heteroaromatic cationic group is covalently bonded to at least one [·Rad]$_q$-N$_{cat}$] and/or at least one [R'-Rad·] via an $L_R$ group, where $L_R$ is as defined previously. Each quaternary ammonium group in $L_{N+}$ is an aliphatic or cyclic quaternary ammonium group, as described and exemplified previously. If there are two or more cationic quaternary ammonium groups or nitrogen-containing heteroaromatic cationic groups in $L_{N+}$, said groups are also connected via $L_R$ groups. The various $L_R$ groups within an $L_{N+}$ may be the same or different. The cationic quaternary ammonium groups and nitrogen-containing heteroaromatic cationic groups may be incorporated into a linear or branched chain of the core or may be pendant from a linear or branched chain of the core. Substituents that may be present on the nitrogen atom of a quaternary ammonium or nitrogen-containing heteroaromatic cation group include sulfonate, phosphonate, and carboxylate groups. By way of illustration, alkyl sulfonate chains (e.g., propyl sulfonate or butylsulfonate) may be covalently bonded to the nitrogen atom of a quaternary ammonium or nitrogen-containing heteroaromatic cation.

If the oligomer is a dimer, Structure II can be rewritten as:

    (Structure III)

where l is 0, 1, or 2.

Figure 3B:
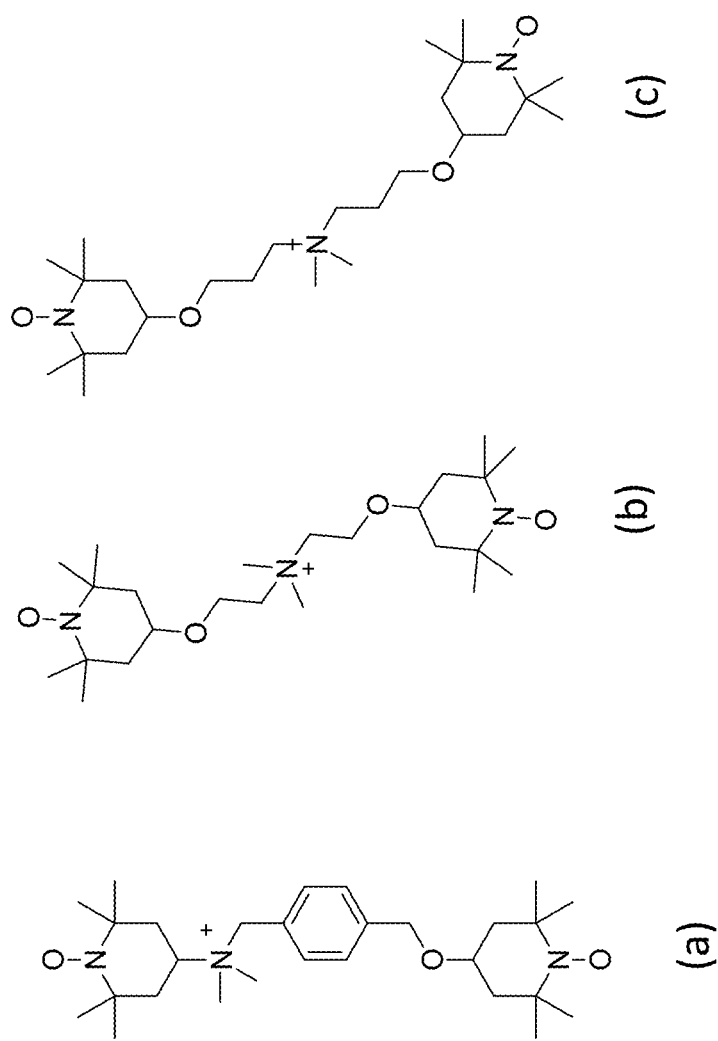
Figure 3C:
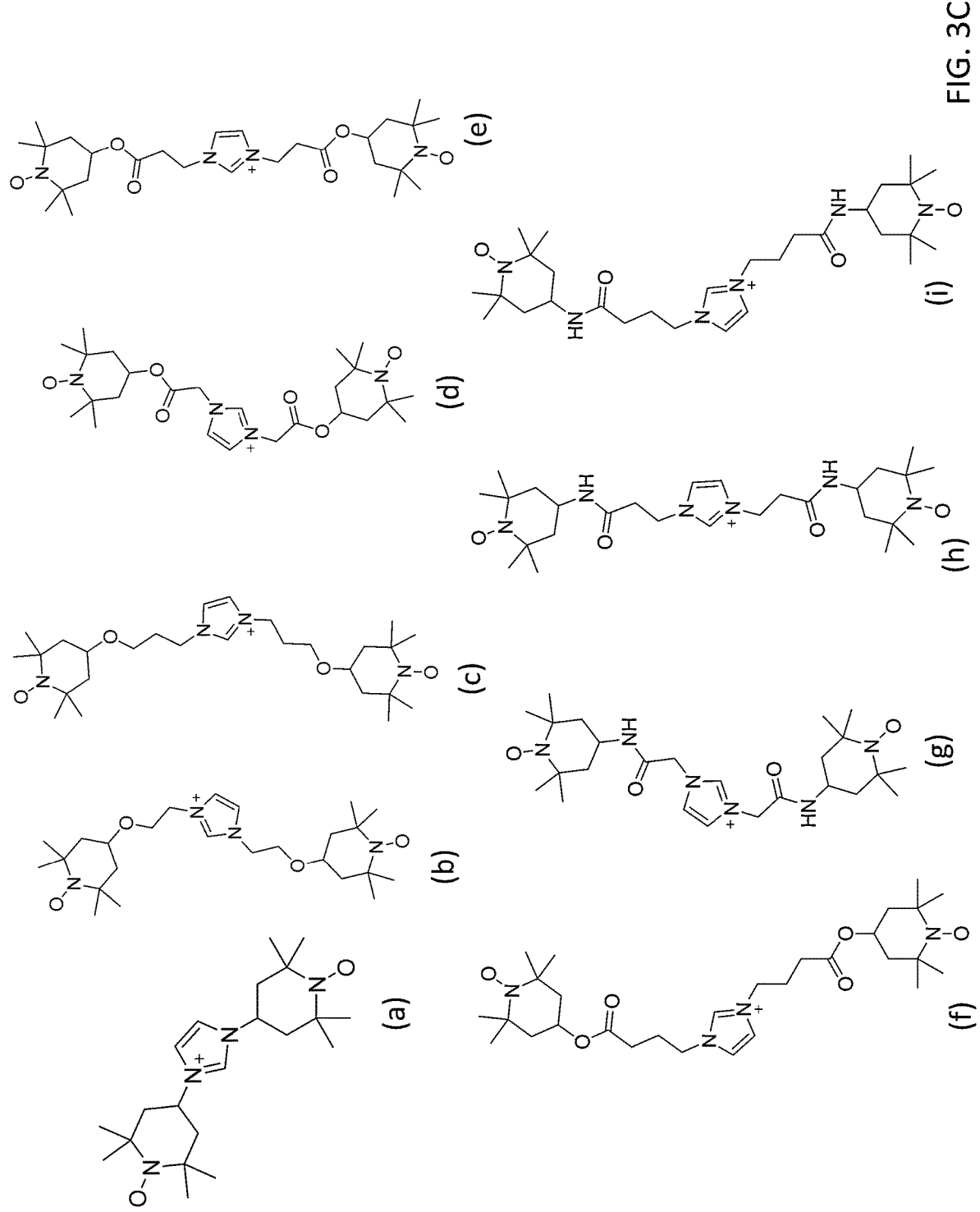
Figure 3D:
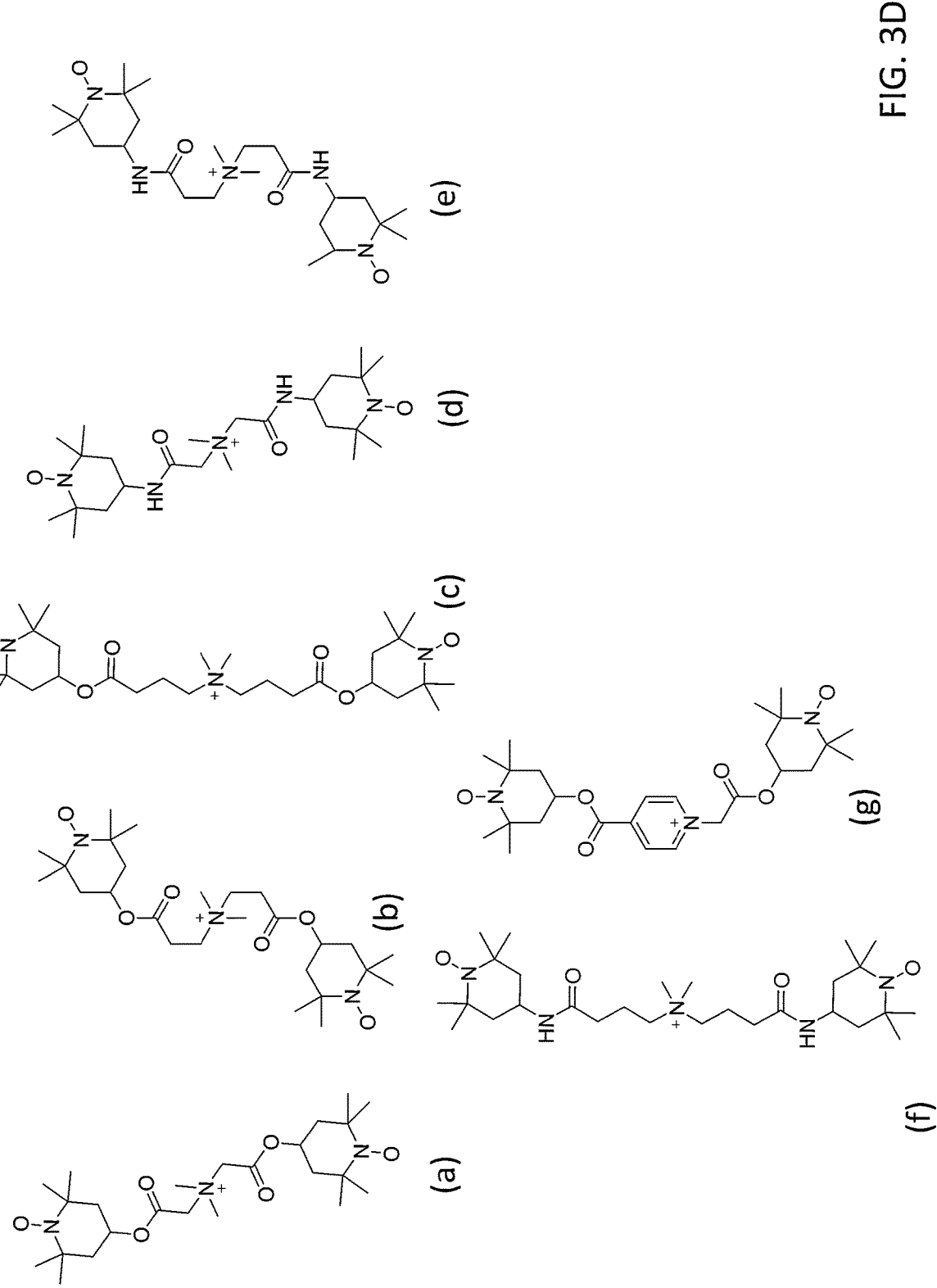
Figure 3E:
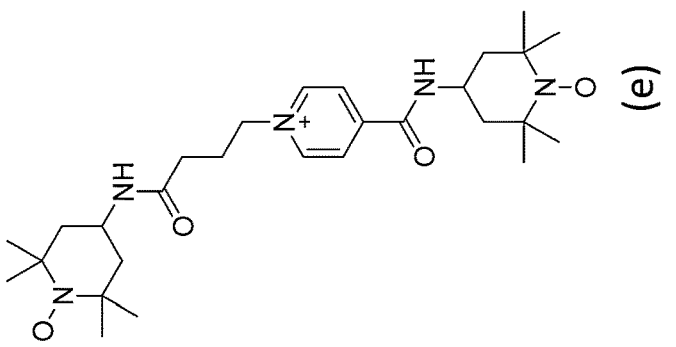
Figure 3E:
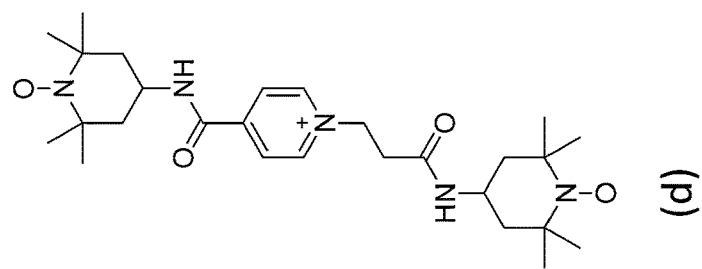
Figure 3E:
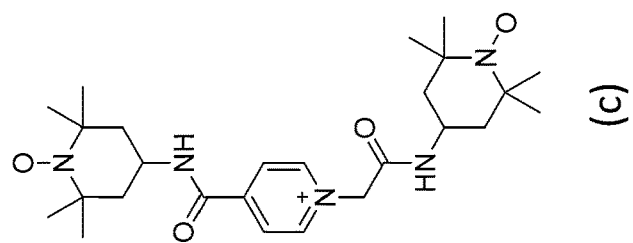
Figure 3E:
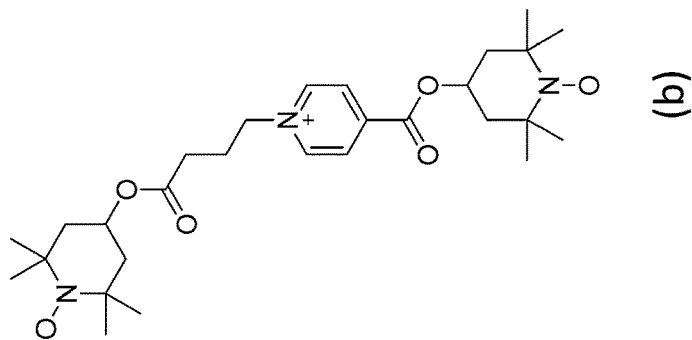
Figure 3E:
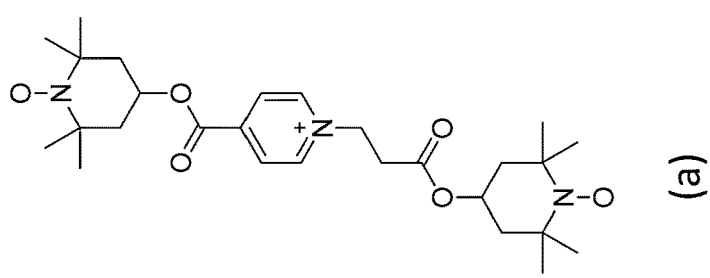
Figure 3F:
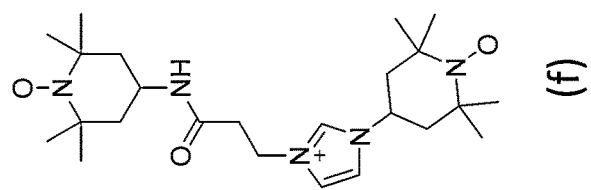
Figure 3F:
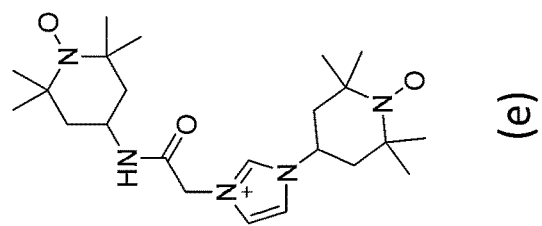
Figure 3F:
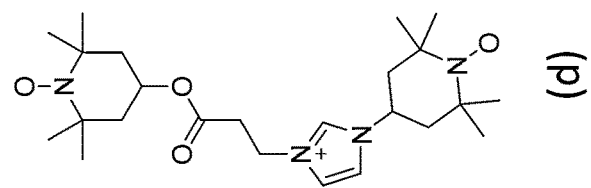
Figure 3F:
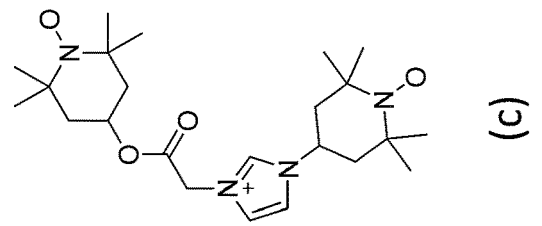
Figure 3F:
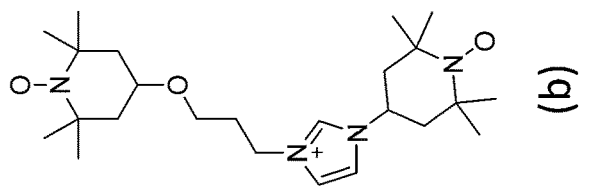
Figure 3F:
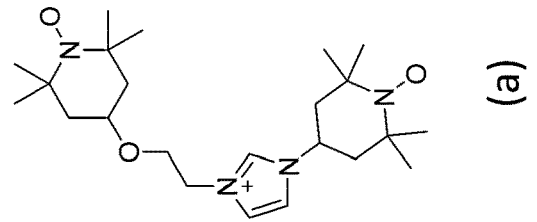
Figure 3G:
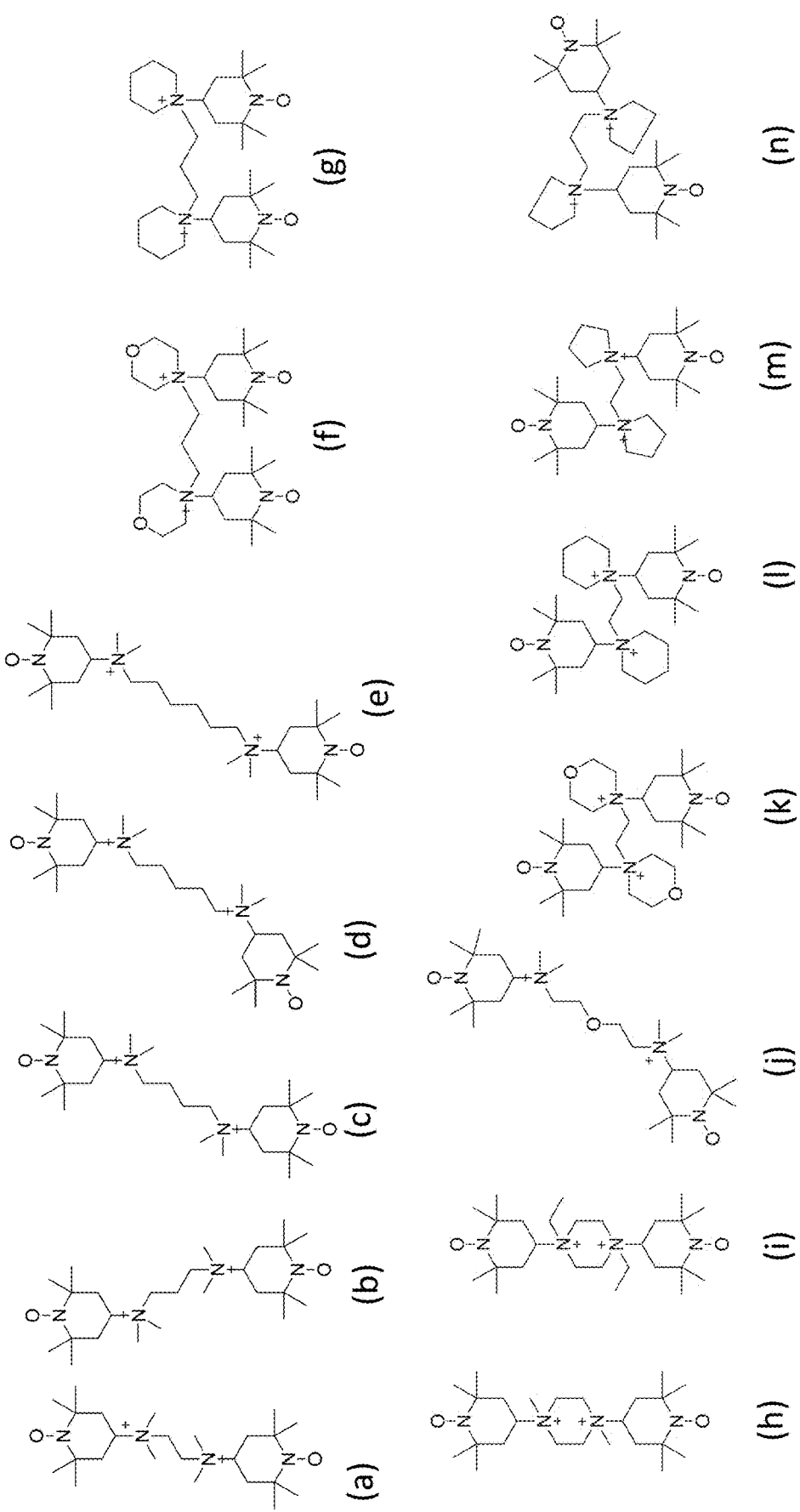
Figure 3H:
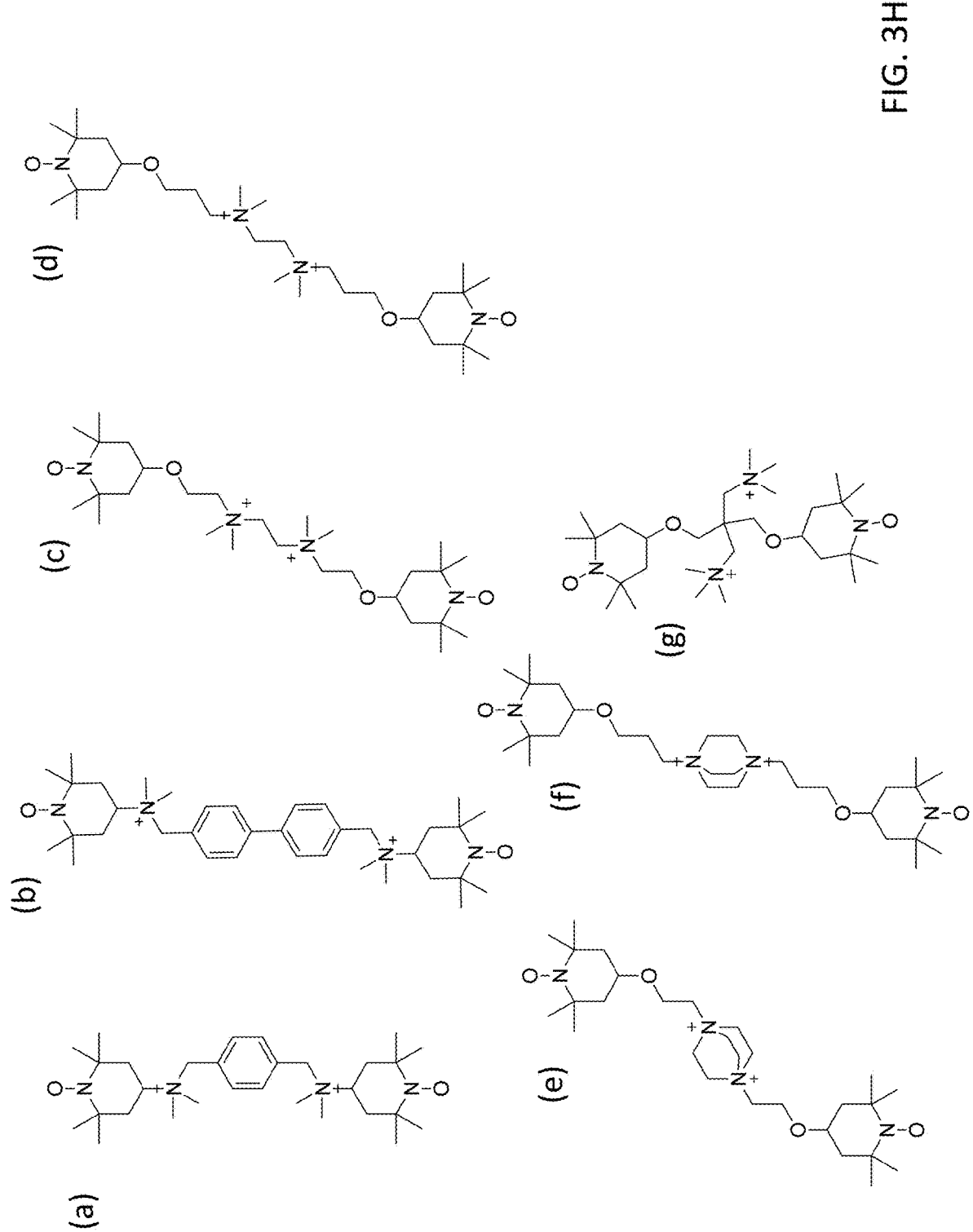
Figure 3J:
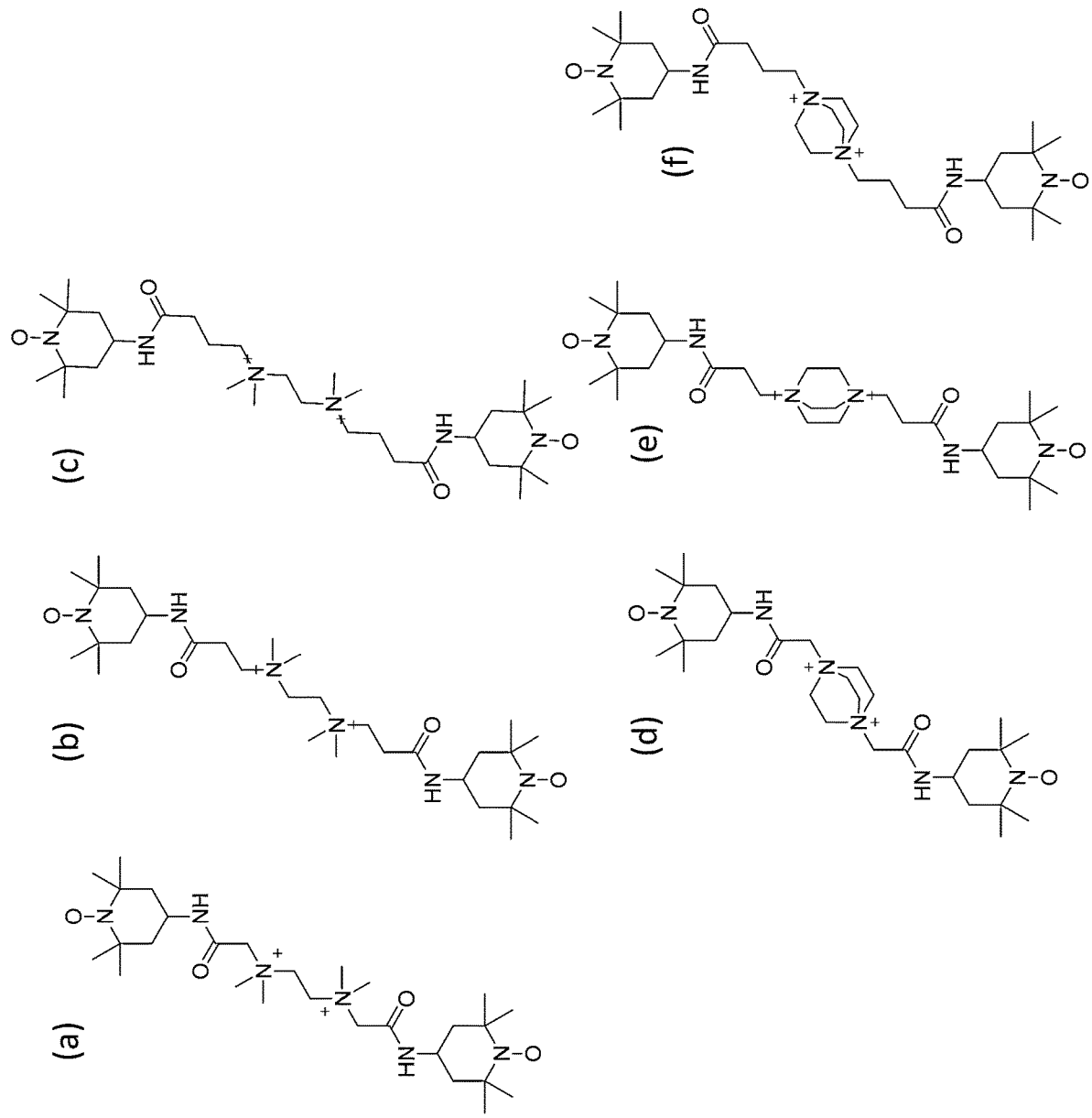
Figure 3K:
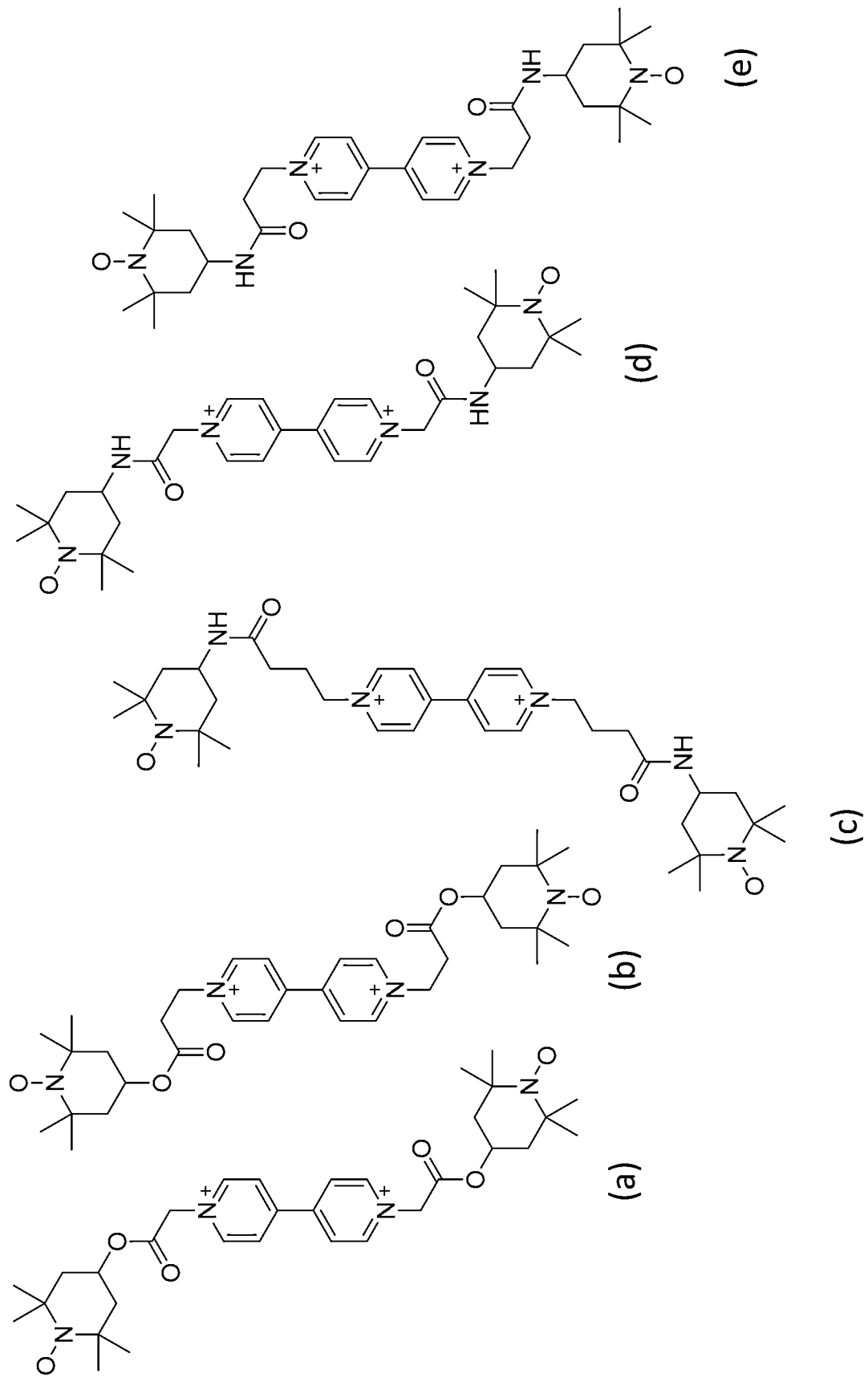
Figure 3L:
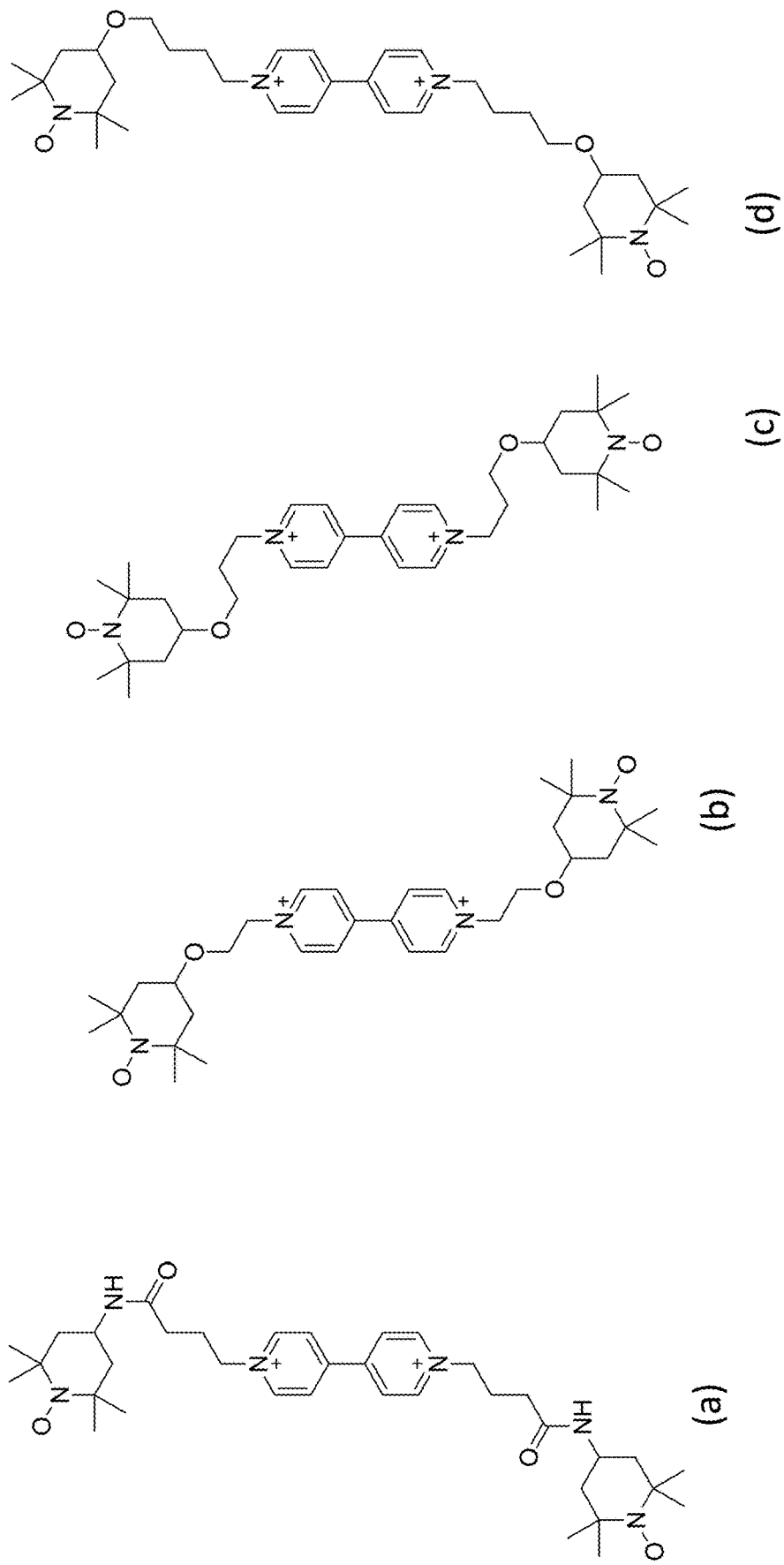
Figure 3M:
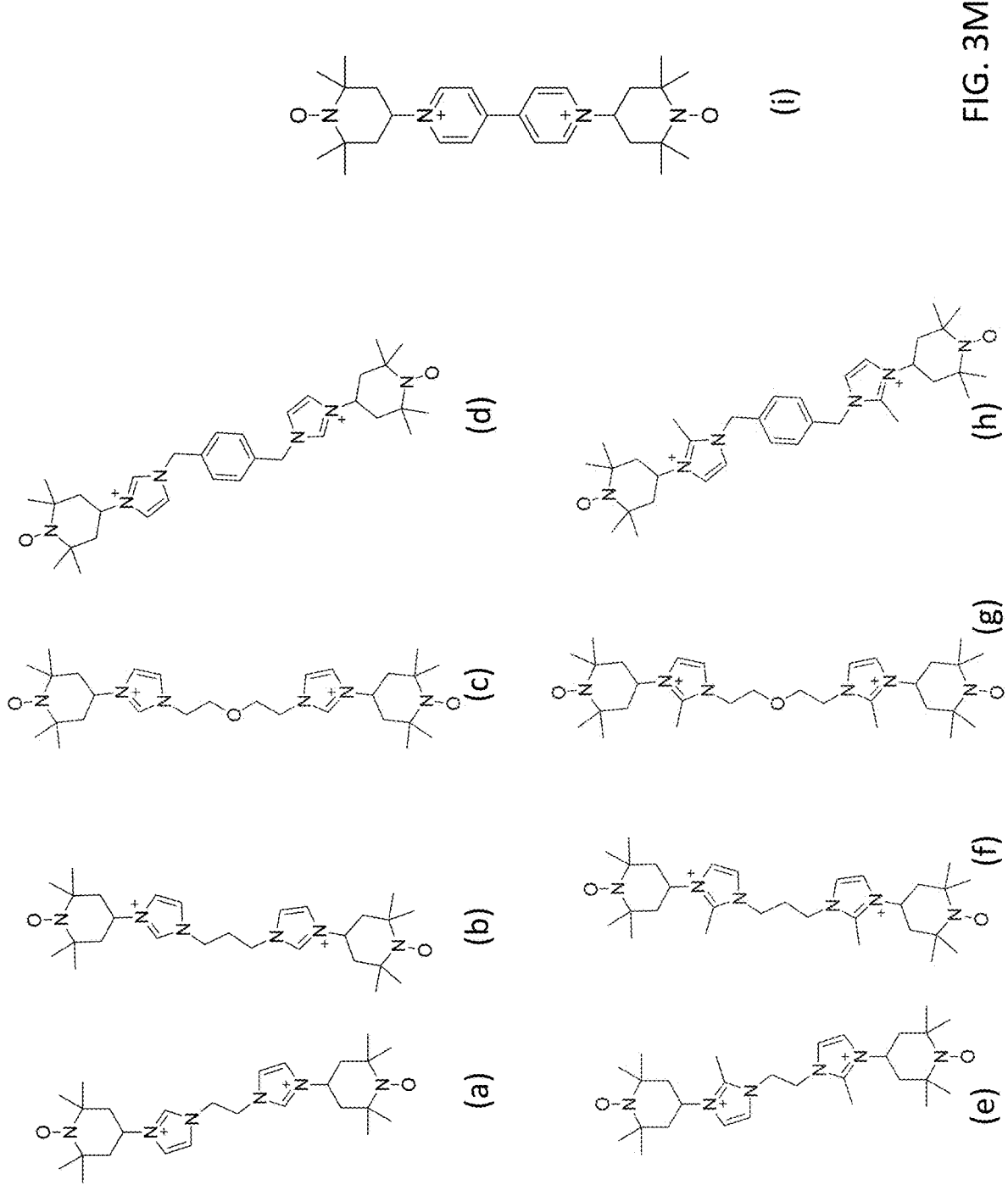
Figure 3N:
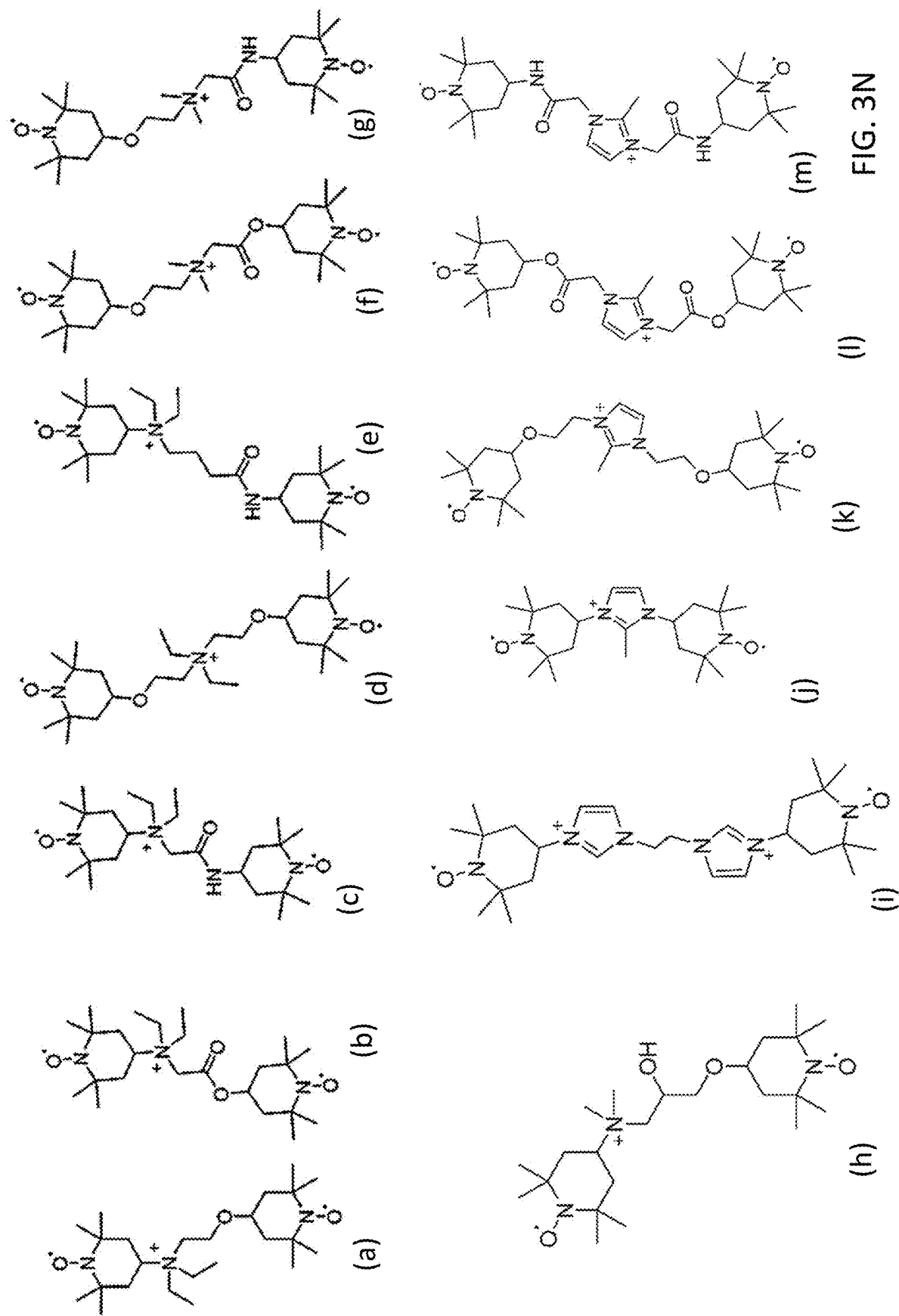
Figure 30:
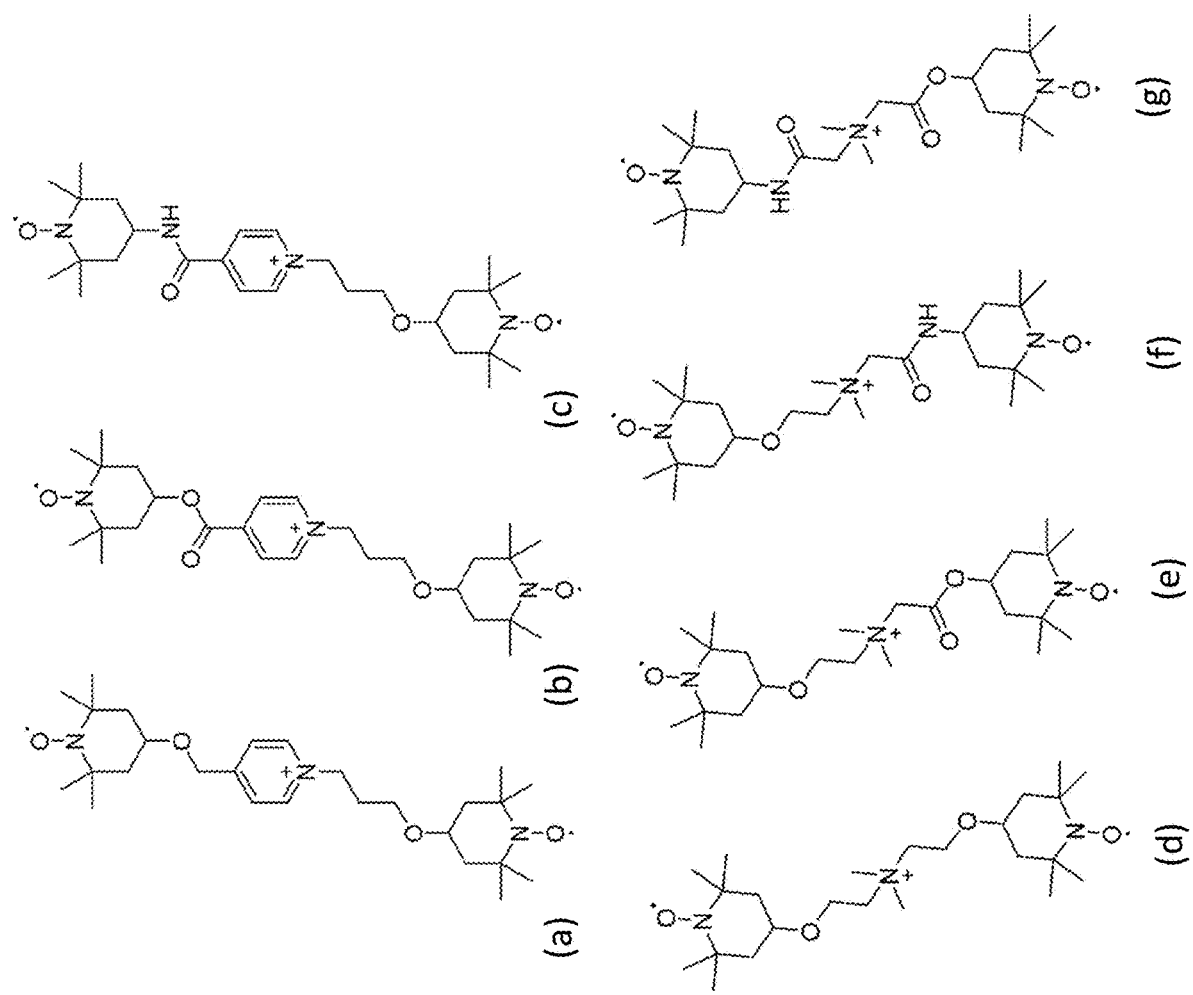
FIG. 30A shows a Zincke reaction of an amine-functionalized nitroxyl radical derivative.
FIG. 30B shows a Zincke reaction of an amine-functionalized nitroxyl radical precursor, followed by the oxidation of the intra-ring amine groups to nitroxyl radicals.
Figure 3P:
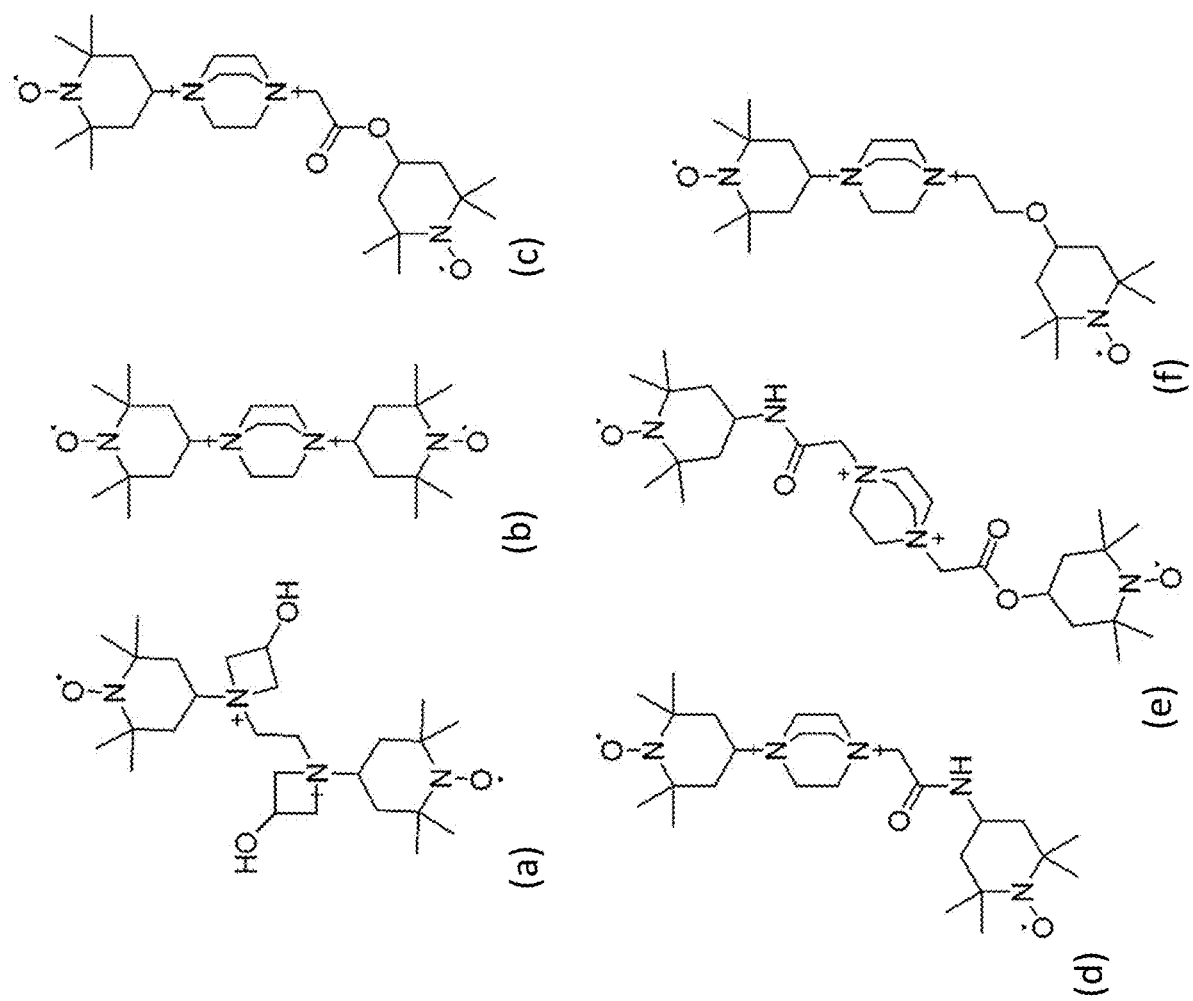
Figure 3Q:
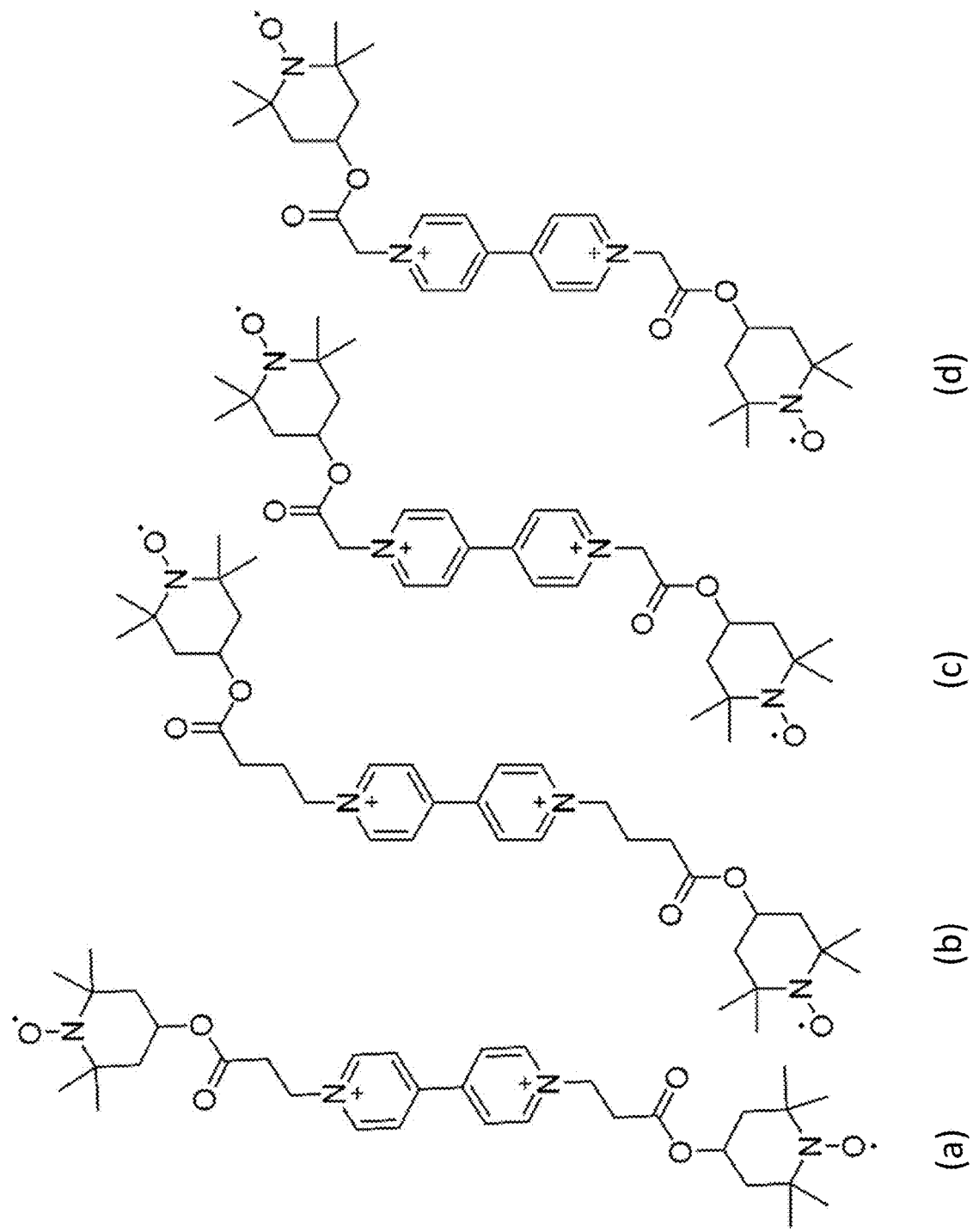
Figure 3R:
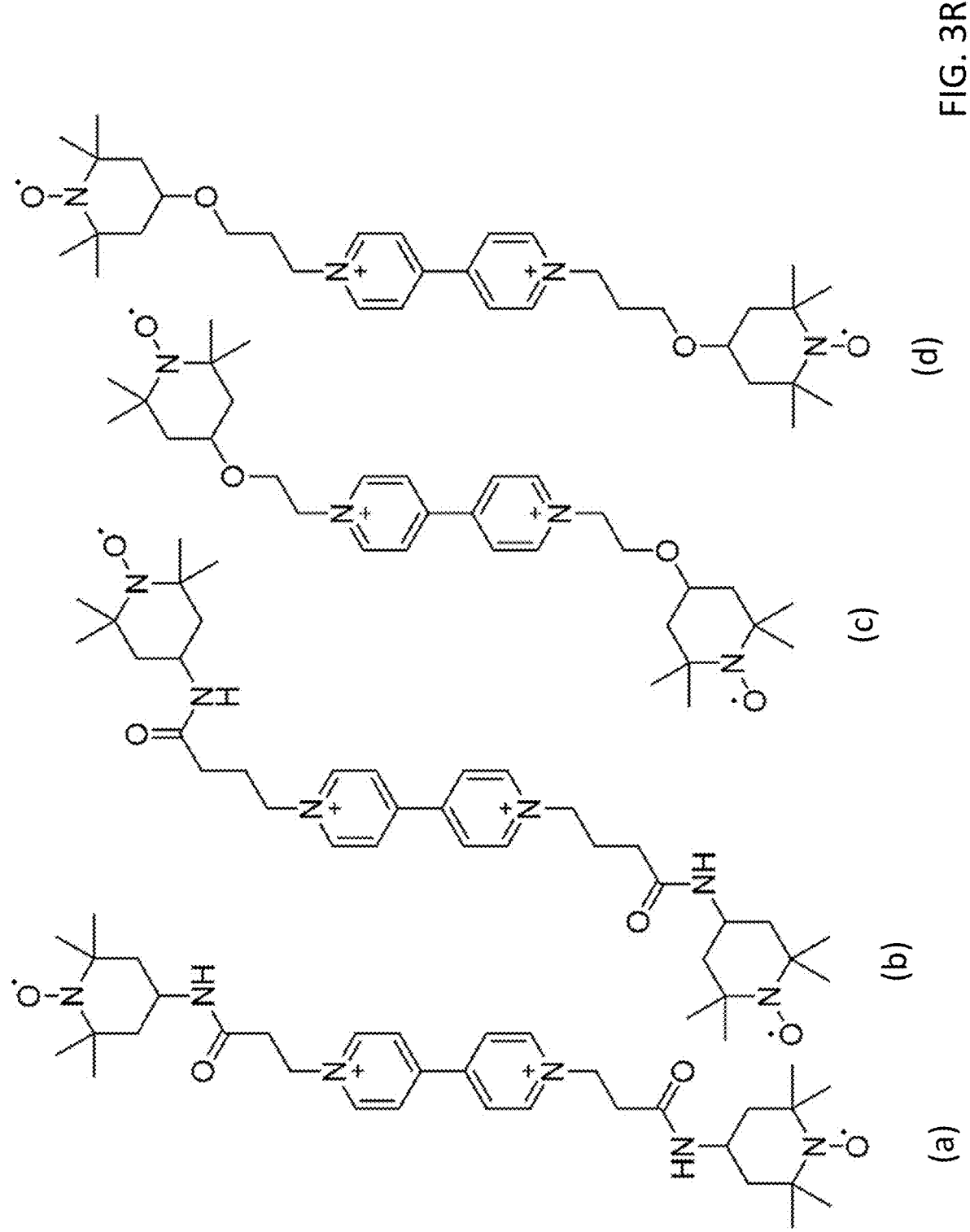
Figure 3S:
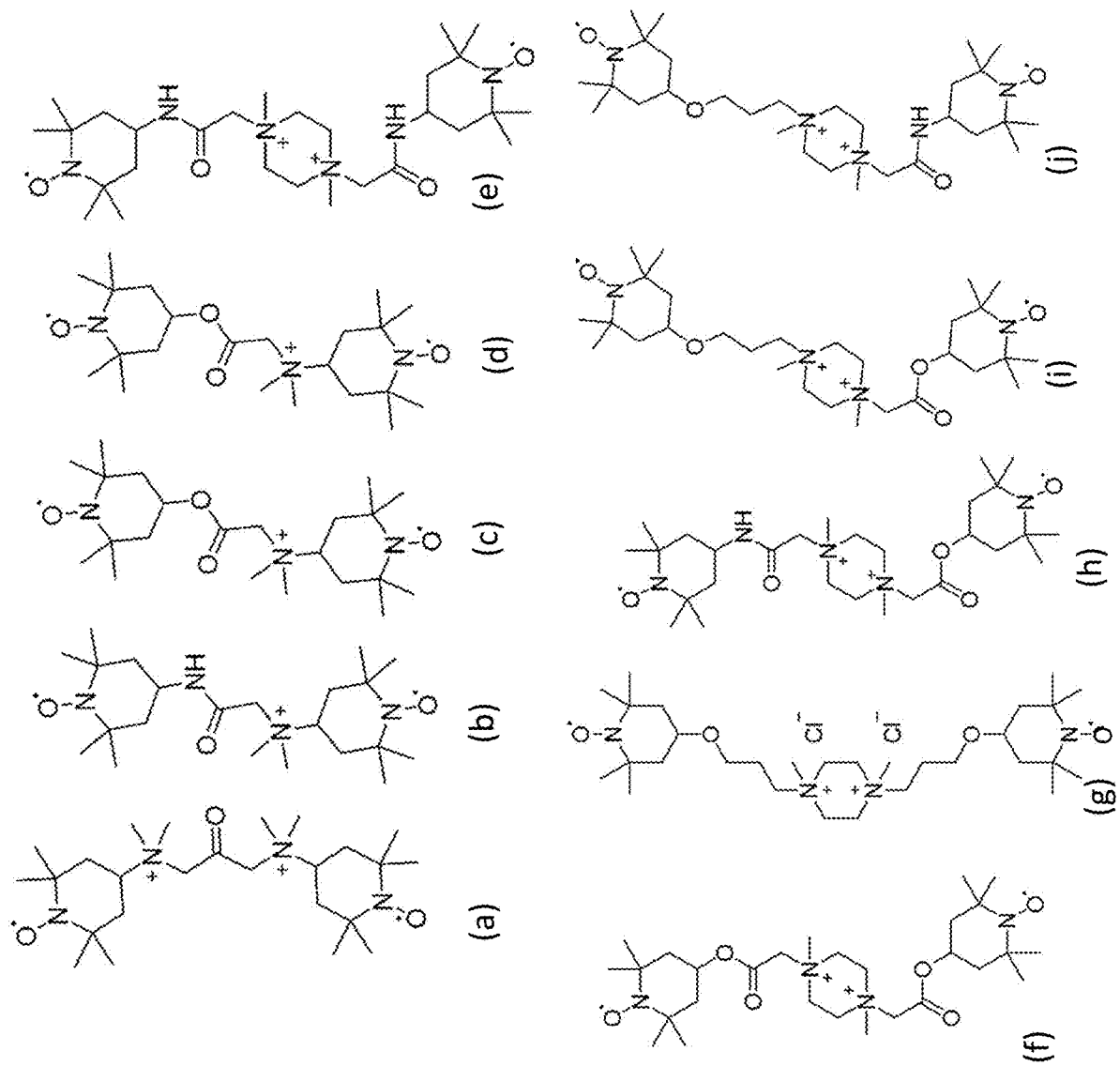

Examples of cyclic nitroxyl radical oligomers of Structure II or III having an $L_R$ linker, wherein ·Rad is a TEMPO group, are shown in FIG. 3A, panels (b)-(i), FIG. 3B, panel (a), FIG. 3F, FIG. 3G, FIG. 3H, panels (a) and (b), FIG. 3M, panels (a)-(c), FIG. 3N, panels (a)-(c), (e), (h), and (i), FIG. 3P, panels (a), (c), (d) and (f), FIG. 3S, panels (a)-(d), FIG. 4A, panels (a)-(f) and (h)-(j), FIG. 4B, panels (a) and (b), FIG. 5A, panels (a)-(d), (f), and (h), and FIG. 5B, panels (a), (b), and (e).

Examples of cyclic nitroxyl radical oligomers of Structure II or III having an $L_{N+}$ linker, wherein ·Rad is a TEMPO group, are shown in FIG. 3B, panels (b) and (c), FIG. 3C, panels (a) through (i), FIGS. 3D and 3E, FIG. 3H, panels (c) through (g), FIGS. 3I through 3L, FIG. 3N, panels (f), (g) and (k)-(m), FIG. 3O, FIG. 3P, panel (e), FIG. 3Q, FIG. 3R, FIG. 3S, panels (e)-(j), and FIG. 5B, panel (e).

Other embodiments of the cyclic nitroxyl radical oligomers that include three, four, or more cyclic nitroxyl radical groups have the general structure:

$[·Rad]_v$-Q-$[L_R$-Q(Rad·)$_z$-$]_y$-Q-$[·Rad]_v$,   (Structure IV)

where ·Rad and $L_R$ are as defined above, each Q can be, independently, an $N_{cat}$ (cationic quaternary ammonium group or nitrogen-containing heteroaromatic cationic group) or an R', as defined above, each v is, independently, 1, 2, or 3, each z is, independently, 1 or 2, and y is an integer having a value in the range from 2 to 12. Commonly in oligomers of this type, $L_R$ is a short alkyl chain, such as a $C_1$-$C_6$ group. Examples of cyclic nitroxyl radicals having this structure, wherein the ·Rad are TEMPO groups, the $L_R$ are —$CH_2$— or —$CH_2CH_2$— groups, and y is 3 or 4 are shown in FIG. 4B, panel (c) and FIG. 5C, panels (e) and (g).

Another aspect of the invention provides cyclic nitroxyl radical oligomers that do not include a cationic quaternary amine group or a nitrogen-containing heteroaromatic cationic group and are, instead, anionic cyclic nitroxyl radical oligomers bearing one or more anionic groups. Members of this group of oligomers include cyclic nitroxyl radical oligomers having the structure:

$L_R$-[R'''-[Rad·]$_p$]$_q$,   (Structure V)

where ·Rad and $L_R$ are as defined above, p is 1 or 2, q is an integer in the range from 1 to 6, and R''' is a secondary amine linkage, a tertiary amine linkage, an amide linkage, an ester linkage, or an ether linkage, and the total number of cyclic nitroxyl radical groups is between 2 and 12. The cyclic nitroxyl radical oligomers having Structure V have at least one anionic group covalently bonded thereto. Anionic groups include, sulfonate, phosphonate, and carboxylate groups, as well as alkyl sulfonate, alkyl phosphonate, and alkyl carboxylate groups. The anionic groups may be bonded to the nitrogen atom of a secondary or tertiary amine or an amide, the carbonyl carbon of an amide, or may be bonded to a carbon atom of an alkyl, cycloalkyl, heterocycloalkyl, cycloalkyl-alkyl, heterocycloalkyl-alkyl, aryl, heteroaryl, arylalkyl, heteroarylalkyl, ether, quaternary carbon, tertiary alkylamine, and/or secondary alkylamine group within the $L_R$ linker. Examples of cyclic nitroxyl radicals having Structure V, wherein the ·Rad are TEMPO groups and sulfonate groups are the anionic groups are shown in FIG. 6A, panels (d)-(h) and FIG. 6B, panels (a)-(e).

Synthesis of Ionic Cyclic Nitroxyl Radical Oligomers.

The ionic oligomers can be synthesized in a stepwise fashion starting with reactive derivatives or reactive precursors that are derived from a cyclic nitroxyl radical. In the description that follows, the synthesis of various TEMPO oligomers from TEMPO derivatives and TEMPO precursors is described. However, it should be understood that analogous reactions can be carried out using other cyclic nitroxyl radical derivatives and precursors, including PROXYL or imidazolidine derivatives or precursors, to form the corresponding ionic oligomers.

Cyclic nitroxyl radical "derivatives" are characterized in that they have a reactive functional group on the heterocyclic ring of the radical. For piperidine derivatives, such as TEMPO derivatives, the reactive functional group is at the 4-position, 3-position, or 5-position of the ring. For pyrrolidine derivatives, such as PROXYL derivatives, the reactive functional group is at the 3-position of the ring, and for the imidazolidine derivatives, the reactive functional group is at the 4-position of the ring. The reactive functional group may be a carbonyl, a primary amine, or a hydroxyl group.

Cyclic nitroxyl radical "precursors" also have the reactive functional group, such as a carbonyl group, primary amine group, or hydroxyl group, on their heterocyclic ring. However, the cyclic nitroxyl radical precursors are further characterized in that the N—O group of the nitroxyl radical is replaced by a secondary amine group (N—H). When a cyclic nitroxyl radical precursor is used as a reactant, the secondary amine group in the product can be oxidized to a nitroxyl radical group using an oxidant. One exemplary reaction scheme for the oxidation of the secondary amine of a TEMPO precursor, using hydrogen peroxide as an oxidant, is shown in FIG. 8. In FIG. 8, the "R" is used generically to represent the remainder of the oligomer to which the TEMPO precursor is covalently bonded.

Examples of TEMPO derivatives include 4-oxo-2,2,6,6-tetramethyl-1-piperidinyloxy (4-oxo-TEMPO) (FIG. 7, panel (a), 4-amino-2,2,6,6-tetramethylpiperidine-1-oxyl (4-amino-TEMPO) (FIG. 7, panel (b), and 4-hydroxy-2,2,6,6-tetramethylpiperidine 1-oxyl (TEMPOL) (FIG. 7, panel (d)). Examples of TEMPO precursors include 2,2,6,6-tetramethyl-4-piperidone (FIG. 7, panel (c)) and 4-amino-2,2,6,6-tetramethylpiperidine (FIG. 7, panel (e)).

The ionic cyclic nitroxyl radical derivatives can undergo various reactions to form the ionic cyclic nitroxyl radical oligomers. The reactions include substitution (i.e., $S_N2$) reactions, ketone or aldehyde diamine condensation reactions, multicomponent reactions (MCR), and Zincke reactions, each of which is described in greater detail below.

$S_N2$ Reactions: Preparation of Nucleophile and Electrophile Derivatives and Precursors.

The reactivity of the cyclic nitroxyl radical derivatives and/or precursors in $S_N2$ reactions can be improved by converting their primary amine, carbonyl, or hydroxyl groups into more nucleophilic or electrophilic groups. For the purposes of this disclosure, the resulting derivatives and precursors bearing the nucleophilic or electrophilic groups are referred to as nucleophilic derivatives and nucleophilic precursors or electrophilic derivatives and electrophilic precursors. By way of illustration, a TEMPO derivative bearing a nucleophilic group is referred to as a nucleophilic TEMPO derivative. Collectively, the nucleophilic and electrophilic precursors and derivatives are referred to herein as secondary building units because they are intermediate products that can be reacted with one another or with organic linkers to form ionic cyclic nitroxyl radical oligomers. The nucleophilic precursors and electrophilic precursors may be monomeric nucleophiles or electrophiles (i.e., nucleophiles or electrophiles having one cyclic nitroxyl radical group) or dimeric nucleophiles or electrophiles (i.e., nucleophiles or electrophiles having two cyclic nitroxyl radical groups).

Detailed reaction schemes for converting the primary amine, carbonyl, or hydroxyl groups of cyclic nitroxyl radical derivatives and/or precursors into more nucleophilic or electrophilic groups are presented in detail in the Examples. A more general description of some reactions that can be used is provided below.

Monomeric Nucleophiles Made from Cyclic Nitroxyl Radical Derivatives and Precursors.

The primary amine group of a cyclic nitroxyl radical derivative or precursor can be made more nucleophilic by the addition of alkyl groups, such as methyl groups, via amine alkylation. In this manner, the primary amine can be converted into a tertiary amine using, for example, an alkyl halide reactant. Illustrative reaction schemes for the methylation of the primary amine of an amine-functionalized TEMPO derivative and an amine-functionalized TEMPO precursor to form a nucleophilic TEMPO derivative and a nucleophilic TEMPO precursor, using formaldehyde and formic acid, are shown in FIG. 9, panels (a) and (b), respectively. Alternatively, a dihaloalkane reactant can be used to carry out a cyclo-alkylation of the primary amine group. In a cyclo-alkylation, the primary amine group is converted into a heterocyclic amine group, such as an aziridine group, an azetidine group, a pyrrolidine group, piperidine group, morpholine group, or a diazinine group.

Figure 10:
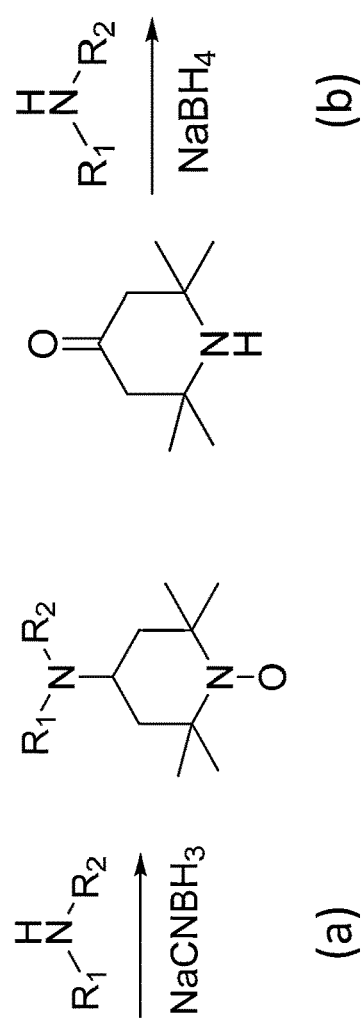
FIG. 10, panels (a) and (b) show the amination of a carbonyl on a TEMPO derivative and a TEMPO precursor, respectively.
Figure 10:
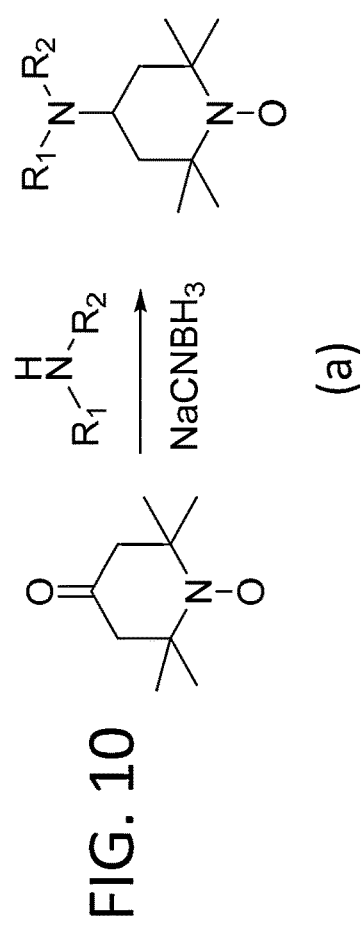

The carbonyl group of a cyclic nitroxyl radical derivative or precursor can be converted into a more nucleophilic group via reductive amination of the ketone to an amine using a reducing agent. Illustrative reaction schemes for the reductive amination of the ketone of a carbonyl-functionalized TEMPO derivative and a carbonyl-functionalized TEMPO precursor to form a nucleophilic TEMPO derivative and a nucleophilic TEMPO precursor are shown in FIG. 10, panels (a) and (b), respectively. In the reaction schemes of FIG. 10, panels (a)-(b), borohydride reducing agents, specifically, sodium cyanoborohydride and sodium borohydride, are used as exemplary reducing agents. $R_1$, $R_2$, and $R_3$, as used throughout this disclosure, are independently selected from hydrogen atoms or alkyl groups.

Figure 11:
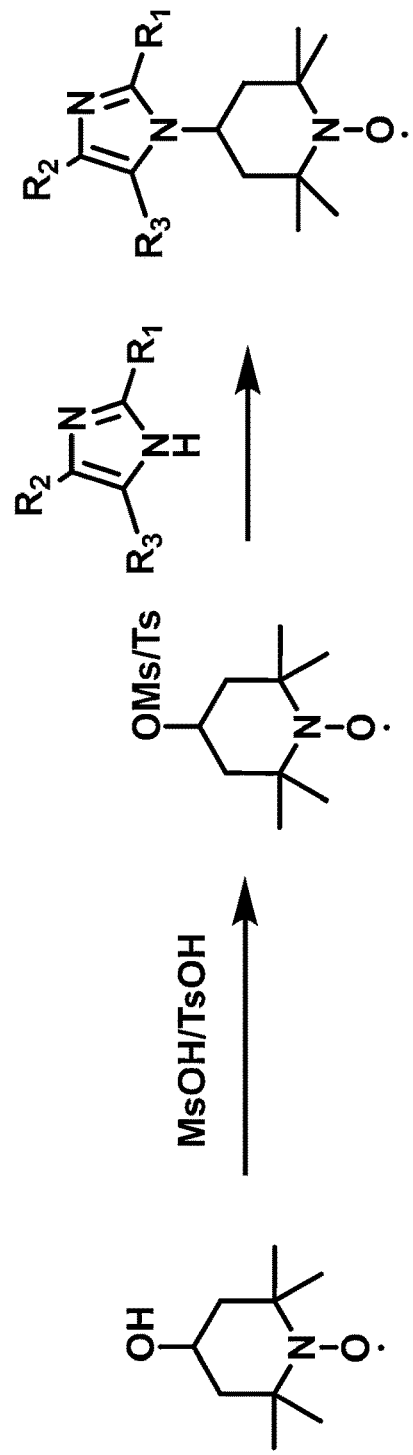
FIG. 11 shows the conversion of a hydroxyl group on a TEMPO derivative to a nucleophilic aromatic tertiary amine.

The hydroxyl group of a cyclic nitroxyl radical derivative or precursor can be converted into a more nucleophilic group via substitution. By way of illustration, this may be accomplished using a two-step process in which the —OH group is converted into a better leaving group, such as an ester of a strong acid, by treating the derivative or precursor with a salt of the leaving group, followed by a substitution reaction with a nucleophilic reactant. An illustrative reaction scheme showing the conversion of a hydroxyl-functionalized TEMPO derivative into a nucleophilic TEMPO derivative is shown in FIG. 11. In this scheme mesylate (OMs) and tosylate (OTs) are used as illustrative leaving groups, which undergo an $S_N2$ substitution reaction with an imidazole (a nucleophilic reactant) to form a nucleophilic TEMPO derivative.

Figure 12:
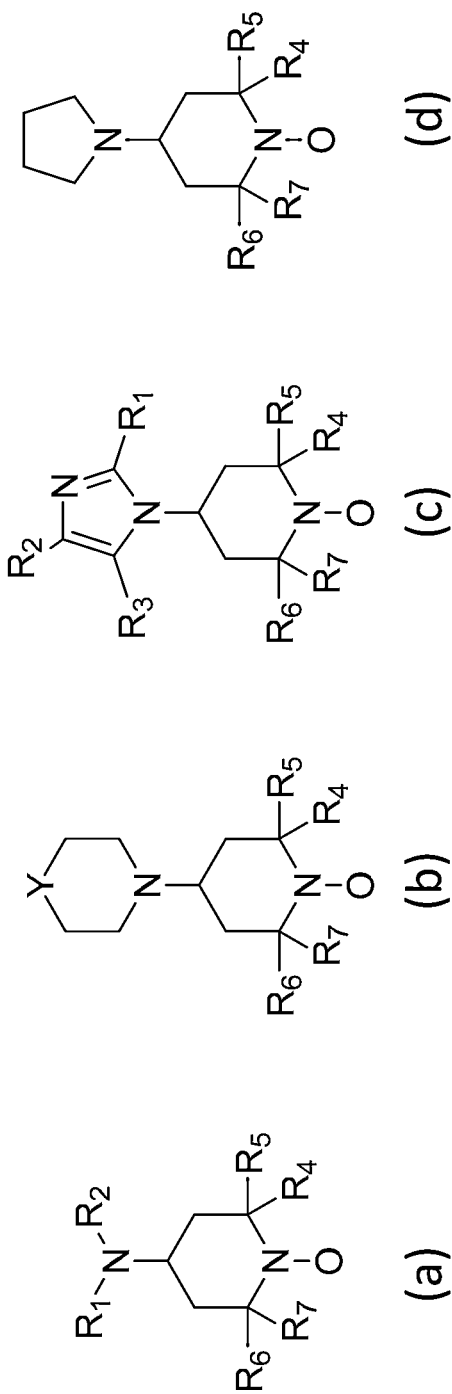
FIG. 12, panels (a)-(d), show examples of nucleophilic TEMPO derivatives.
Figure 13:
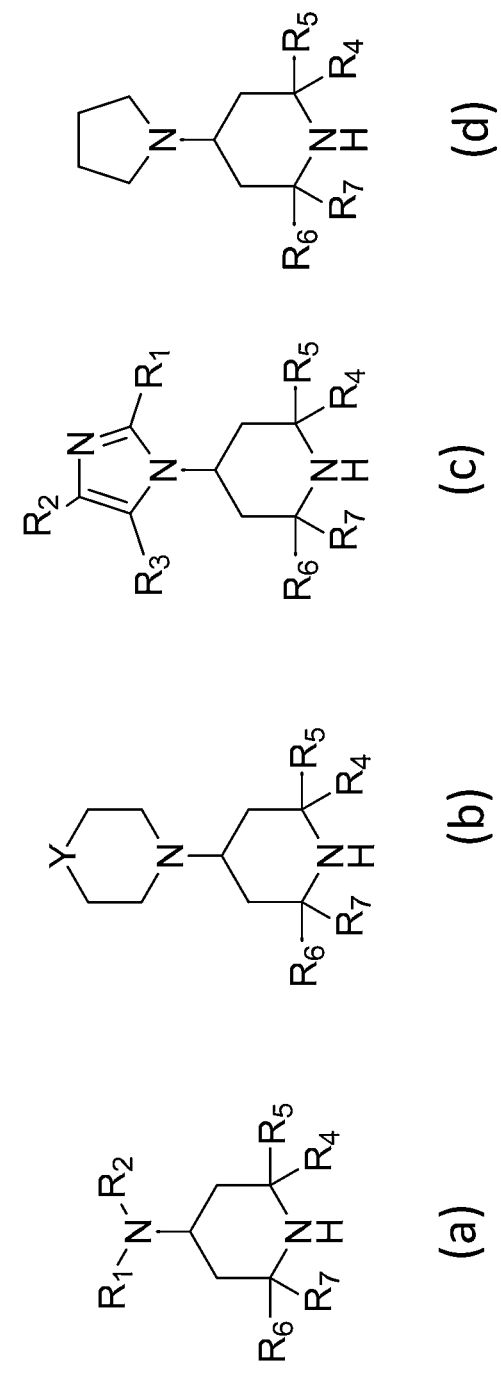
FIG. 13 panels (a)-(d), show examples of nucleophilic TEMPO precursors.
Figure 14:
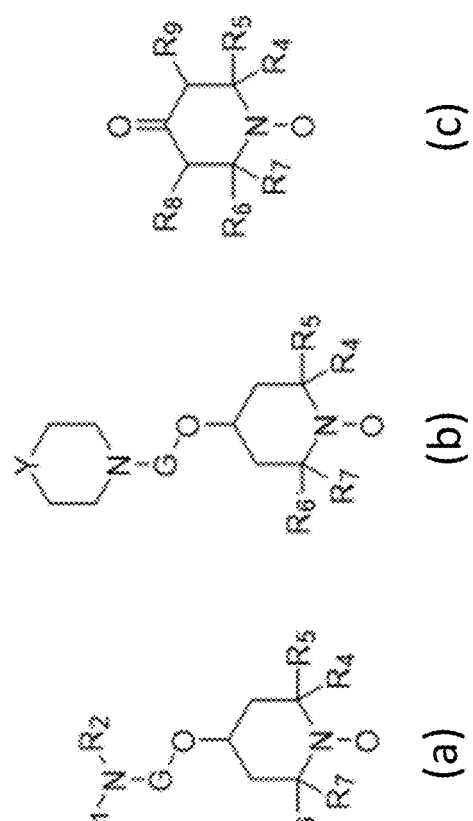
FIG. 14, panels (a)-(c), show additional examples of nucleophilic TEMPO derivatives.

Examples of nucleophilic TEMPO derivatives and nucleophilic TEMPO precursors are shown in FIG. 12, panels (a)-(c), and FIG. 13, panels (a)-(c), respectively, where Y represents an oxygen atom or a —CH₂— group. Other nucleophilic TEMPO derivatives that can be used are shown in FIG. 14, panels (a)-(c). As used throughout this disclosure, G is independently selected from ether groups and alkyl groups and $R_8$ and $R_9$ represent organic substituents, such as alkyl groups, aryl groups, arylalkyl group, heteroaryl group, ether groups, or alkylamine groups.

Monomeric Electrophiles Made from Cyclic Nitroxyl Radical Derivatives and Precursors.

The hydroxyl group of a cyclic nitroxyl radical derivative or precursor can be converted into an electrophilic group by substituting the hydroxyl for a better leaving group, such a halo group (e.g., chloro, bromo, or iodo) or an ester of a strong acid. Alternatively, the primary amine or hydroxyl groups of a cyclic nitroxyl radical derivative or precursor may be reacted with an electrophilic modifier reactant bearing a leaving group. The product of the reaction between a cyclic nitroxyl radical derivative or precursor and an electrophilic modifier reactant is a secondary building unit bearing a leaving group.

The electrophilic modifier reactants are organic molecules having at least two reactive functionalities—one that reacts with the primary amine, hydroxyl, or carbonyl group on the cyclic nitroxyl radical derivative or precursor to form a covalent bond and one that can act as a leaving group during a subsequent $S_N2$ reaction. The at least two reactive groups on the electrophilic modifier reactants may be the same or different. In some embodiments, both of the reactive groups on the electrophilic modifier reactants are good leaving groups. Good leaving groups include halogen atoms (e.g., Cl, Br, I) and tosylate (OTs), mesylate (OMs), and esylate (OEs) groups. Other suitable reactive groups for the electrophilic modifier reactants include carbonyl groups, amino groups, epoxy groups, or a combination thereof. The electrophilic modifier reactants are typically small molecules having, for example, six or fewer carbon atoms, although larger molecules can be used. Electrophilic modifier reactants include, but are not limited to, formaldehyde, $C_1$-$C_6$ haloalkyl epoxides, $C_1$-$C_6$ dihaloalkanes, and $C_1$-$C_6$ haloalkyl halides, such as haloacetyl halides.

Figure 15:
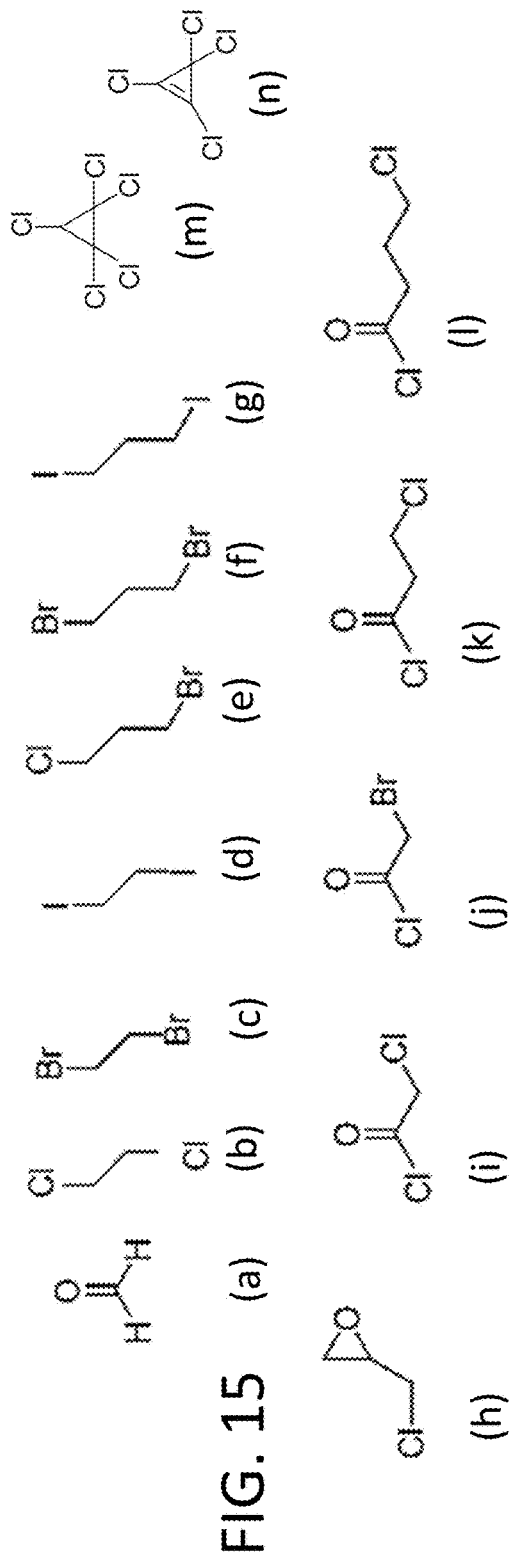
FIG. 15 shows the structures of various electrophilic modifier molecules.
Figure 16A:
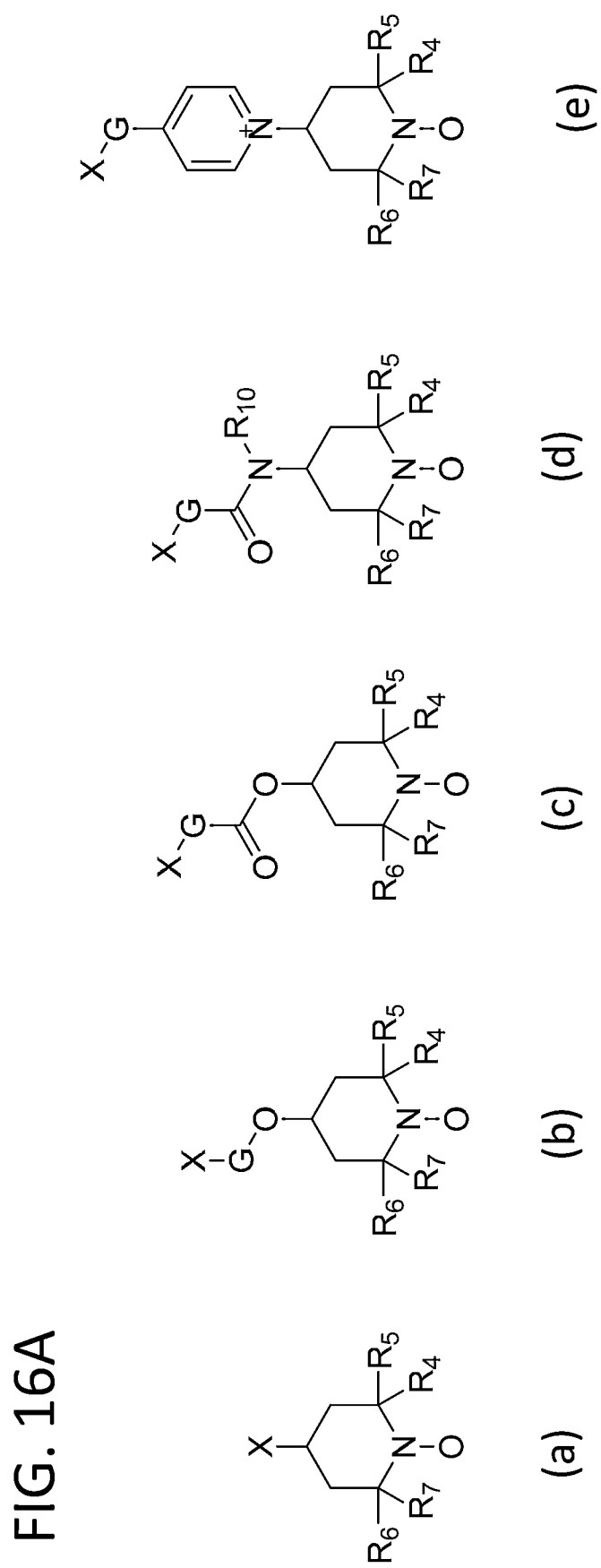
FIG. 16A, panels (a)-(e), shows generic structures for various secondary building units.
Figure 16B:
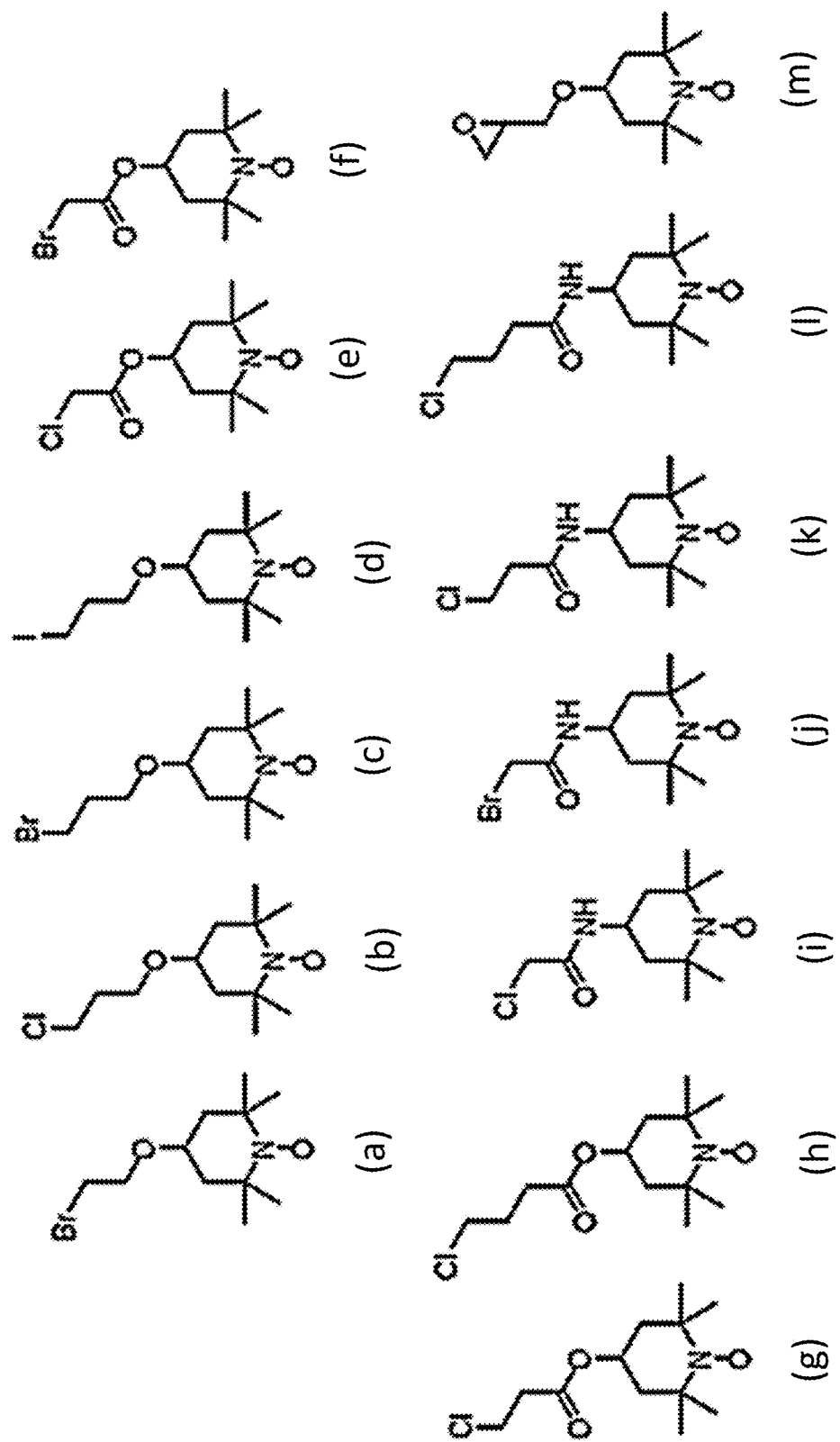
FIG. 16B shows illustrative examples of some specific secondary building units.

Specific examples of electrophilic modifier reactants that can be used to form electrophilic secondary building units are shown in FIG. 15. Generic structures of some electrophilic secondary building units that can be formed by reacting TEMPO derivatives with electrophilic modifier reactants are shown in FIG. 16A, panels (a)-(e), where X represents a leaving group and $R_{10}$ is independently selected from an H atom, an alkyl group, or an organic substituent comprising an anionic group. Specific structures of some illustrative electrophilic secondary building units are shown in FIG. 16B. As illustrated in FIG. 16A, panels (a)-(e) and FIG. 16B, the various secondary building units may have ring substituents such as, but not limited to, leaving group-terminated ester groups, leaving group-terminated ether groups, leaving group-terminated secondary amide groups, and epoxy-terminated ether groups. While the secondary building units in FIG. 16A, panels (a)-(e), and FIG. 16B are made from TEMPO derivatives, analogous secondary building units can be made from other cyclic nitroxyl radical precursors and derivatives.

Figure 17:
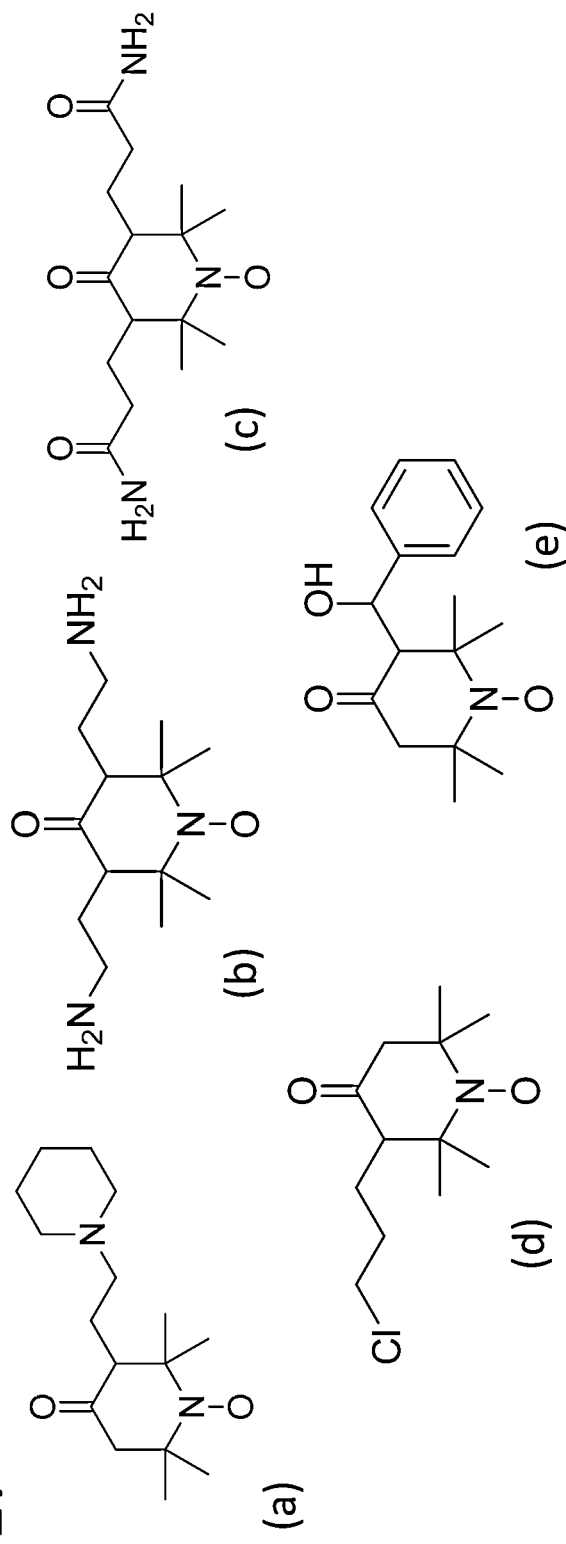
FIG. 17 shows the structures of examples of secondary building units having reactive substituents at the 3- and/or 5-positions of the TEMPO ring.

FIG. 17 shows the structures of examples of nucleophilic and electrophilic secondary building units having reactive substituents at the 3- and/or 5-positions of the TEMPO ring.

Dimeric Nucleophiles and Electrophiles Made from Cyclic Nitroxyl Radical Derivatives and Precursors The nucleophilic and electrophilic derivatives and precursors discussed above and illustrated in FIG. 12, panels (a)-(d), FIG. 13, FIG. 14, panels (a)-(c), FIG. 16A, panels (a)-(e), and FIG. 16B have a single cyclic nitroxyl radical group (e.g., a single TEMPO group) and are, therefore, referred to as monomeric nucleophilic and electrophilic derivatives or precursors. These monomeric nucleophiles and electrophiles are useful in synthesizing ionic cyclic nitroxyl radical dimers and higher order ionic oligomers. However, dimeric nucleophilic and electrophilic derivatives and precursors having two cyclic nitroxyl radical groups (dimeric derivatives) or two cyclic amine groups (dimeric precursors) can also be used as building blocks in the synthesis of ionic cyclic nitroxyl radical dimers, as well as in the synthesis of higher order ionic cyclic nitroxyl radical oligomers, including trimers and tetramers. The two cyclic nitroxyl radical groups or cyclic amine group are connected by a common substituent, as shown in FIG. 18, panels (a) and (b), that provides a linkage between the cyclic nitroxyl radical groups or the cyclic amine groups.

The dimeric nucleophilic and electrophilic derivatives and precursors can be formed from dimeric cyclic nitroxyl radical precursors of derivatives, which can be made by reacting a carbonyl-functionalized nitroxyl radical precursor or derivative with a primary amine-functionalized nitroxyl radical precursor or derivative. N,N-bis(2,2,6,6-tetramethylpiperidine)amine is an example of a dimeric TEMPO precursor that can be used to synthesize dimeric TEMPO nucleophiles and electrophiles. The structure of N,N-bis(2,2,6,6-tetramethylpiperidine) is shown in FIG. 18, panel (a). Rn in FIG. 18, panel (a) and throughout this disclosure, is independently selected from an H atom, an alkyl group, or an organic substituent comprising an anionic group, such as an alkyl sulfonate. The alkyl group in the dimeric precursor of FIG. 18, panel (b), is used for illustrative purposes, other groups terminating in a leaving group, including other $L_R$ groups, as defined previously, can be used. Methods for synthesizing N,N-bis(2,2,6,6-tetramethylpiperidine)amine are described in the Examples.

N,N-bis(2,2,6,6-tetramethylpiperidinyl-1-oxy)amine is an example of a dimeric TEMPO derivative that can be used to form dimeric TEMPO nucleophiles and electrophiles. The structure of N,N-bis(2,2,6,6-tetramethylpiperidinyl-1-oxy) amine is shown in FIG. 18, panel (b). This dimer can be formed by the reaction of 4-oxo-TEMPO and 4-amino-TEMPO, as described in detail in the Examples.

Figure 18:
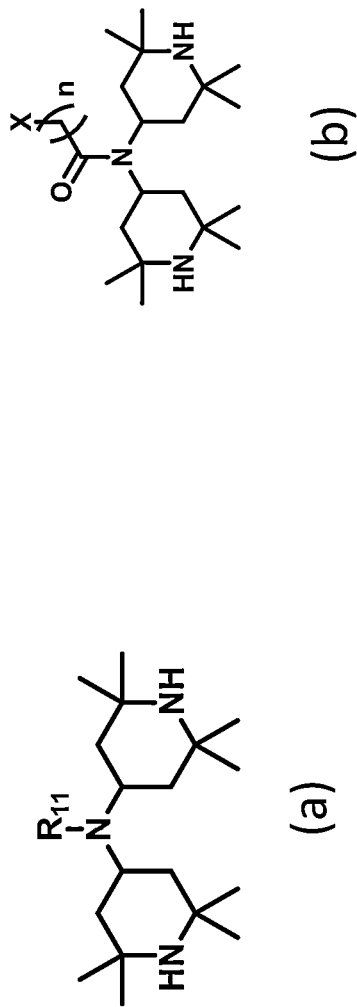
FIG. 18, panels (a) and (b) show examples of a nucleophilic dimeric TEMPO precursor and an electrophilic dimeric TEMPO precursor, respectively.

While FIG. 18, panels (a) and (b), show examples of dimeric TEMPO precursors and derivatives, it should be understood that dimeric precursors and derivatives can also be made from other cyclic nitroxyl radical groups, such as pyrrolidine nitroxyl radicals or imidazolidine nitroxyl radicals. The dimeric precursors and derivatives and the dimeric nucleophiles and electrophiles made therefrom can include two different cyclic nitroxyl radical groups, such as a piperidine nitroxyl radical group and a pyrrolidine nitroxyl radical group.

A secondary amine group connecting the two cyclic nitroxyl radical groups of a dimeric precursor or derivative can be converted into a more electrophilic or nucleophilic group to render the dimeric precursor or derivative more suitable to oligomer formation via an $S_N2$ reaction scheme. This can be achieved, for example, via amine alkylation of a secondary amine to form a more nucleophilic tertiary amine, or by reacting the secondary amine with an electrophilic modifier reactant, as discussed previously.

Synthesis of Ionic Cyclic Nitroxyl Radical Oligomers from Nucleophile and Electrophile Derivatives and Precursors via $S_N2$ Reactions.

Two or more secondary building units (e.g., nucleophilic and/or electrophilic cyclic nitroxyl radical derivatives or precursors) can react directly to form an oligomer via an $S_N2$ reaction. The nucleophilic and electrophilic derivatives and precursors may be monomeric and/or dimeric. Because these reactions involve different nucleophilic and electrophilic derivatives and/or precursors, this process is referred to herein as hetero-oligomerization.

Figure 19:
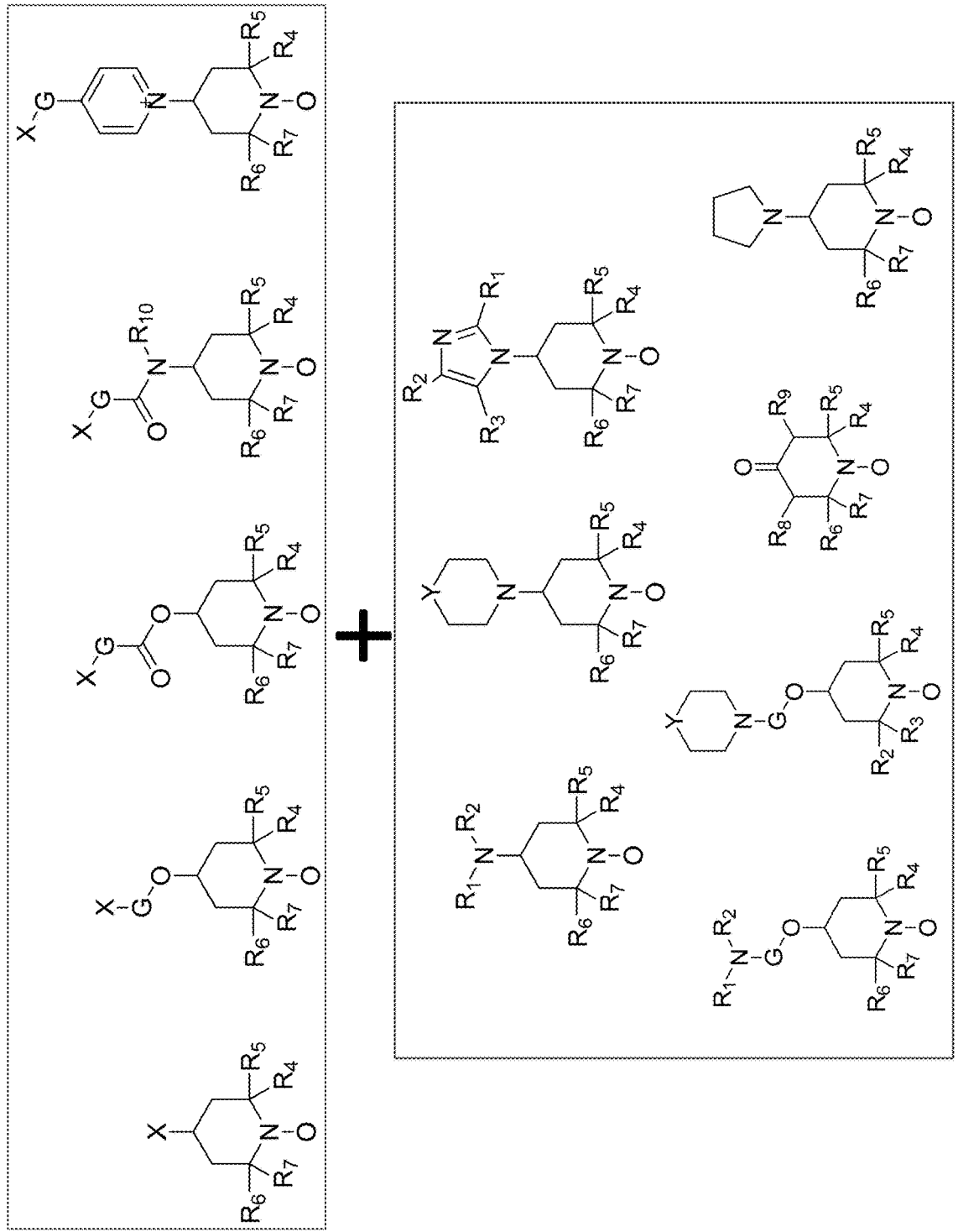
FIG. 19 shows various monomeric electrophilic TEMPO derivatives (upper box) with terminal leaving groups ("X") that can be reacted with various monomeric nucleophilic TEMPO derivatives (lower box) to form various ionic TEMPO oligomers via hetero-oligomerization.

FIG. 19 shows various monomeric electrophilic TEMPO derivatives (upper box) with terminal leaving groups ("X") that can be reacted with various monomeric nucleophilic TEMPO derivatives (lower box) to form various ionic TEMPO oligomers via hetero-oligomerization. As shown in FIG. 19, the cyclic nitroxyl radical groups of the electrophiles and nucleophiles are covalently bonded to the leaving group-terminated electrophilic and nucleophilic ring substituents via a bonding group that is a secondary or tertiary amine group, a nitrogen-containing heteroaromatic ring, an amide linkage, an ester linkage, or an ether linkage, as described previously. The aliphatic and cyclic amine bonding groups are converted into quaternary ammonium groups by the substitution reactions.

In the electrophilic derivatives and precursors, the leaving group is connected to the bonding group by an organic group. Commonly this organic group will be an alkyl group or an ether group, such as an ethylene glycol group. The nucleophilic and electrophilic ring substituents on the cyclic nitroxyl radical groups react to form the core of the ionic cyclic nitroxyl radical oligomers.

Figure 20A:
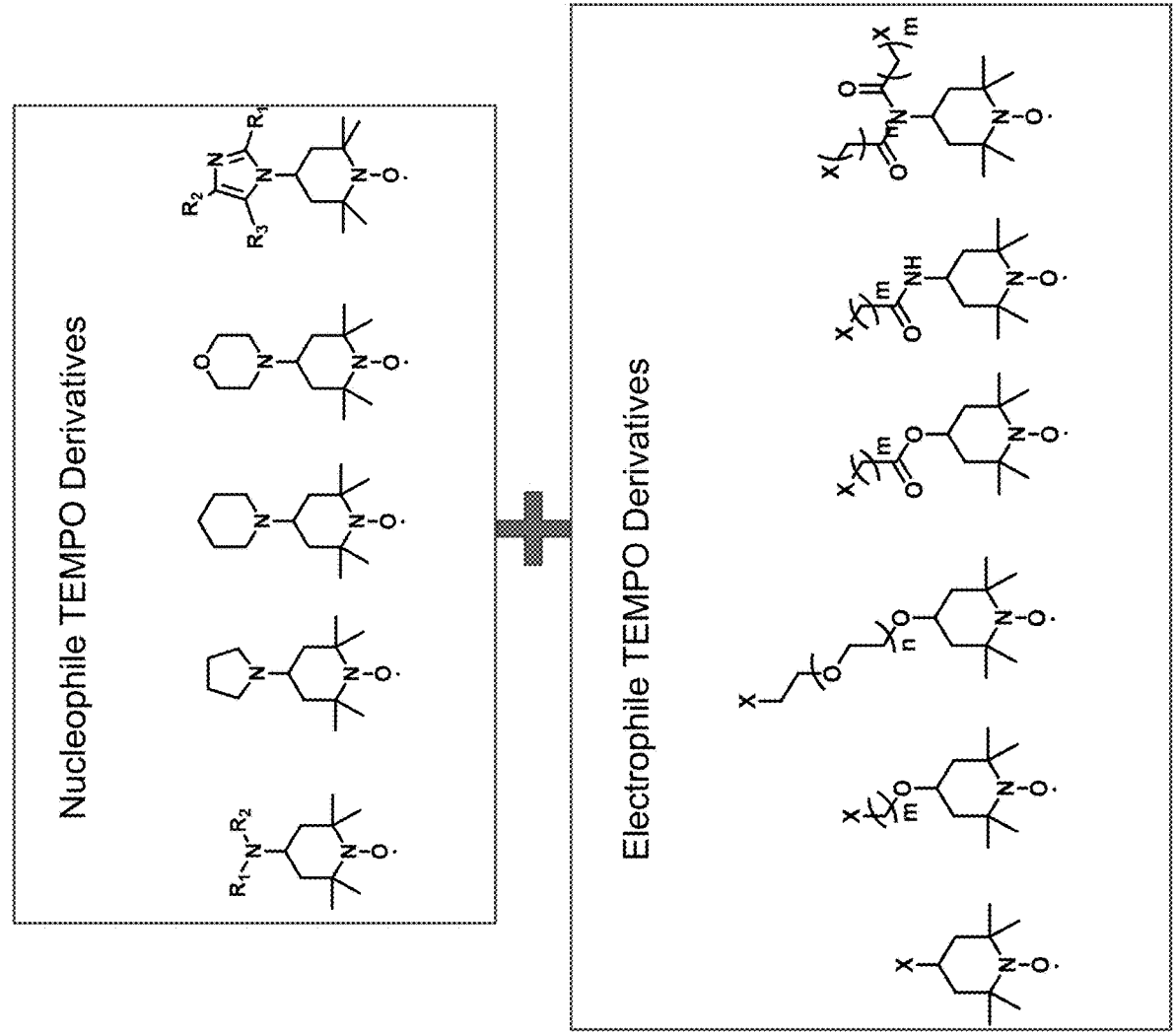
FIG. 20A shows examples of specific nucleophilic TEMPO derivatives (left panel) and electrophilic TEMPO derivatives (right panel) that can react via hetero-oligomerization to form ionic TEMPO dimers.
Figure 20B:
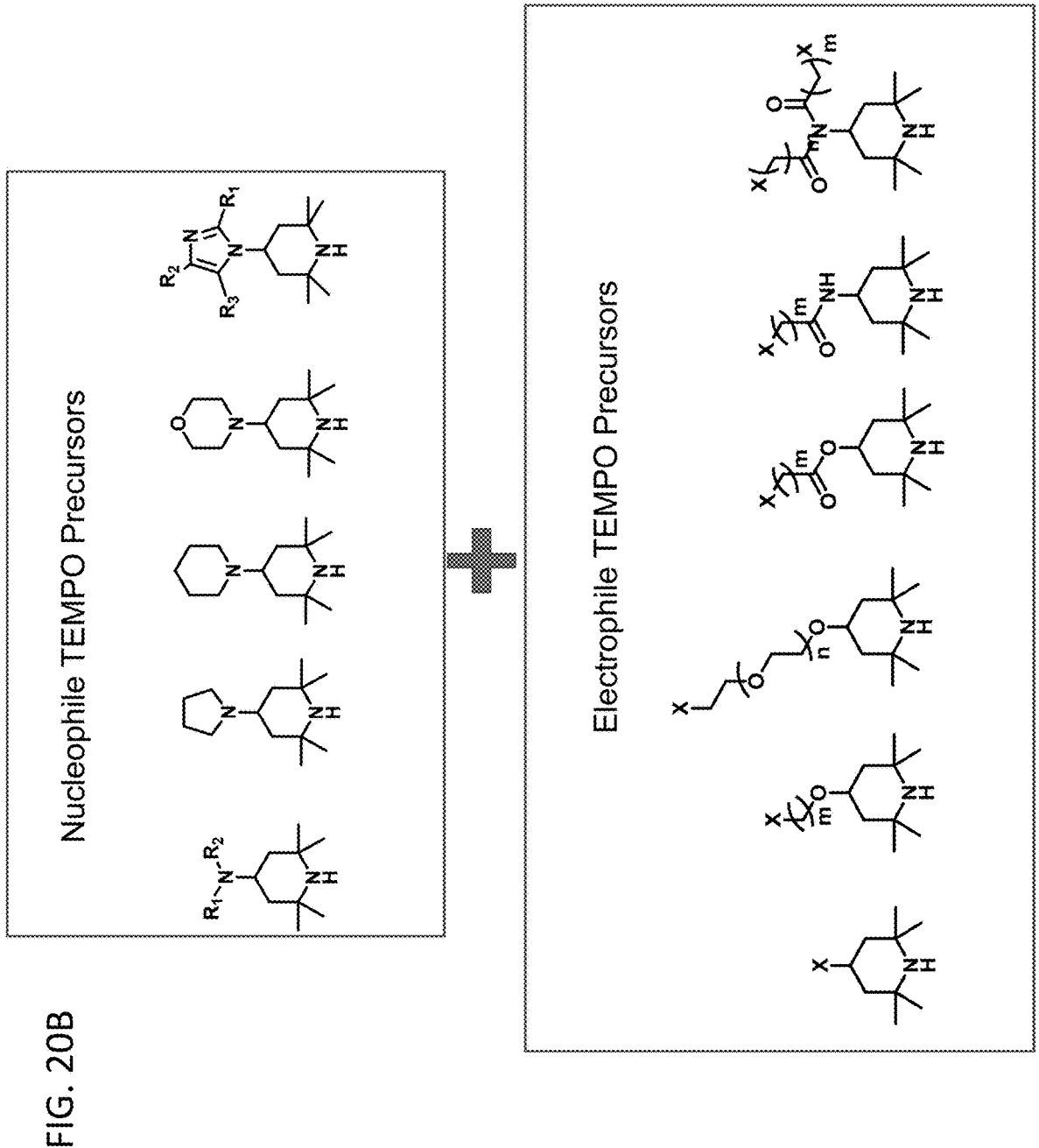
FIG. 20B shows examples of specific nucleophilic TEMPO precursors and electrophilic TEMPO precursors that can react to form ionic TEMPO dimers, after oxidation of the ring amines to nitroxyl radical groups.

FIG. 20A shows examples of specific nucleophilic TEMPO derivatives (top panel) and electrophilic TEMPO derivatives (bottom panel) that can react via hetero-oligomerization to form ionic TEMPO dimers. FIG. 20B shows examples of specific nucleophilic TEMPO precursors and electrophilic TEMPO precursors that can react to form ionic TEMPO dimers, after oxidation of the ring amines to nitroxyl radical groups. The n and m in FIGS. 20A and 20B are independently selected from integers in the range from 1 to 12, including the range from 1 to 6.

Figure 21:
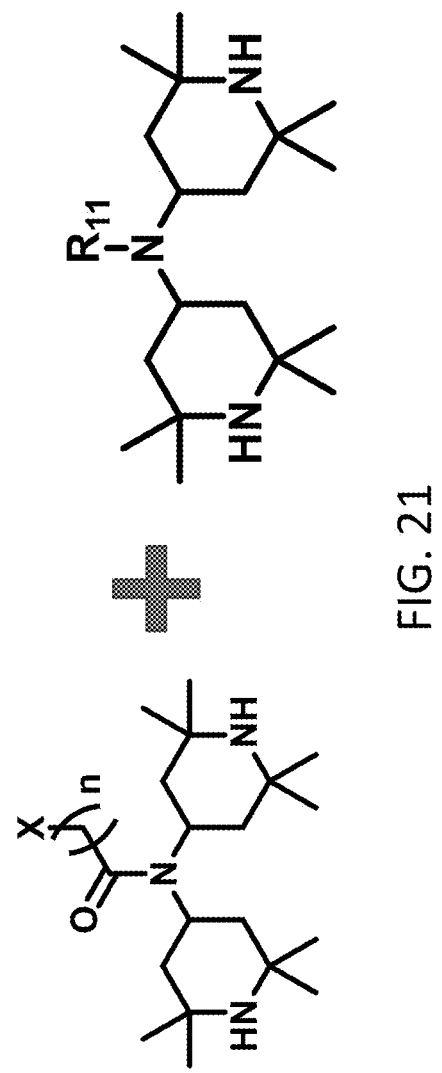
FIG. 21 illustrates a hetero-oligomerization reaction between a dimeric electrophilic TEMPO precursor and a dimeric nucleophilic TEMPO precursor that can reacted to form an ionic TEMPO tetramer, after oxidation of the ring amines to nitroxyl radical groups.

FIG. 21 illustrates a hetero-oligomerization reaction between a dimeric electrophilic TEMPO precursor and a dimeric nucleophilic TEMPO precursor that can react to form an ionic TEMPO tetramer, after oxidation of the ring amines to nitroxyl radicals. In FIG. 21, the alkyl group in the dimeric electrophilic precursor of FIG. 21 is used for illustrative purposes, other groups terminating in a leaving group, including other $L_R$ groups, as described previously, can be used.

Homo-oligomerization is an alternative to hetero-oligomerization. In homo-oligomerization two or more secondary building units can be reacted with an organic linker molecule that increases the size of the oligomer. Like the modifier molecules discussed above, the organic linker molecules have at least two reactive functionalities, such as leaving groups (e.g., Cl, Br, I, OTs, OMs and/or and OEs groups), carbonyl groups, amino groups, epoxy groups, or a combination thereof. The two or more secondary building units (e.g., nucleophilic or electrophilic derivatives or precursors) can be the same or different. The nucleophilic and electrophilic ring substituents of the derivatives and/or precursors react with the linker to form the core of the ionic cyclic nitroxyl radical oligomers.

The homo-oligomerization reactions between the secondary building units and the derivatives or precursors may be $S_N2$ reactions in which two or more nucleophilic cyclic nitroxyl radical derivatives and/or precursors undergo substitution reactions with an electrophilic linker having two or more leaving groups. Alternatively, two or more electrophilic cyclic nitroxyl radical derivatives and/or precursors can undergo substitution reactions with a nucleophilic linker having two or more nucleophilic groups. The nucleophilic and electrophilic nitroxyl radical derivatives and precursors used in the homo-oligomerization may be monomeric and/or dimeric and may be the same as those used in the hetero-oligomerization reactions discussed above.

The nucleophilic organic linkers may include two or more terminal aliphatic or cyclic (including aromatic) tertiary amine groups that are converted into quaternary ammonium bonding groups via an $S_N2$ reaction with an electrophile derivative or precursor, and/or may include two or more terminal uncharged nitrogen-containing heteroaromatic groups that are converted into nitrogen-containing heteroaromatic cation bonding groups via an $S_N2$ reaction with an electrophile derivative or precursor. The electrophilic organic linkers may include two or more terminal leaving groups. The terminal tertiary amine or heteroaromatic groups of the nucleophilic organic linkers may be connected to one another via various $L_R$ groups, as previously defined. Similarly, the terminal leaving groups of the electrophilic organic linkers may be connected to one another by various $L_R$ groups, as previously defined, including, but not limited to, alkyl groups, ether groups, aryl groups, and arylalkyl groups. Thus, some embodiments of the organic linker molecules are arylalkyl molecules having one or more aromatic rings and two or more alkyl halide ring substituents (e.g., benzyl halides), aryl halides having two or more halogen atoms bonded directly to a carbon of an aromatic ring, $C_1$-$C_6$ dihaloalkanes, aryl aldehydes having two or more aldehyde groups bonded directly to a carbon of an aromatic ring, alkyl aldehydes having two or more aldehyde groups bonded to a $C_1$-$C_6$ aliphatic chain, diamines having two primary amine groups bonded to a $C_1$-$C_6$ aliphatic chain, diamines having two ternary amine groups bonded to a $C_1$-$C_6$ aliphatic chain, heterocyclic molecules having one or more heterocyclic rings with two or more tertiary amine groups in the one or more heterocyclic rings, and halogenated branched $C_1$-$C_{10}$ alkyl alcohols comprising two or more terminal hydroxyl groups and two or more terminal halogen atoms.

Figure 22:
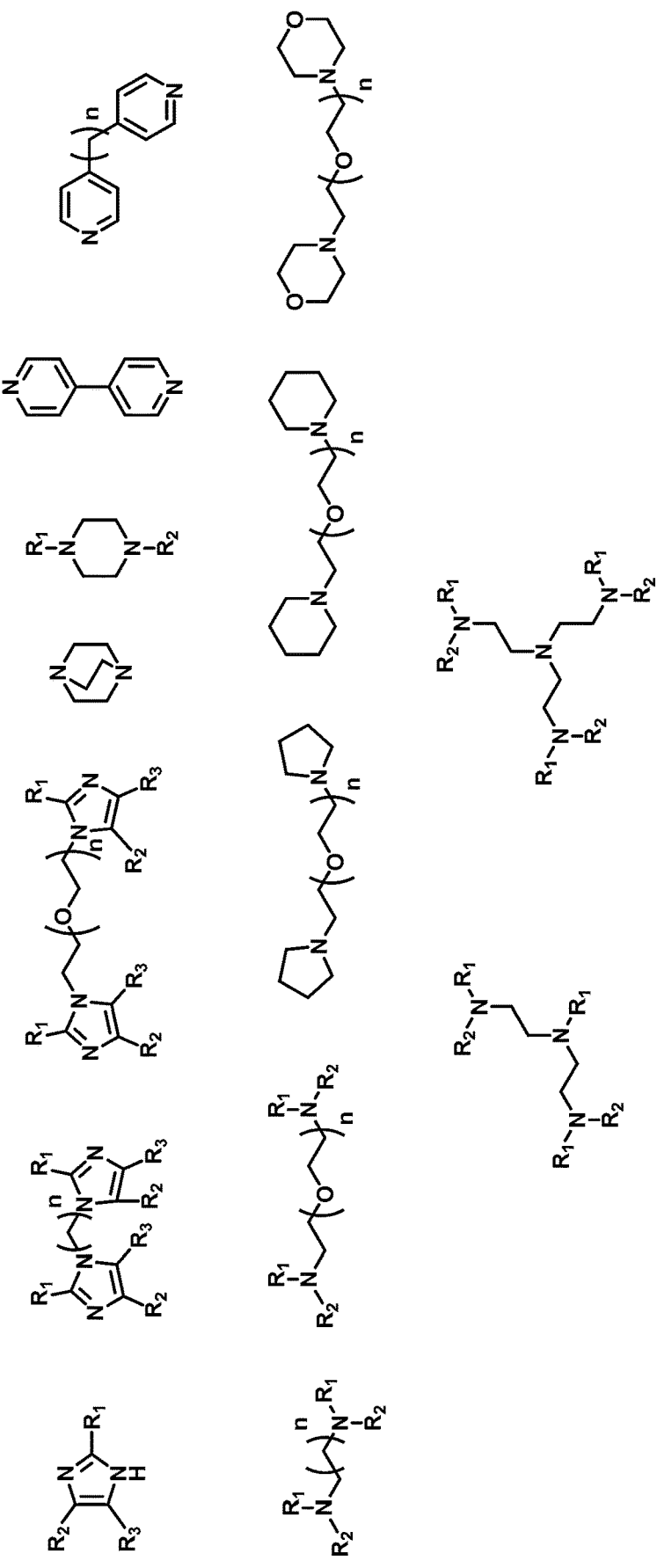
FIG. 22 shows illustrative examples of nucleophilic linkers.
Figure 23:
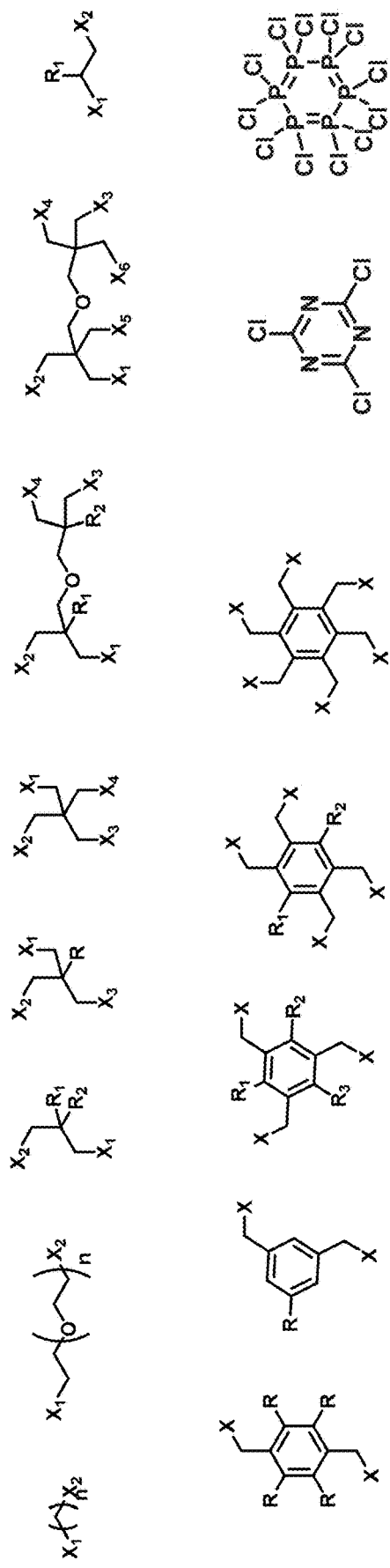
FIG. 23 shows illustrative examples of electrophilic linkers.

Illustrative examples of nucleophilic linkers are shown in FIG. 22. Illustrative examples of electrophilic linkers are shown in FIG. 23, where the different subscripts on the X leaving groups (1, 2, 3, 4) are used to indicate that a linker can have different leaving groups. The linkers of FIGS. 22 and 23 can be reacted with the monomeric and dimeric electrophilic derivatives and precursors of FIGS. 16A, 16B, FIG. 18, panel (b), FIG. 19, upper box, FIGS. 20A and 20B and with the monomeric and dimeric nucleophilic derivatives and precursors shown in FIGS. 12, 13, 14, FIG. 18, panel (a), FIG. 19, lower box, and FIGS. 20A and 20B, as well as with other electrophilic and nucleophilic derivatives and precursors taught herein.

In practice, the organic linker molecules may include a protecting group that is subsequently deprotected during the synthesis reaction. For example, the nitrogen of a nitrogen-containing heterocyclic ring, such as imidazole, can be protected with a protecting group, such as a trimethylsilyl group.

Figure 24:
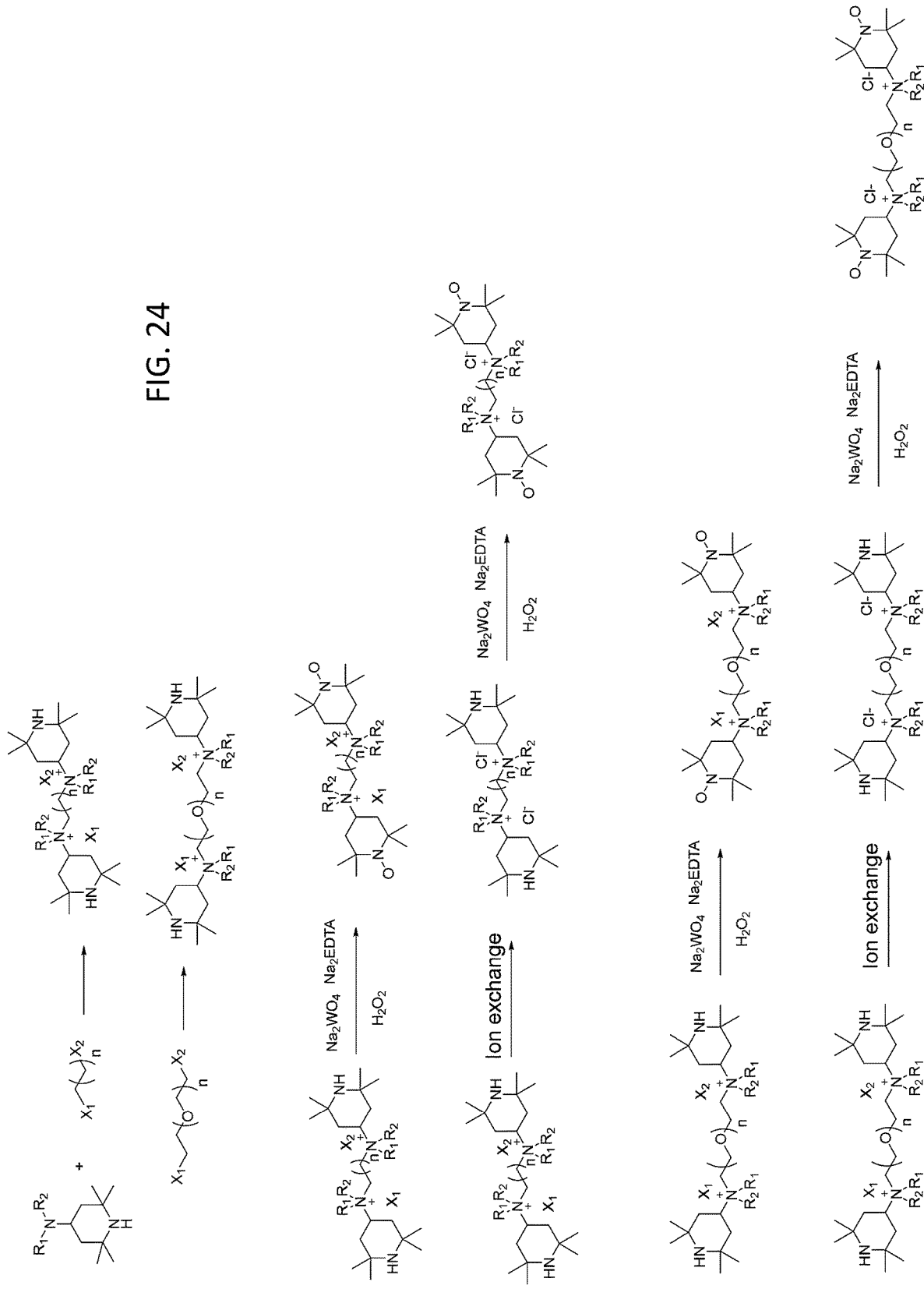
FIG. 24 shows $S_N 2$-based homo-oligomerization schemes for forming a TEMPO dimer from a nucleophilic TEMPO precursor and either an alkyl group based electrophilic linker or an ethylene glycol-based electrophilic linker.

For illustrative purposes, $S_N2$-based homo-oligomerization schemes for forming a TEMPO dimer from a nucleophilic TEMPO precursor and either an alkyl group based electrophilic linker, or an ethylene glycol-based electrophilic linker are shown in FIG. 24. The leaving groups on the linkers can be, for example, Cl, Br, I, OTs, OMs, OEs, or a combination of two or more thereof, and n is an integer having a value in the range of, for example, 1 to 12.

Synthesis of Ionic Cyclic Nitroxyl Radical Oligomers Directly from Dimeric Cyclic Nitroxyl Radical Derivatives and Precursors.

Figure 25A:
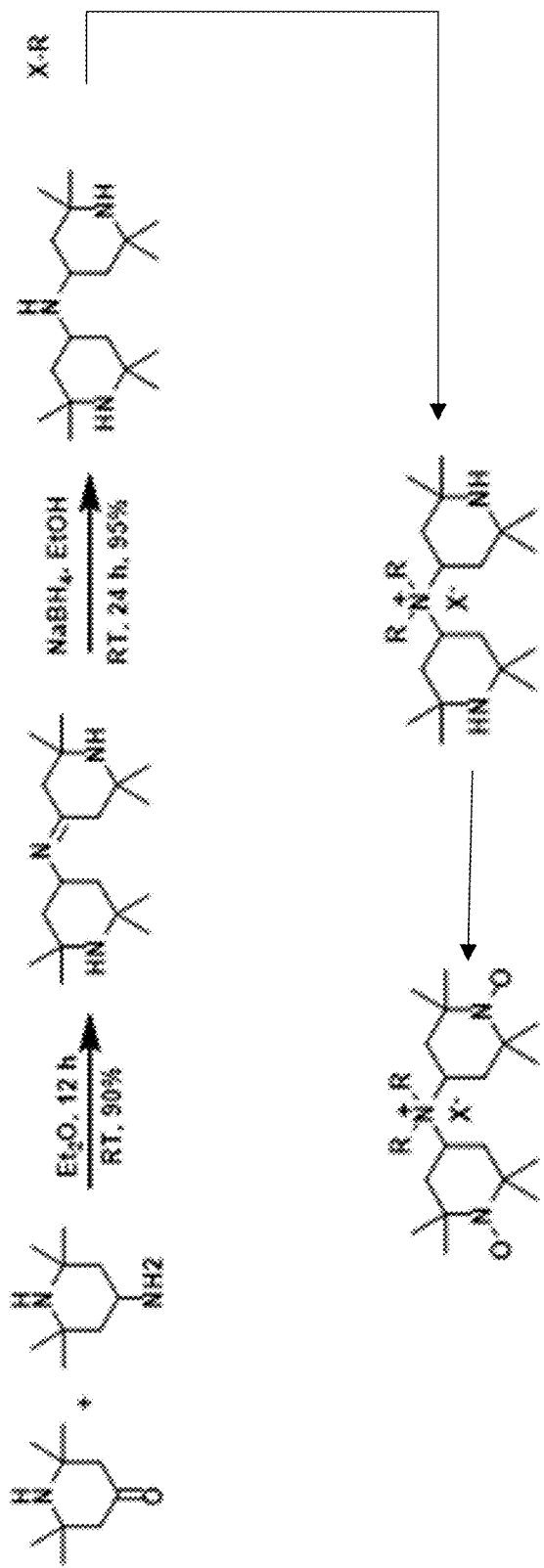
FIG. 25A illustrates the synthesis of a cyclic nitroxyl radical dimer having an aliphatic quaternary ammonium group, starting from a carbonyl-functionalized TEMPO precursor and a primary amine-functionalized TEMPO precursor.

As discussed above, the dimeric cyclic nitroxyl radical derivatives and precursors can be converted into nucleophilic and electrophilic reactants for the synthesis of ionic oligomers via $S_N2$ reactions. However, the secondary amine group connecting the two cyclic nitroxyl radical groups in the dimeric derivatives and precursors can also be converted directly into an aliphatic quaternary ammonium group via amine alkylation to form a cyclic nitroxyl radical dimer. FIG. 25A illustrates this approach to cyclic nitroxyl radical dimer formation, starting from a carbonyl-functionalized TEMPO precursor and a primary amine-functionalized TEMPO precursor, where the R groups in this figure represent alkyl groups.

Figure 25B:
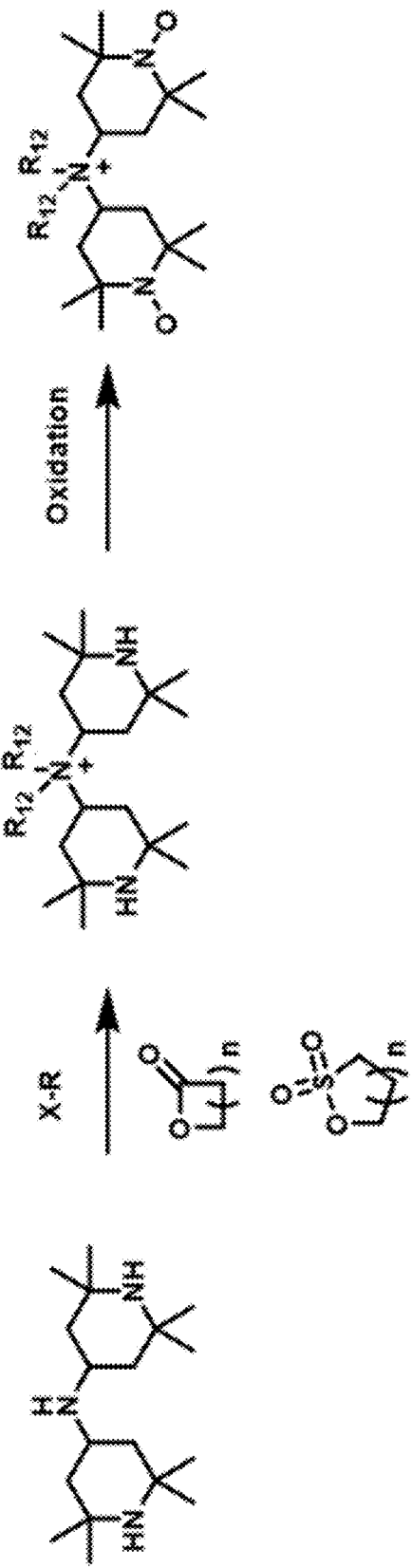
FIG. 25B shows an alternative synthesis in which the nitrogen atom of the quaternary ammonium is substituted with alkyl sulfonate and/or alkyl carbonate groups.

FIG. 25B shows another reaction scheme for converting a secondary amine group connecting two cyclic nitroxyl radical groups into a quaternary ammonium group via amine alkylation. Here, a cyclic sulfate, cyclic phosphate, and/or cyclic carbonate and an electrophilic reactant (generically represented by "X—R" in this figure) are used as precursors for alkyl chain substituents ($R_{12}$) bearing sulfonate, phosphonate, or carbonate groups on the quaternary ammonium group of the resulting ionic TEMPO dimer. It should be understood that the analogous reaction can be conducted on a connecting amine group that is a tertiary amine.

Alternatively, the secondary amine group connecting the two cyclic nitroxyl radical groups of a dimeric derivative or precursor can be converted into a cyclic quaternary ammonium group by reacting the secondary amine with an electrophilic reactant having at least two reactive groups, such as leaving groups and/or epoxy groups. FIG. 26A illustrates this approach to cyclic nitroxyl radical dimer formation, starting from a carbonyl-functionalized TEMPO precursor and a primary amine-functionalized TEMPO precursor.

Synthesis of Ionic Cyclic Nitroxyl Radical Oligomers via Ketone Diamine Condensation or Aldehyde Diamine Condensation.

Figure 27A:
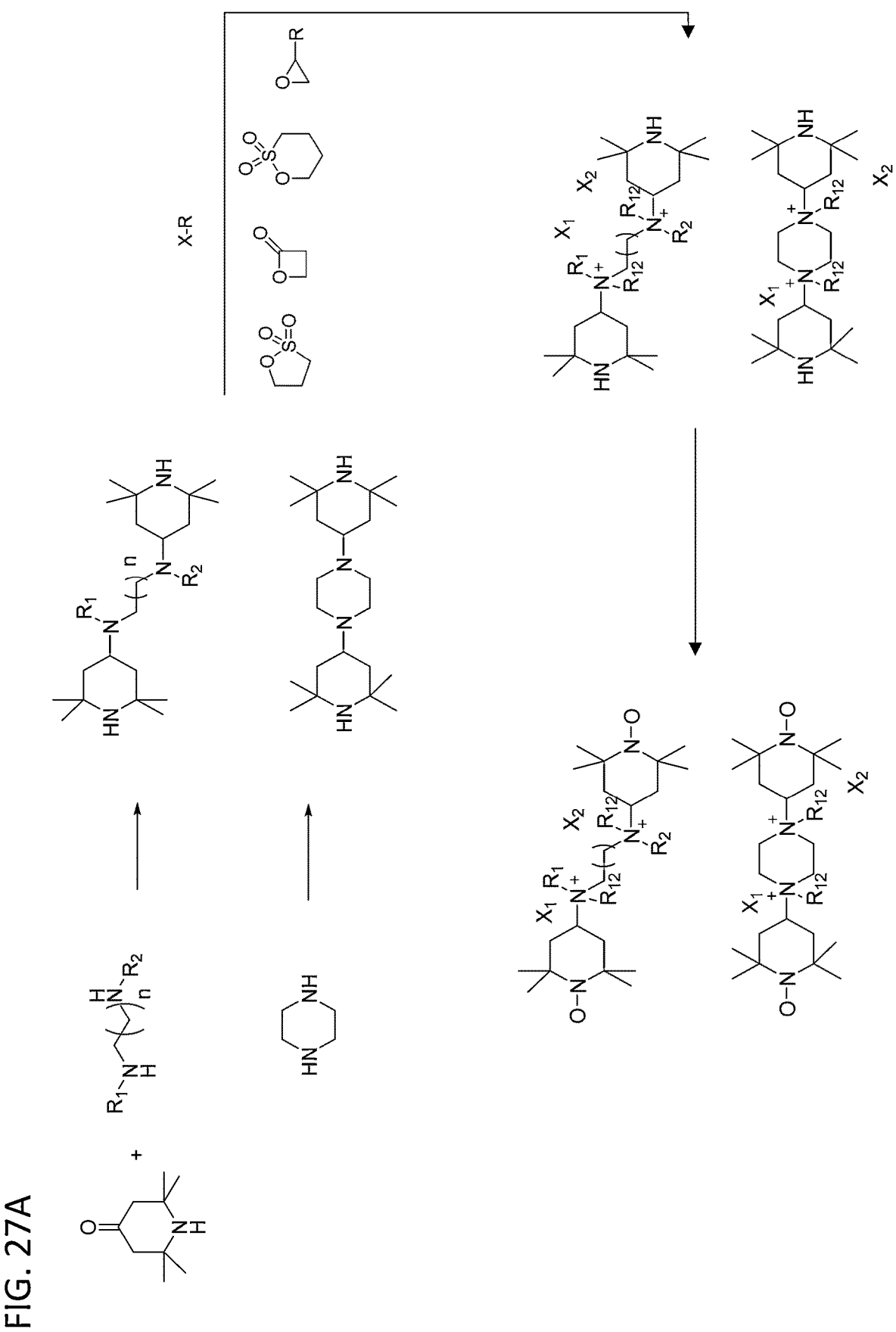
FIGS. 27A and 27B show the use of condensation reactions between the ketone on a carbonyl-functionalized cyclic nitroxyl radical derivative or precursor and an organic linker comprising at least two primary or secondary amine groups to form ionic cyclic nitroxyl radical oligomers.
Figure 27B:
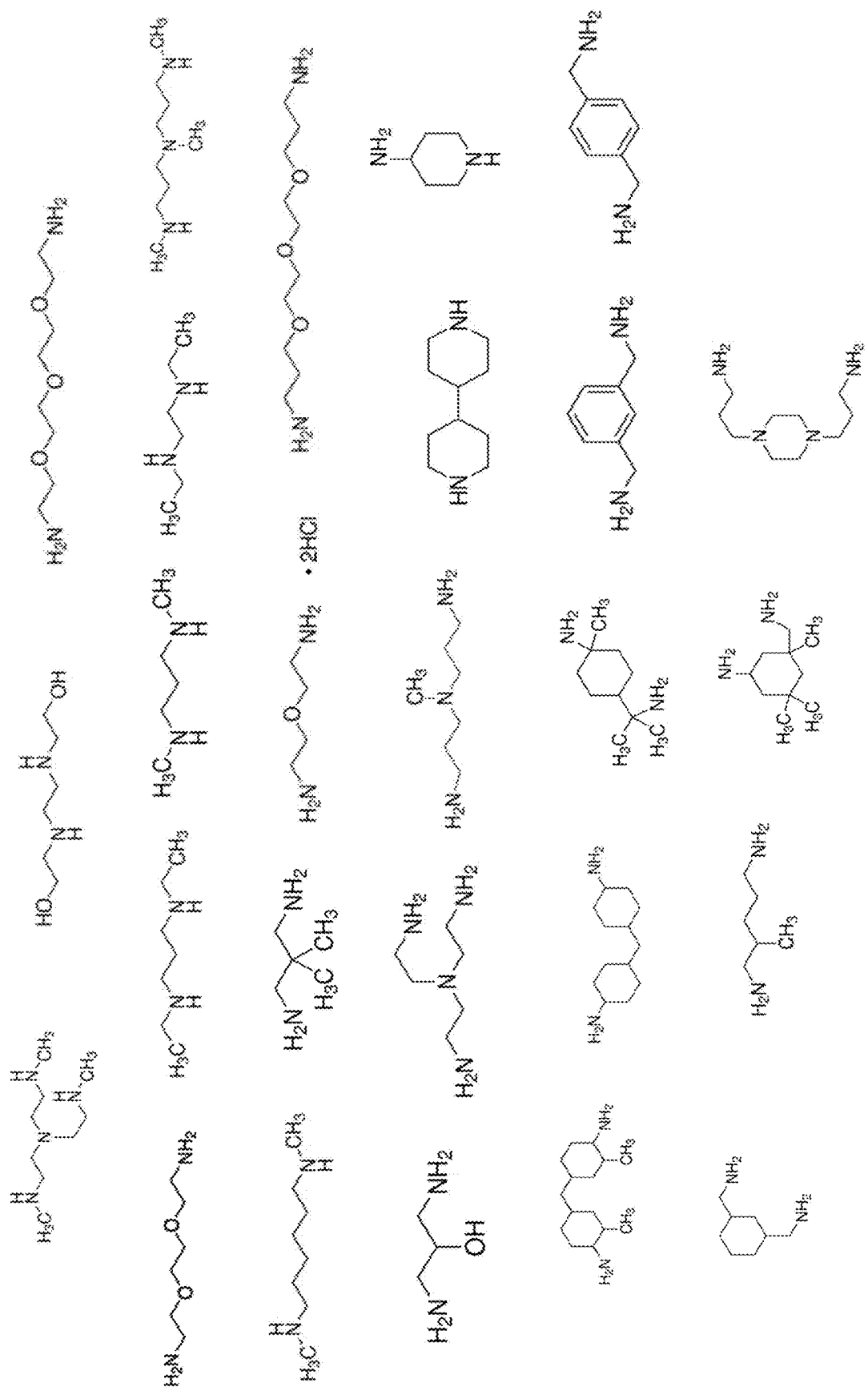

Condensation reactions between the ketone on a carbonyl-functionalized cyclic nitroxyl radical derivative or precursor and an organic linker comprising at least two primary or secondary amine groups can also be used to form ionic cyclic nitroxyl radical oligomers. This is illustrated in FIG. 27A, where a carbonyl-functionalized TEMPO precursor undergoes a condensation reaction with either an aliphatic diamine or a cyclic diamine, followed by an $S_N2$ reaction. Other examples of diamine linkers that can be used are shown in FIG. 27B. $R_{12}$ in FIG. 27A is a functional group, the identity of which is dictated by the particular reactant used in the $S_N2$ reaction.

As illustrated in FIG. 27A, the substitution reaction in the second step can be conducted in the presence of a cyclic sulfate, cyclic phosphate, and/or cyclic carbonate and an electrophilic reactant, which act as precursors for alkyl chain substituents ($R_{12}$) bearing sulfonate, phosphonate, or carbonate groups.

Figure 28A:
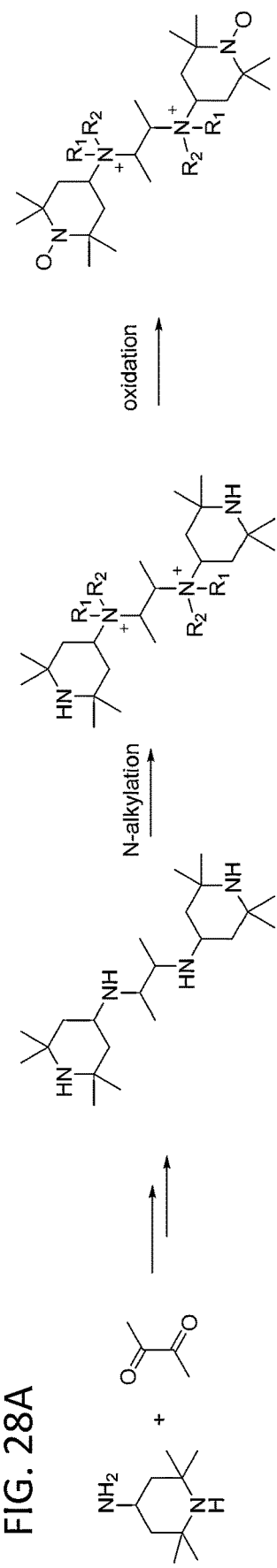
FIGS. 28A and 28B show the use of condensation reactions between the primary amine group on an amine-functionalized cyclic nitroxyl radical derivative or precursor and an organic linker comprising at least two aldehyde or ketone groups to form ionic cyclic nitroxyl radical oligomers.
Figure 28B:
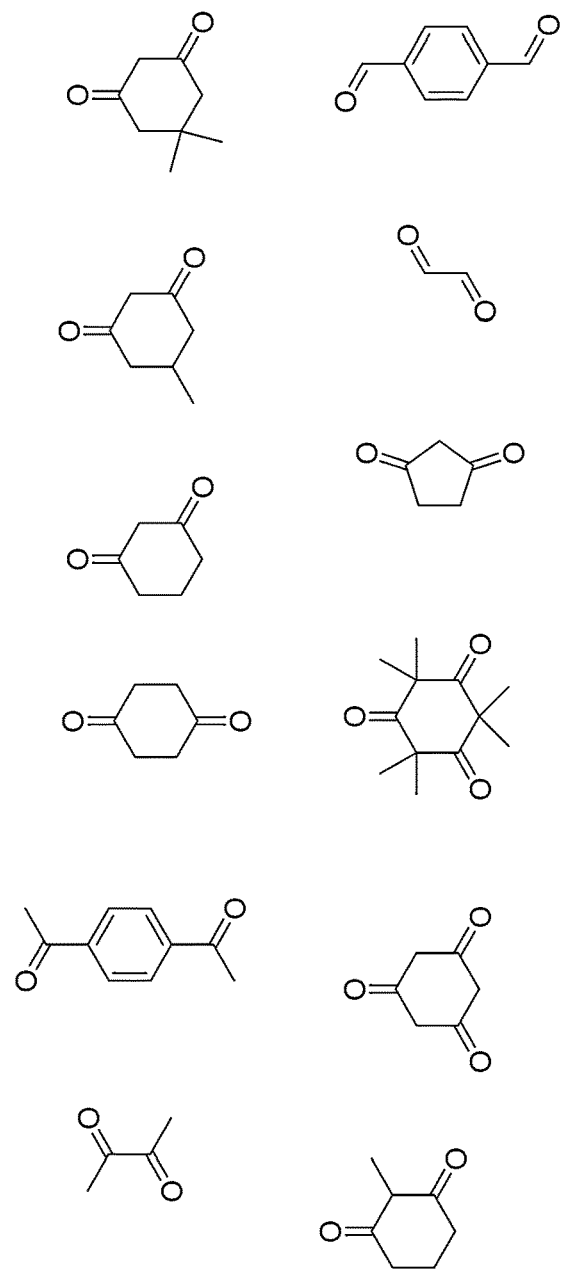

Alternatively, condensation reactions between the primary amine group on an amine-functionalized cyclic nitroxyl radical derivative or precursor and an organic linker comprising at least two aldehyde or ketone groups can be used to form ionic cyclic nitroxyl radical oligomers. This is illustrated in FIG. 28A, where an amine-functionalized TEMPO precursor undergoes a condensation reaction with an aliphatic diketone, followed by an alkylation of the amine groups, and then the oxidation of the ring amine to a nitroxyl radical. Other examples of aliphatic, cyclic, and aromatic diketones that can be used are shown in FIG. 28B.

Multicomponent Reactions (MCR).

Figure 29A:
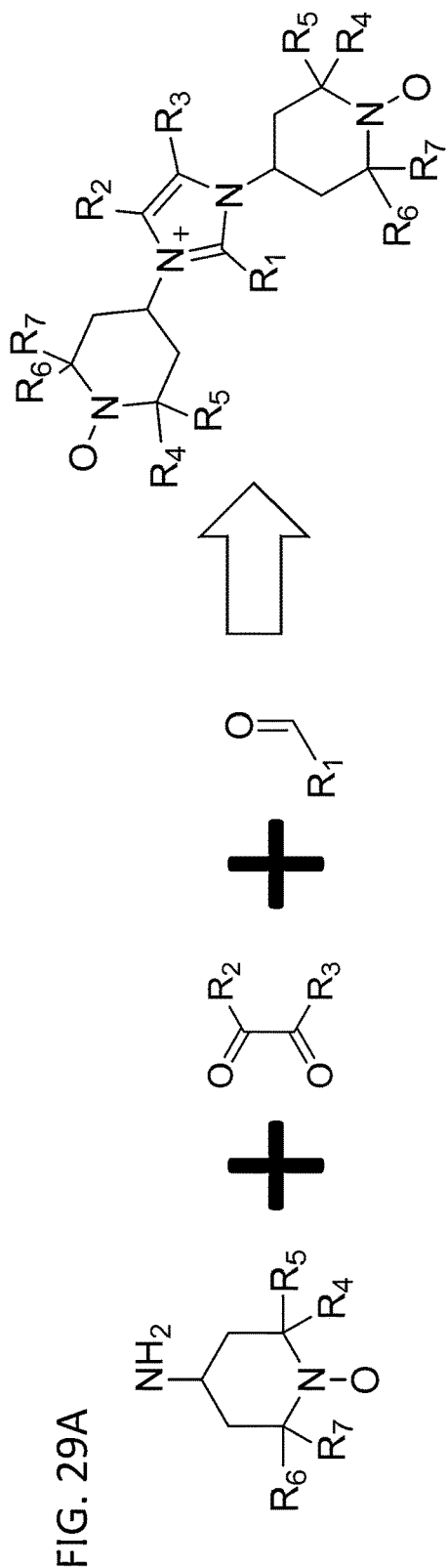
FIG. 29A shows a multicomponent reaction (MCR) between an amine-functionalized nitroxyl radical derivative, a diketone and an aldehyde.
Figure 29B:
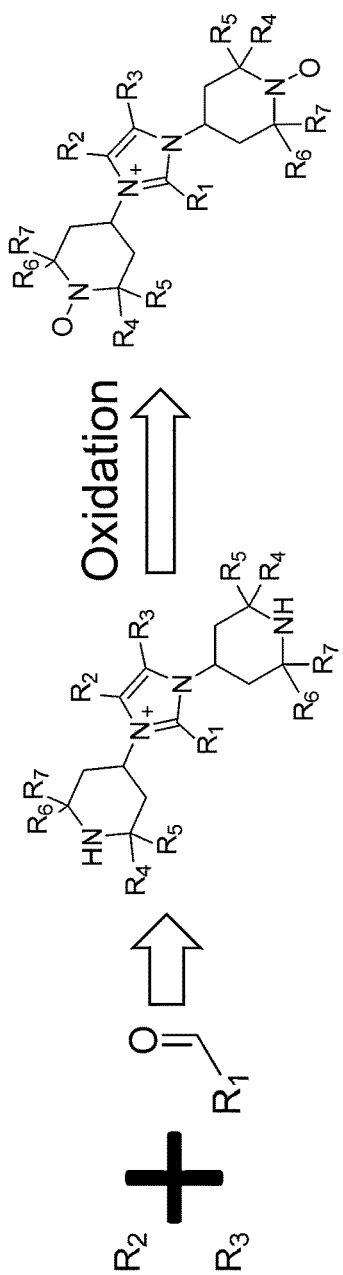
FIG. 29B shows an MCR between an amine-functionalized nitroxyl radical precursor, a diketone and an aldehyde.

It is also possible to form a linker in the core of a cyclic nitroxyl radical oligomer in situ using a multicomponent reaction. An MCR between an amine-functionalized nitroxyl radical derivative, a diketone and an aldehyde is shown in FIG. 29A. An MCR between an amine-functionalized nitroxyl radical precursor, a diketone and an aldehyde is shown in FIG. 29B. In FIGS. 29A and 29B, TEMPO is used as an illustrative cyclic nitroxyl radical.

Zincke Reactions.

Figure 30A:
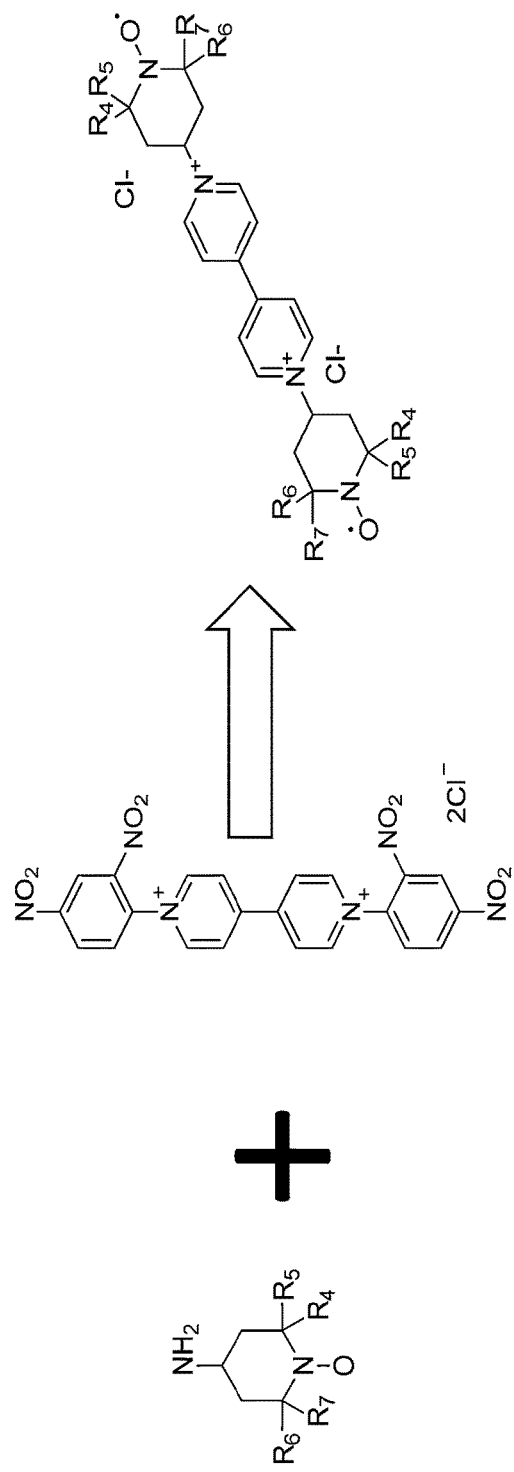
Figure 30B:
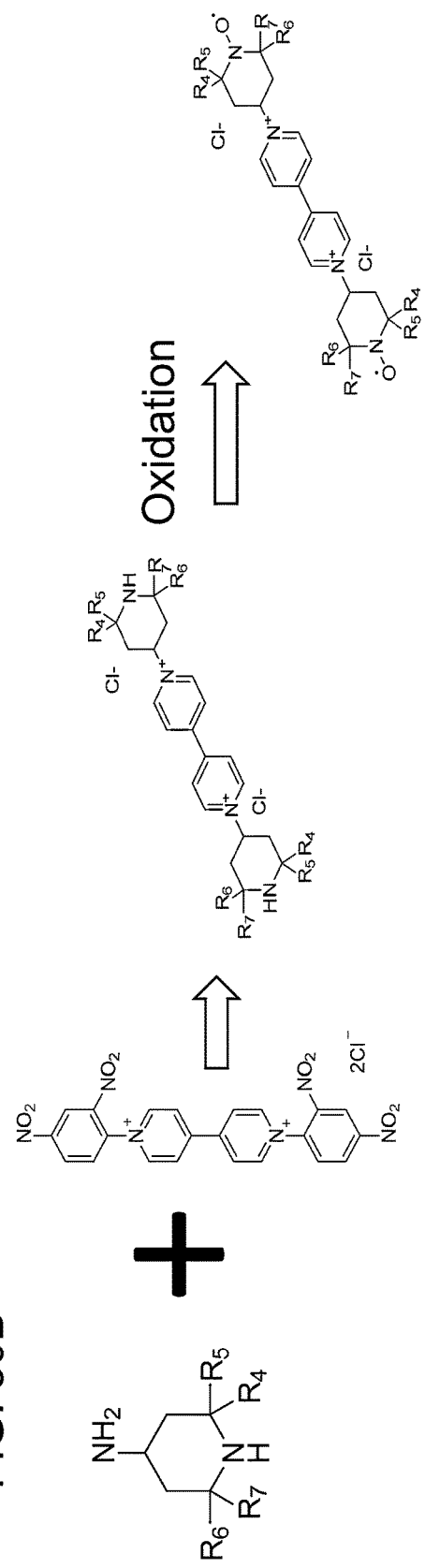
Figure 31:
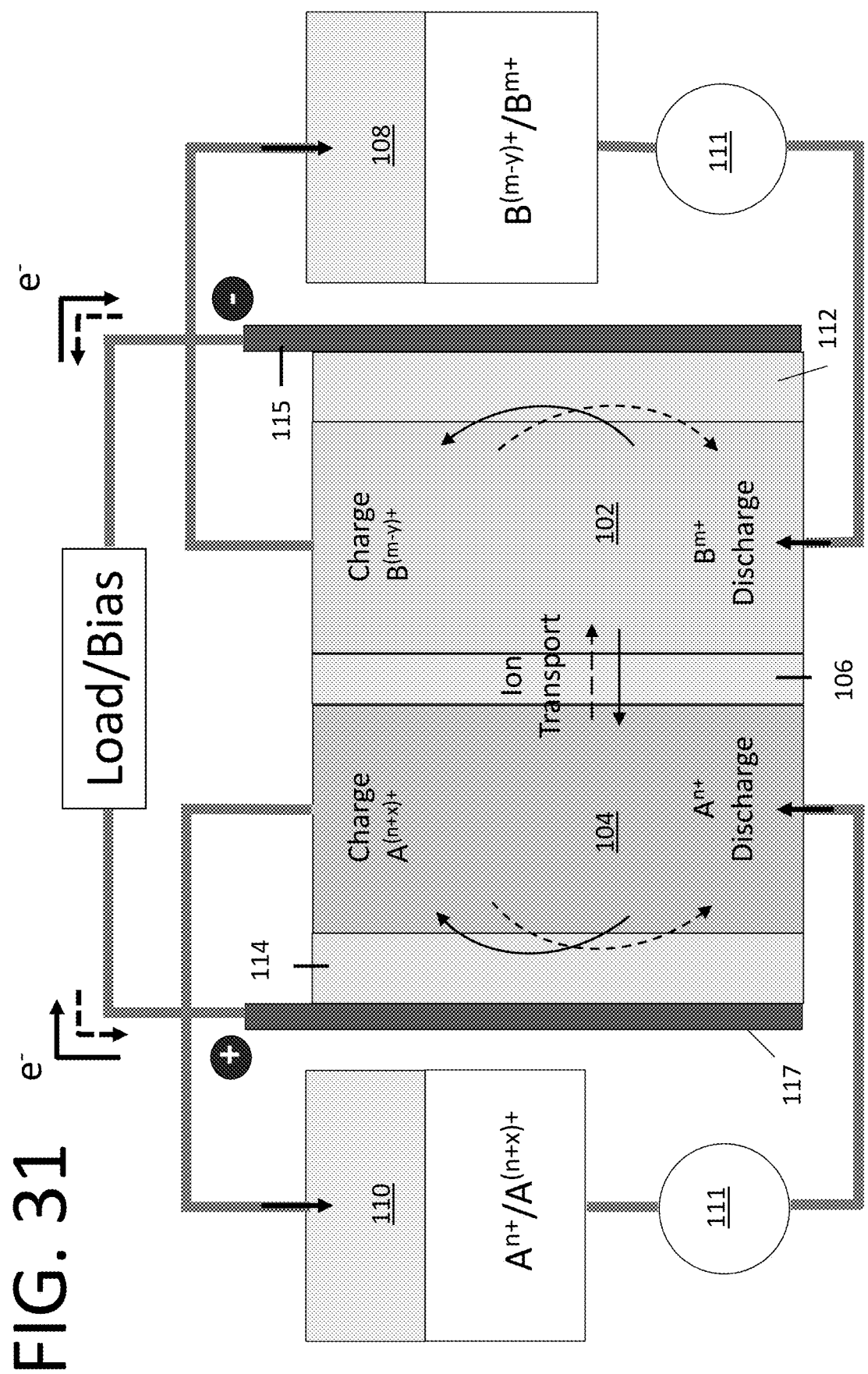

A direct reaction between a cyclic nitroxyl radical derivative or precursor bearing a primary amine group and an organic linker molecule that is a N-(2,4-dinitrophenyl)pyridinium salt (Zincke salt), whereby the Zincke salt is converted into an ionic cyclic nitroxyl radical oligomer, is another scheme that can be used for ionic oligomer synthesis. A Zincke reaction of an amine-functionalized nitroxyl radical derivative is shown in FIG. 30A, and a Zincke reaction of an amine-functionalized nitroxyl radical precursor is shown in FIG. 30B. In FIGS. 30A and 30B, TEMPO is used as an illustrative cyclic nitroxyl radical.

Detailed synthesis schemes and conditions for synthesizing secondary building units, organic linker molecules, and ionic TEMPO oligomers are illustrated in the Examples. The TEMPO oligomerizations can be conducted by combining the secondary building units and, if linker molecules are being used, the organic linker molecules in an organic solvent or a mixture of organic solvents in which the reactants are soluble. Reaction temperatures above 30° C. and below 100° C. and reaction times in the range from 5 hours to 48 hours are generally suitable. However, it is possible to use temperatures and times outside of these ranges. The reactions may be carried out in a single step. However, for reactions in which two or more different secondary building units react with an organic linker molecule to form an ionic oligomer, the reactions can be carried out in two or more steps.

Electrochemical Cells.

The ionic cyclic nitroxyl radical oligomers have applications in a variety of different electrochemical devices in which the oligomers act as a catholyte in an aqueous or non-aqueous catholyte solution or as cathode materials in a solid state. (As used herein, the term catholyte is used broadly to refer to an electrolyte that can be oxidized.) The basic components of an electrochemical device include an anode, an anolyte in contact with the anode, a cathode, a catholyte in contact with the cathode, and an external wire or circuit connecting the anode to the cathode. When the oligomer is in a solid state, it may be coated on a surface of a cathode and/or incorporated into the pores of a porous cathode. When the oligomer is used in a liquid state, it is present as a solute in a catholyte solution. The basic components of an electrochemical cell that uses a liquid electrolyte include an anode cell compartment containing an anolyte, a cathode cell compartment containing a catholyte containing an ionic cyclic nitroxyl radical oligomer as a catholyte, and a pair of electrodes configured to apply a bias across the anode and cathode cell compartments. If the electrochemical device relies upon ion transport between a liquid anolyte solution and a liquid catholyte solution, the electrochemical cell may further include an ion-conducting membrane between the anolyte and the catholyte.

Water-soluble, redox-active ionic cyclic nitroxyl radical oligomers that are stable in a supporting electrolyte solution, particularly a pH neutral solution, have applications as catholytes in electrochemical cells, such as AORFBs. One embodiment of an AORFB is shown schematically in FIG. 31. In the AORFBs, redox-active chemical species are dissolved in aqueous supporting electrolyte solutions where they serve as anode and cathode electrolytes. These anode and cathode electrolytes, which are referred to as anolytes and catholytes, respectively, may be contained in an anode cell compartment 702 and a cathode cell compartment 704. For simplicity, in FIG. 31 the anolytes are represented generically as "B", the cyclic nitroxyl radical oligomers are represented generically as "A", the charge on the anolyte in its oxidized and reduced states is represented by m+ and (m−y)+, respectively, and the charge on the catholyte in its oxidized and reduced states is represented by (n+x)+ and n+, respectively. An ion-conducting membrane 706 separates anode cell compartment 702 from cathode cell compartment 704.

Generally, larger oligomers will result in lower membrane permeation, but lower volumetric capacity. Therefore, for AORFB catholyte applications, the selection of cyclic nitroxyl radical oligomer may depend on the particular ion-permeable membrane being used.

Figure 31:
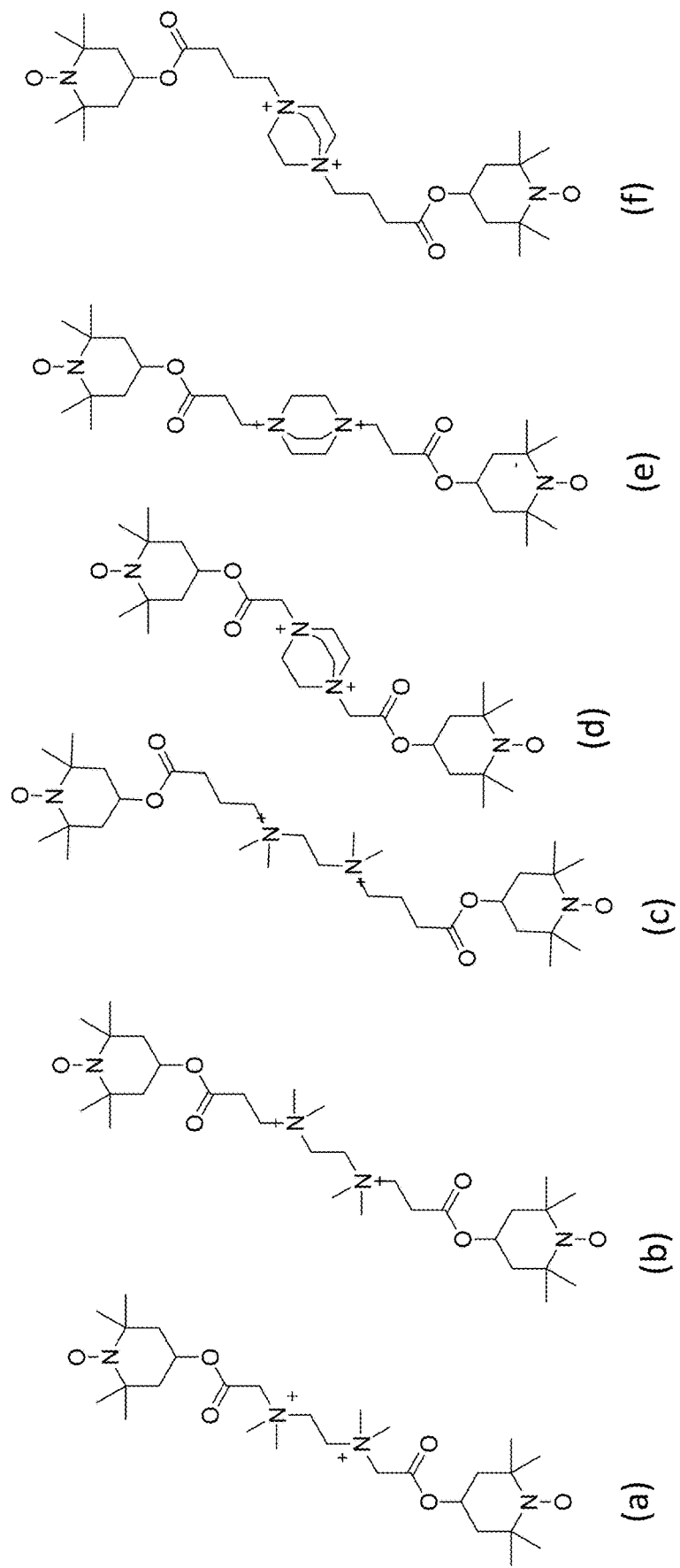
FIG. 31 is a schematic diagram of an AORFB.

During the charge-discharge process, the redox-active anolyte and the ionic cyclic nitroxyl radical oligomer catholyte are stored in an anolyte reservoir 108 and a catholyte reservoir 110, respectively. Reservoirs 108 and 110 are in fluid communication with their respective cell compartments 102 and 104, such that the anolyte and catholyte can be circulated through the cell compartments. This circulation can be accomplished using, for example, a pump 111. During the charging process, a bias is applied across an anode 112 in anode cell compartment 102 and a cathode 114 in cathode cell compartment 104. As shown in FIG. 31, an anode current collector 115 and a cathode current collector 117 can be used to provide electrical conduction between the electrodes and an external circuit. During the charging process, as the anolyte passes over anode 112, the anolyte molecules undergo electrochemical reduction reactions, while the cyclic nitroxyl radical oligomer catholytes passing over cathode 114 undergo electrochemical oxidation reactions. During the discharge process, the anolyte molecules undergo electrochemical oxidation reaction, while the cyclic nitroxyl radical oligomer catholytes passing over cathode 114 undergo electrochemical reduction reactions to power a load that is connected across anode 112 and cathode 114.

Figure 32:
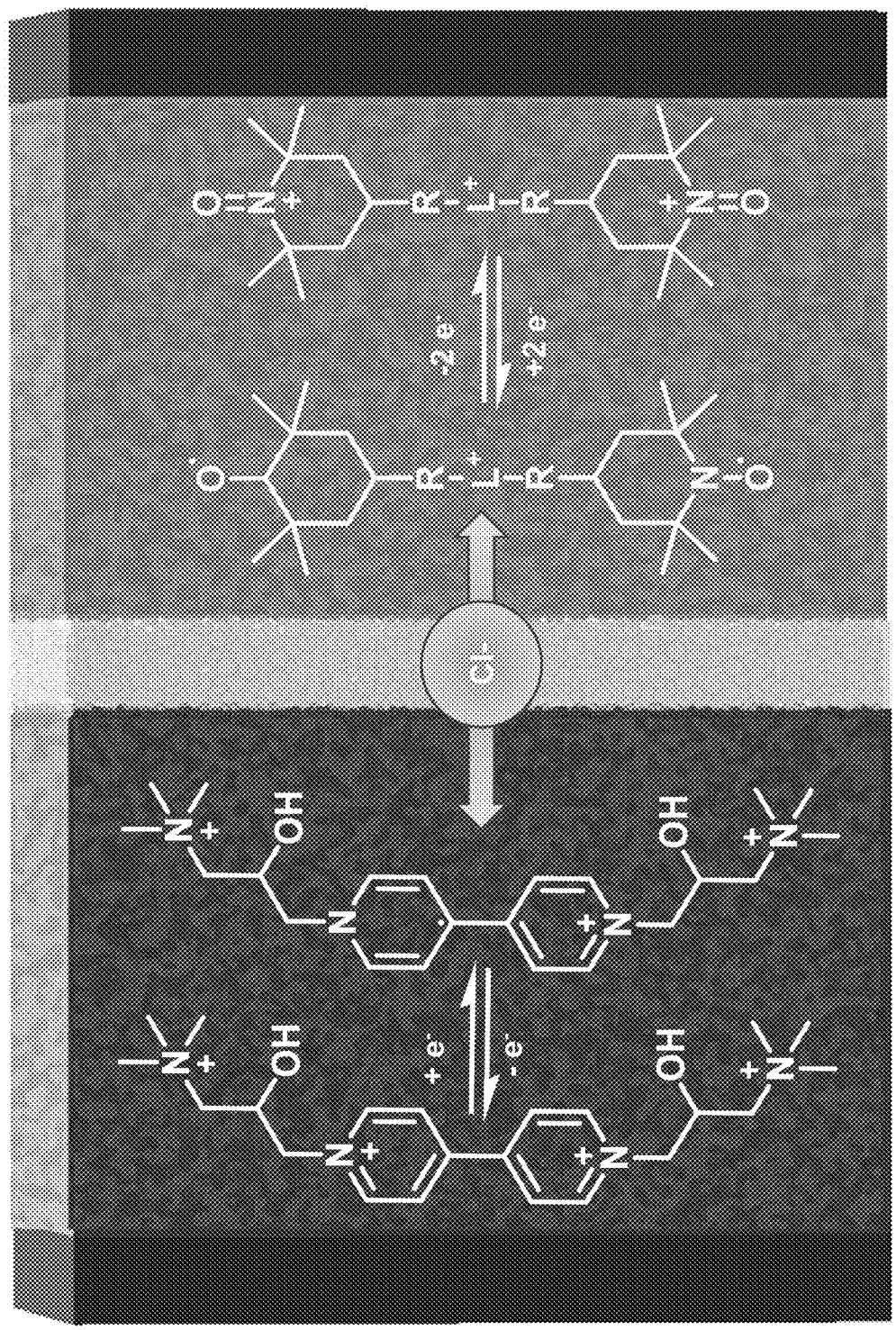
FIG. 32 is a schematic diagram of the cell compartment of an AORFB in which an ionic TEMPO oligomer catholyte is paired with a viologen derivative anolyte.

A variety of aqueous organic redox species can be used as analytes. Viologen derivatives, such as bis(3-trimethylammonio)propyl viologen tetrachloride, and other pyridyl derivatives, such as those described in U.S. provisional patent application Ser. No. 63/183,162 and shown in FIG. 32 ("Dex-Vi"), are particularly attractive for AORFBs that operate at or near pH neutral conditions because they have redox potentials close to the thermodynamic hydrogen evolution reaction potential for water (−0.41V vs SHE). Thus, because TEMPO oligomers having redox potentials at or near the thermodynamic oxygen evolution reaction potential for water (0.82 vs SHE) can be made using the methods described herein, pairing TEMPO oligomers with pyridyl derivatives allows one to take advantage of the full electrochemical potential window for an AORFB.

The supporting electrolyte solution includes chemical species (e.g., salts) that are not electroactive in the AORFB's range of applied potentials, but have high ionic strengths and, therefore, contribute to the conductivity of the solution. Common supporting electrolytes include sodium chloride (NaCl) and potassium hydroxide (KOH).

Figure 33:
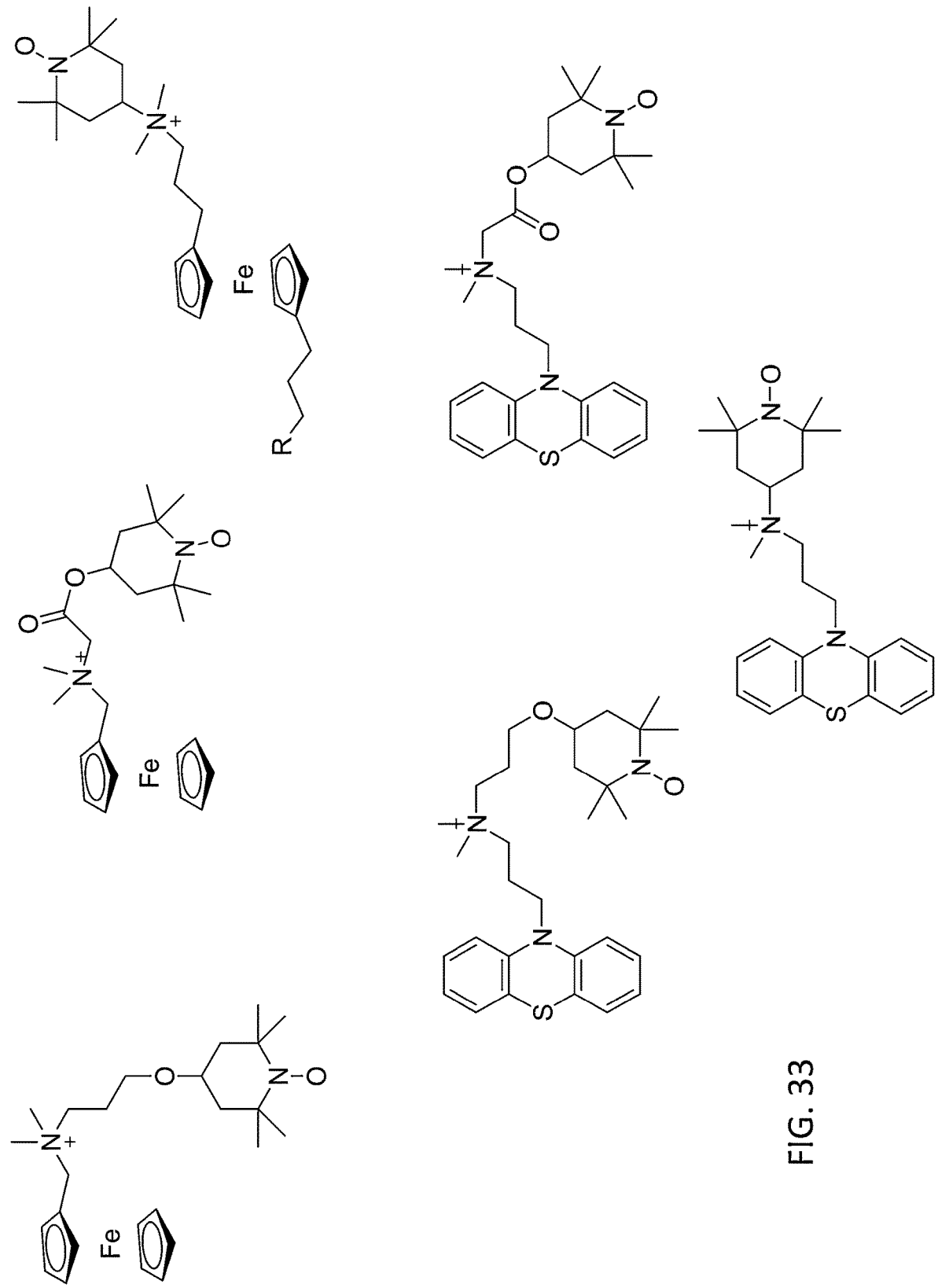
FIG. 33 shows the structures of some TEMPO heterodimers.

Another aspect of the inventions provides cyclic nitroxyl radical heterodimers that include a cyclic nitroxyl radical group, such as a TEMPO group, bonded to a second water-soluble organic redox active catholyte species, such as ferrocene or phenothiazine. To form the heterodimers, the secondary building units and, optionally, organic linker molecules, of the types described herein, can be reacted with the second catholyte species. Examples of heterodimers are shown in FIG. 33. Like the TEMPO oligomers, the TEMPO heterodimers have applications as catholytes in AORFBs.

Figure 34A:
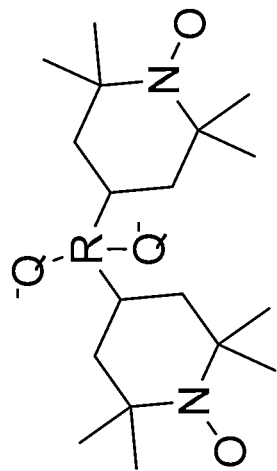
FIG. 34A shows a generic structure for negatively charged TEMPO monomers, wherein $Q^-$ represents a negatively charged substituent group, such as $-SO_3^-$—$PO_3^{2-}$.
Figure 34A:
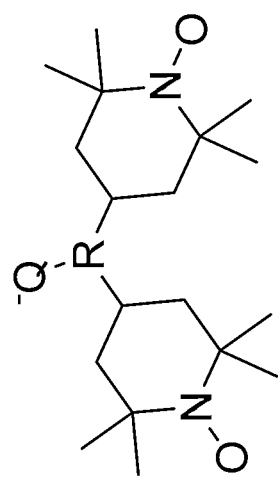
Figure 34B:
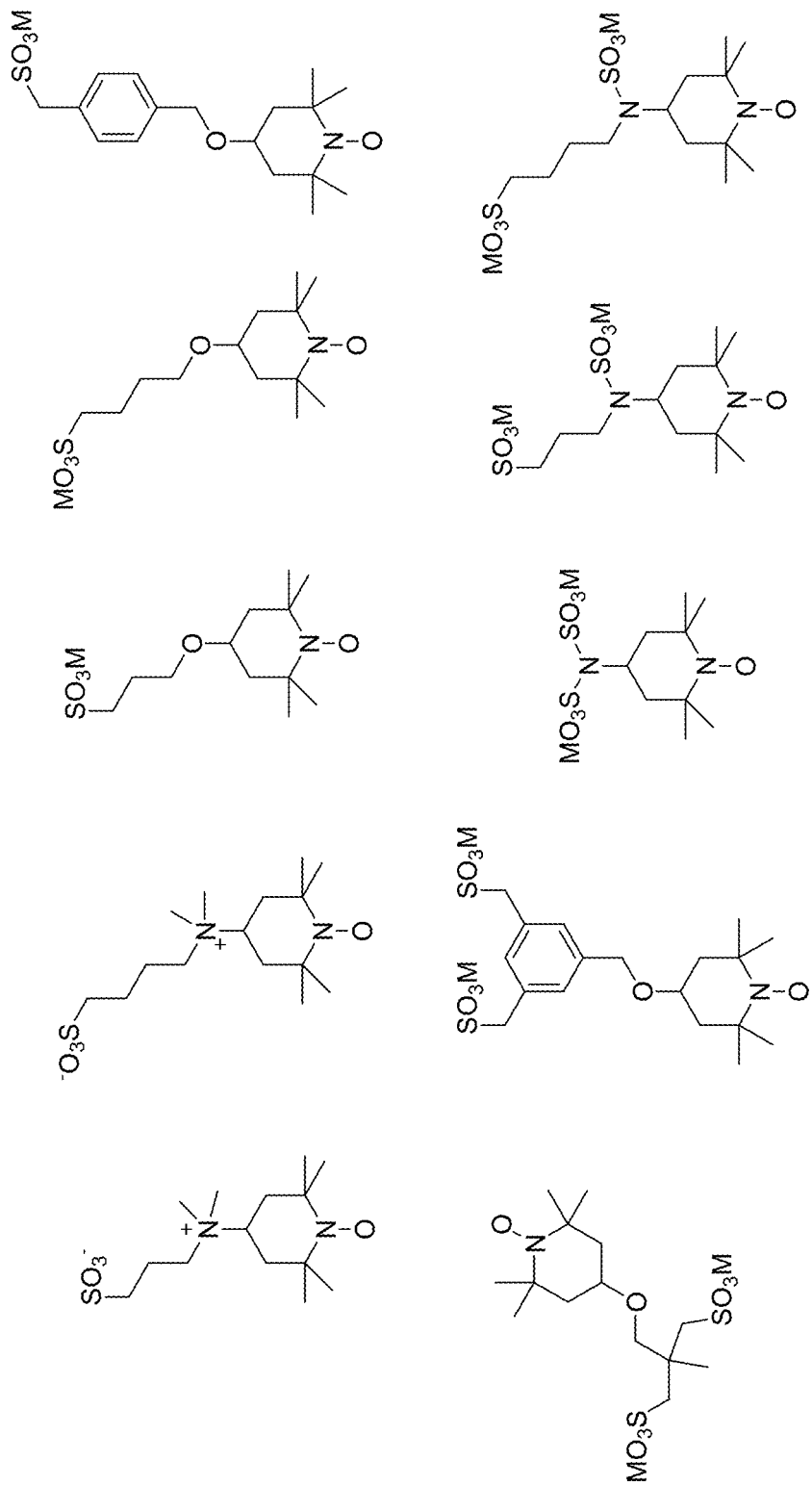
FIG. 34B shows the structures of some examples negatively charged TEMPO monomers. M represents a counterion, such as $Li^+$, $Na^+$, $K^+$, $NH_4^+$, $Zn^{2+}$, or $Al^{3+}$.

Yet another aspect of the inventions provides negatively charged TEMPO monomers. The negatively charged TEMPO monomers are TEMPO derivatives having a negatively charged functional group or a side-chain bearing a negatively charged group at the 4-position, 3-position, and/or 5-position of the ring. The negatively charged TEMPO derivatives can have the structures of the secondary building units described herein (with or without the organic linkers), wherein the terminal reactive groups on the secondary building units or organic linkers (e.g., halogen atoms) and/or other chemical groups of the secondary building unit or organic linker (e.g., —$CH_3$ groups) are replaced by a negatively charged functional group, such as a sulfate group ($SO_3^-$). Illustrative examples of TEMPO oligomers having anionic substituents on the oligomer core are shown in FIGS. 34A and 34B. (In the figures, "M" represents a charge balancing metal cation, such as sodium.) Like the TEMPO oligomers, the negatively charged TEMPO monomers have applications as catholytes in AORFBs.

EXAMPLES

Example 1: Ionic TEMPO Dimer Synthesis

This example illustrates the synthesis of various TEMPO dimers and one trimer and their use as catholytes in an AORFB.
Tempo Dimer Synthesis
Secondary Building Units.

Various secondary building units were synthesized from TEMPO derivatives according to the schemes shown below.

Scheme 1. Synthesis of 4-(2-chloroacetoxy)-2,2,6,6-tetramethylpiperidinyl-1-oxy.

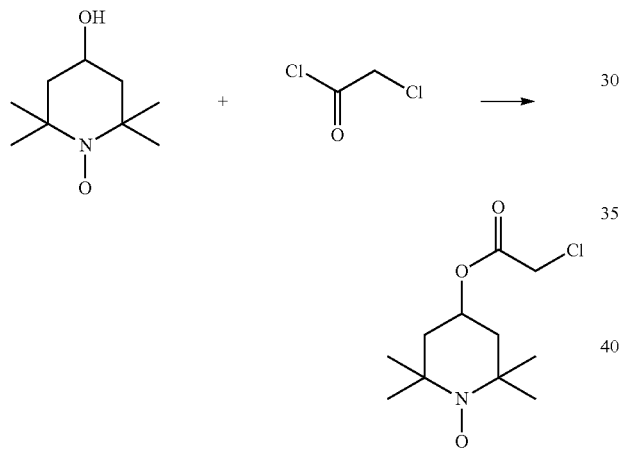

4-(2-chloroacetoxy)-2,2,6,6-tetramethylpiperidinyl-1-oxy was prepared as described in previous literature (Qian, W.; Jin, E.; Bao, W.; Zhang, Y. Clean and Selective Oxidation of Alcohols Catalyzed by Ion-Supported TEMPO in Water. *Tetrahedron* 2006, 62 (4), 556-562.) and modified as follows: 4.3 g of 4-OH TEMPO (0.025 mol, 1 equiv.) was dissolved in 50 mL dichloromethane and stirred at 0° C. for 5 min. Then, 3.11 g (0.0275 mol, 1.1 equiv.) 2-chloroacetyl chloride was dissolved in 50 mL dichloromethane and placed in a 250 mL three-neck round bottle. The mixture was stirred under an ice bath at 0° C. for 20 min. Then 2.18 g (0.0275 mol, 1.1 equiv.) pyridine was added dropwise, and the mixture was stood overnight. After the reaction was completed, the precipitate was removed by filtration and the filtrate was washed with water (30 mL), 10% $NaHCO_3$, then 2 mol dilute HCl, and finally water (30 mL). The organic phase was dried over anhydrous $Na_2SO_4$ and concentrated under a vacuum to give a red solid of 4.98 g (yield, 88%). The synthesized TEMPO precursor was reduced by phenylhydrazine for $^1H$ NMR test. $^1H$ NMR (400 MHZ, DMSO-d6): δ 4.35 (s, 2H), 3.51 (s, 1H), 1.87-1.92 (t, 2H), 1.45-1.54 (m, 2H), 1.13 (d, 12H).

Scheme 2. The procedure described above was also used to make other type 1 secondary building units by replacing the 2-chloroacetyl chloride starting material with 2-bromoacetyl chloride (1.1 equiv.), 3-chloropropanoyl chloride (1.1 equiv.), and 4-chlorobutanoyl chloride (1.1 equiv.), the structures of which are shown below.

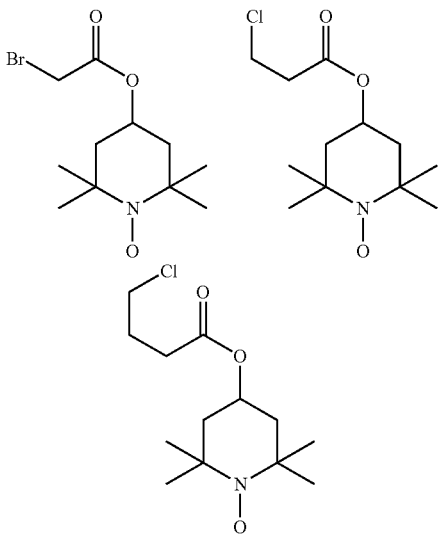

Scheme 3. Synthesis of 4-(2-chloroacetamide)-2,2,6,6-tetramethylpiperidinyl-1-oxy.

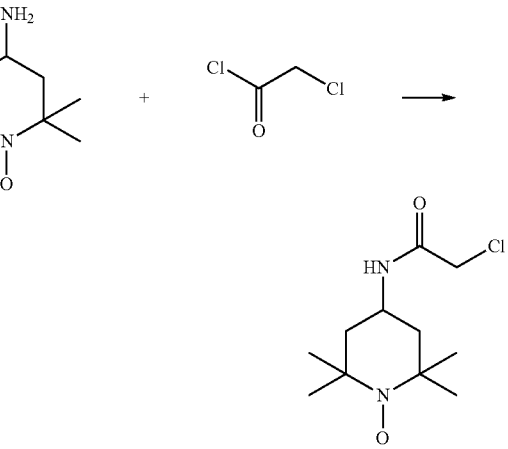

4-(2-chloroacetamide)-2,2,6,6-tetramethylpiperidinyl-1-oxy was synthesized as described in previous literature. (Mouchel Dit Leguerrier, D.; Barré, R.; Ruet, Q.; Imbert, D.; Philouze, C.; Fries, P. H.; Martel-Frachet, V.; Molloy, J. K.; Thomas, F. Lanthanide Complexes of DOTA-Nitroxide Conjugates for Redox Imaging: Spectroelectrochemistry, CEST, Relaxivity, and Cytotoxicity. *Dalt. Trans.* 2021, 50 (31), 10826-10837) To a solution of 4-amino TEMPO (5.13 g, 30.0 mmol, 1 equiv.) and triethylamine (5.0 mL, 36.0 mmol, 1.2 equiv.) in anhydrous dichloromethane (50 mL), chloroacetyl chloride (36.0 mmol, 1.2 equiv.) was added dropwise at 0° C. under $N_2$ atmosphere and then stirred at room temperature for 10 h. Upon completion, 50 mL water was added and the aqueous phase was extracted with dichloromethane (3×40 mL). The organic phases were combined, washed with saturated brine, dried over anhydrous $Na_2SO_4$, filtered and evaporated. The residue was purified by chromatography (petroleum ether:ethyl acetate 30:1) to yield the product as red solid. The synthesized TEMPO precursor was reduced by phenylhydrazine for $^1$H NMR test. $^1$H NMR (400 MHZ, DMSO-d6): δ 4.03-4.07 (t, 3H), 1.68 (d, 2H), 1.32-1.38 (t, 2H), 1.08 (s, 12H).

Scheme 4. The procedure described above was also used to make other secondary building units by replacing the chloroacetyl chloride with 2-bromacetyl chloride (1.2 equiv.), 3-chloropropanoyl chloride (1.2 equiv.) and 4-chlorobutanoyl chloride (1.2 equiv.), the structures of which are shown below.

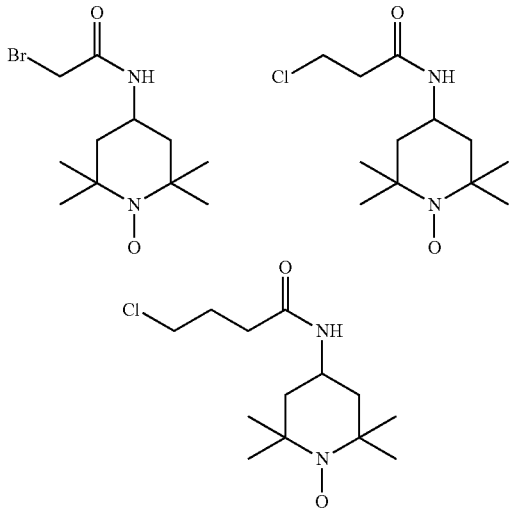

Scheme 5. Synthesis of 4-(4-chloropropyloxy)-2,2,6,6-tetramethylpiperidinyl-1-oxy.

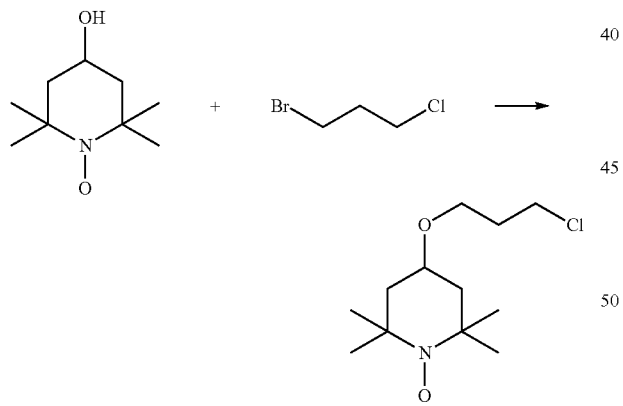

4-(4-chloropropyloxy)-2,2,6,6-tetramethylpiperidinyl-1-oxy was synthesized as described in previous literature. (Liu, Y.; Goulet, M. A.; Tong, L.; Liu, Y.; Ji, Y.; Wu, L.; Gordon, R. G.; Aziz, M. J.; Yang, Z.; Xu, T. A Long-Lifetime All-Organic Aqueous Flow Battery Utilizing TMAP-TEMPO Radical. Chem 2019, 5 (7), 1861-1870) 10 g (58 mmol, 1 equiv.) 4-OH TEMPO was dissolved in 10 mL toluene and 15 g NaOH was dissolved in 30 mL water. The two phases were mixed together by adding tetrabutylammonium bromide (TBAB, 0.87 g, 2.67 mmol). The mixture was stirred for 20 min at room temperature. Then 18.3 g (116 mmol, 2 equiv.) of 1-chloro-3-bromopenate were added and the system was stirred at room temperature for 72 h. Upon completion, ether ester (150 mL) was added. The two phases were separated in a separatory funnel. The organic phase was washed with deionized water (200 mL×3), dried with anhydrous Na$_2$SO$_4$, and the organic solvent was evaporated, giving a viscous red liquid. The residue was purified by flash column chromatography on silica gel (EtOAc:hexane=1:10) to afford the desired product 4-(2,2,6,6-tetramethyl-1-oxyl-4-piperidoxyl) propyl chloride (6.5 g, 45%) as a viscous red liquid. The synthesized TEMPO precursor was reduced by phenylhydrazine for $^1$H NMR test. $^1$H NMR (400 MHZ, DMSO-d6): δ 3.66-3.69 (t, 2H), 3.55-3.60 (m, 1H), 3.50-3.53 (t, 2H), 1.86-1.96 (m, 4H), 1.28-1.32 (m, 2H), 1.10 (d, 12H).

Scheme 6. The procedure described above was also used to make other secondary building units by replacing the 1-chloro-3-bromopenate with (87 mmol, 1.5 equiv.) of 1,3-dibromopenate (1.5 equiv.), 1,2-dibromoethane (1.5 equiv.) and 1,3-diiodopropane (1.5 equiv.), respectively, the structures of which are shown below.

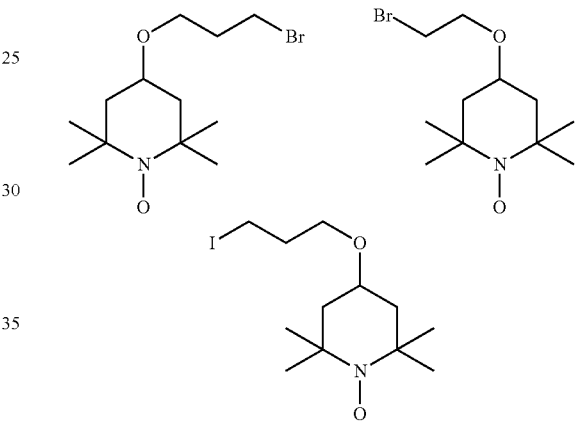

Scheme 7. Synthesis of 4-(dimethylamino)-2,2,6,6-tetramethylpiperidinyl-1-oxy.

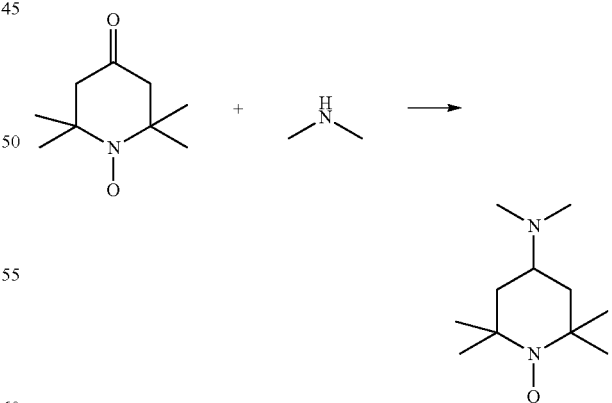

4-(dimethylamino)-2,2,6,6-tetramethylpiperidinyl-1-oxy was prepared as follows: 4-Oxo-TEMPO (20 g, 117.5 mmol) was dissolved in Ti(O$^i$Pr)$_4$ (42 mL, 140.2 mmol) and placed in a 500 ml one-neck round bottle. After 20 min of stirring at room temperature, dimethylamine solution in MeOH (150 mL, 2 M, 0.3 mol) was added and the reaction was stirred for an additional 24 h at room temperature. Subsequently, NaCNBH₃ (8.86 g, 141 mmol) was added carefully, and the resulting solution was stirred 24 h at room temperature. The reaction was quenched by adding water (1 L) and the aqueous layer was extracted with EtOAc (200 mL×3). The organic layer was dried over anhydrous Na₂SO₄ and the solvent was removed in vacuo. Purification via column chromatography and the resulting red oily solid 4-(dimethylamino)-2,2,6,6-tetramethylpiperidinyl-1-oxy (14.45 g, 62%).

The synthesized TEMPO compound was reduced by phenylhydrazine for ¹H NMR test. ¹H NMR (400 MHZ, DMSO-d6): δ 2.74 (s, 1H), 2.37 (s, 6H), 1.80 (d, 2H), 1.46-1.52 (t, 2H), 1.20 (d, 12H).

Scheme 8. Synthesis of N,N-bis(2,2,6,6-tetramethylpiperidinyl-1-oxy) amine.

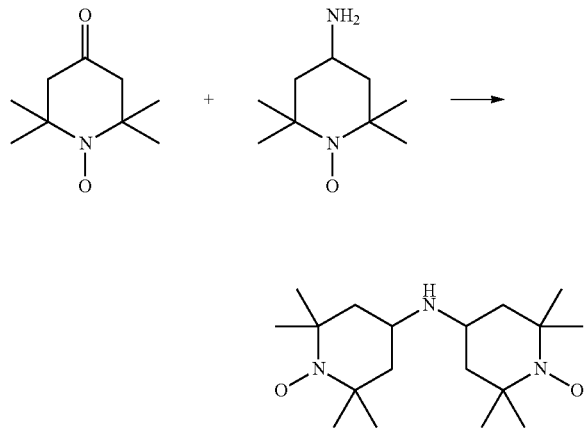

N,N-bis(2,2,6,6-tetramethylpiperidinyl-1-oxy)amine was prepared as follows: 4-Oxo-TEMPO (20 g, 117.7 mmol) 4-Amino-TEMPO (20 g, 116.8 mmol) were dissolved in anhydrous MeOH (100 mL) under N₂ protection and sealed in a thick-walled pressure bottle. After the mixture was stirred for 20 min at room temperature, acetic acid (2 mL) was added, and the resulting solution was stirred for 20 min at room temperature. Next, sodium borohydride (366 mg, 5.84 mmol) was added at once and the mixture was then refluxed for 50 h. The reaction mixture was then diluted with DCM (20 mL), and saturated aqueous NaHCO₃ solution (100 mL) with water (100 mL) was added. The separated aqueous layer was extracted with DCM (200 mL). The combined organic phases were dried over anhydrous Na₂SO4, the solids were filtered off, the volatiles were evaporated in vacuo, and the residue was purified by column chromatography to obtain the desired product (26.8 mg, 70%) as a red-orange solid.

The synthesized TEMPO compound was reduced by phenylhydrazine for ¹H NMR test. ¹H NMR (400 MHZ, DMSO-d₆): δ 3.06-3.12 (t, 2H), 1.88 (d, 4H), 1.42-1.51 (t, 4H), 1.22 (d, 24H).

TEMPO Dimers.

Various TEMPO dimers were synthesized from the secondary building units according to the schemes shown below.

Scheme 9. Synthesis of i-TEMPOD-1 (N+TEMPOD).

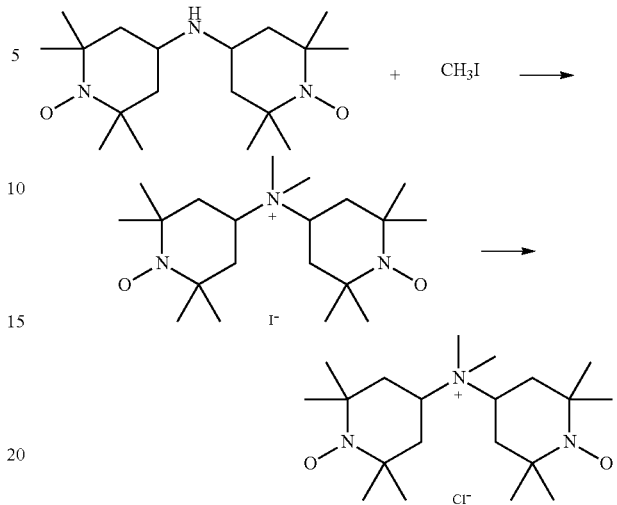

i-TEMPOD-1 was prepared as follows: 5.5 g (16.9 mmol, 1 equiv.) N,N-bis(1-oxido-2,2,6,6-tetramethylpiperidin-4-yl)amine was dissolved in 60 mL methanol, NaHCO₃ (7.12 g, 84.7 mmol) and CH₃I (5.28 mL, 84.5 mmol, 5 equiv.) was added subsequently. The mixture was sealed in a 250 mL thick-walled pressure bottle and the reaction was flux for 24 h. Upon completion, the solvent was removed by a rotary evaporator. The light-yellow solid was fully dissolved in 100 ml of water, the aqueous phase was washed with EtOAc (100 mL×3). The aqueous phase was combined and evaporated. After drying, the powder was dissolved in 20.0 mL of deionized water and flushed through an anion exchange column with an Amberlite IRA-900 chloride form anion exchange resin. The solvent was removed, and the resulting orange solid is 6.6 g (yield: 90%).

The synthesized i-TEMPOD-1 was reduced by phenylhydrazine for ¹H NMR test. ¹H NMR (400 MHZ, D₂O-d₆): δ 3.66-3.72 (t, 2H), 2.82 (s, 6H), 2.00 (d, 4H), 1.70-1.76 (t, 4H), 1.14 (d, 24H).

Scheme 10. Synthesis of i-TEMPOD-3.

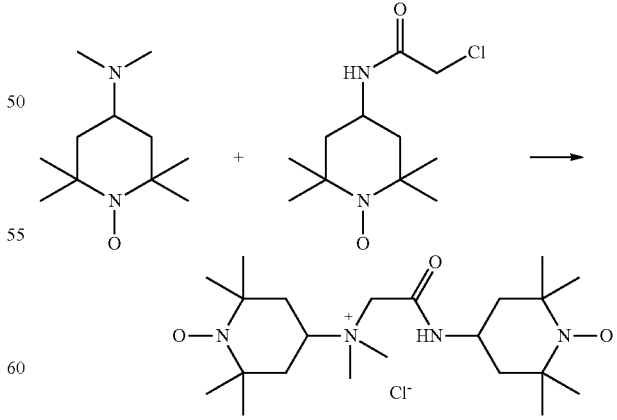

i-TEMPOD-3 was prepared as follows: 4-dimethylamino TEMPO (1.99 g, 10 mmol, 1 equiv.) and 4-(2-chloroacetate) TEMPO (2.73 g, 11 mmol, 1.1 equiv.) were mixed and the mixture was sealed in a thick-walled pressure bottle under N₂ protection. The system was stirred at 40° C. for 12 h under N₂ protection. Ester ether (50 mL) was added and stirred for 20 min. Finally, the precipitate was obtained through filtration and washed with acetone (20 mL×3). The product was dried at 40° C. under vacuum overnight and the yield is 85% (3.8 g).

The synthesized i-TEMPOD-3 was reduced by phenyl hydrazine for $^1$H NMR test. $^1$H NMR (400 MHZ, D$_2$O-d$_6$): δ 5.14 (s, 1H), 4.02-4.09 (t, 1H), 2.98-3.06 (d, 8H), 1.96 (d, 4H), 1.56-1.69 (m, 4H), 1.07-1.14 (t, 24H).

Scheme 11. Synthesis of i-TEMPOD-4 (Eth-N+TEMPO).

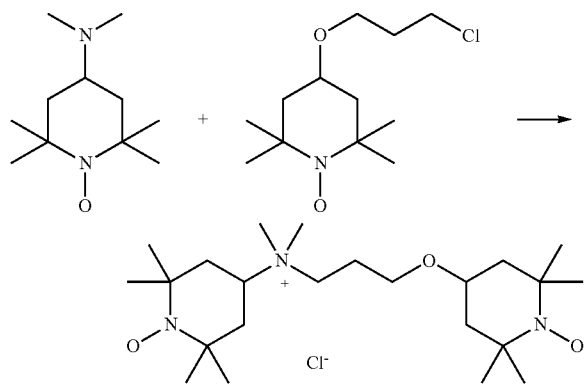

i-TEMPOD-4 was prepared as follows: 4-dimethylamino TEMPO (1.99 g, 10 mmol, 1 equiv.) and 4-(2,2,6,6-tetramethyl-1-oxyl-4-piperidoxyl) propyl chloride (2.73 g, 11.0 mmol, 1.1 equiv.) were dissolved in 50 mL toluene and the mixture was sealed in a thick-walled pressure bottle under N₂ protection. The system was stirred at 80° C. for 96 h under N₂ protection. Ester ether (50 mL) was added and stirred for 20 min. Finally, the precipitate was obtained through filtration and washed with ester ether (20 mL×3). The product was dried at 40° C. under vacuum overnight and the yield is 65% (2.9 g).

The synthesized i-TEMPOD-4 was reduced by phenyl hydrazine for $^1$H NMR test. $^1$H NMR (400 MHZ, D$_2$O-d$_6$): δ 3.71-3.75 (t, 1H), 3.53-3.56 (t, 2H), 3.30-3.34 (t, 2H), 2.94 (s, 6H), 1.94-2.04 (m, 6H), 1.65-1.71 (t, 2H), 1.33-1.39 (t, 2H), 1.10-1.15 (t, 24H).

Scheme 12. Synthesis of i-TEMPOD-5

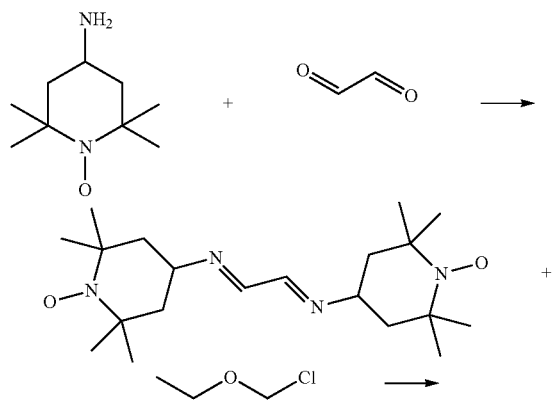

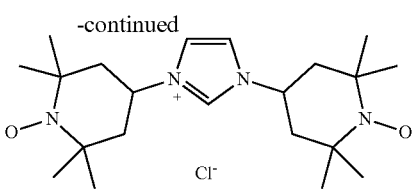

i-TEMPOD-5 was prepared as follows: 1.45 g glyoxal (40% aqueous solution, 10 mmol) was diluted in propanol (4 mL) and water (2 mL). The resulting mixture was added dropwise to a propanol solution (10 mL) of the 4-aminoTEMPO (3.42 g, 20 mmol, 2 equiv.). The reaction was stirred for 5 h at room temperature, then the resulting suspensions was filtered and rinsed with clod propanol (5 mL). The product was dried in vacuum under 40° C. The dried powder was further recrystallization from acetonitrile. Orange needle product was obtained by filtration and dried in vacuum again, yield: 62% (2.62 g).

0.538 g of the imine TEMPO product (1.48 mmol, 1 equiv.) and 0.14 mL (1.48 mol, 1 equiv.) chloromethyl ethyl ether was dissolved in anhydrous THF (40 mL) and sealed in a 100 mL thick-walled pressure bottle. The reaction was stirred at 40° C. overnight. Upon completion, the precipitate was collected by filtration and washed with acetone (20 mL×3). The finial product was dried in a vacuum and the yield is 85%. (0.52 g).

The synthesized i-TEMPOD-5 was reduced by phenyl hydrazine for $^1$H NMR test. $^1$H NMR (400 MHZ, D$_2$O-d$_6$): δ 7.50 (s, 2H), 7.32 (s, 1H), 4.61 (s, 1H), 3.49-3.56 (t, 1H), 2.05 (d, 4H), 1.78-1.84 (t, 4H), 1.15 (d, 24H).

Scheme 13. Synthesis of i-TEMPOD-6.

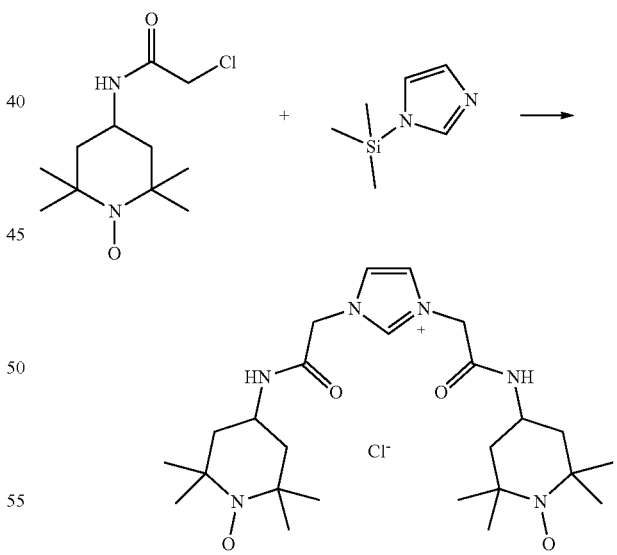

i-TEMPOD-6 was prepared as follows: 1.0 g (4.036 mmol, ~2 equiv.) 4-(2-chloroacetamide) TEMPO and 0.280 g of 1-(trimethylsilyl)-1H-imidazole (2.00 mmol, 1 equiv.) were dissolved in 50 mL anhydrous acetone and sealed in a 250 mL thick-walled pressure bottle under N₂ protection. Then the mixture was stirred at 40° C. for 24 h. The precipitation was collected by filtration and washed with acetone (10 mL*3). Finally, the product was obtained after dried in vacuum, yield 92% (1.16 g).

The synthesized i-TEMPOD-6 was reduced by phenyl hydrazine for $^1$H NMR test. $^1$H NMR (400 MHZ, D$_2$O-d$_6$): δ 7.36 (s, 1H), 7.31 (s, 2H), 4.87 (d, 2H), 4.63 (s, 2H), 4.01-4.07 (t, 2H), 1.75-1.82 (t, 4H), 1.36-1.44 (t, 4H), 1.09 (d, 24H).

Scheme 14. The procedure was also used in the synthesis below to make different monovalent cationic TEMPO dimers by replacing the 4-(2-chloroacetate) TEMPO with with 4-(3-chloropropoxy) TEMPO (2 equiv,; Yield: 85%; 9.04 g). The reaction temperature was 90° C. and stirring lasted for 72 h.

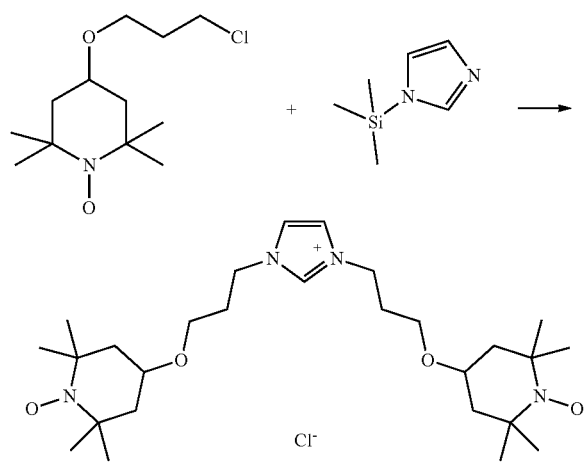

Scheme 15. Synthesis of i-TEMPOD-7.

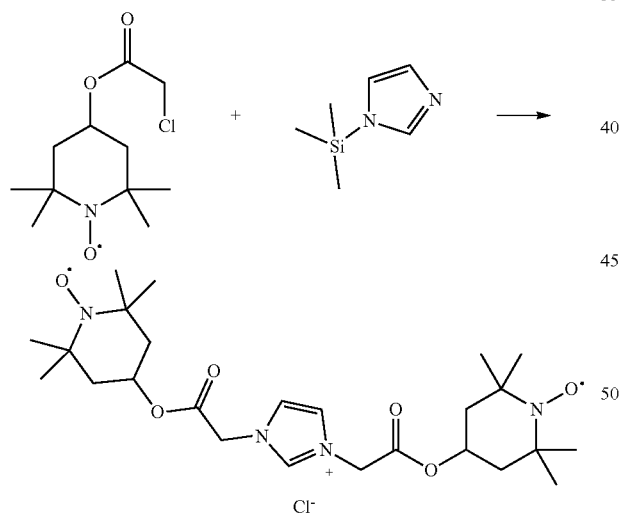

i-TEMPOD-7 was prepared as follows: 1 g (4.02 mmol, ~2 equiv.) 4-(2-chloroacetate) TEMPO and 0.280 g of 1-(trimethylsilyl)-1H-imidazole (2.00 mmol, 1 equiv.) were dissolved in 50 mL anhydrous acetone and sealed in a 250 mL thick-walled pressure bottle under N$_2$ protection. Then the mixture was stirred at 40° C. for 24 h. The precipitation was collected by filtration and washed with acetone (10 mL×3). Finally, the product was obtained after dried in a vacuum, yielding 85% (1.088 g).

The synthesized i-TEMPOD-7 was reduced by phenyl hydrazine for $^1$H NMR test. $^1$H NMR (400 MHZ, D$_2$O-d$_6$): δ 7.84 (s, 1H), 7.40 (s, 2H), 5.05 (s, 2H), 4.99 (s, 4H), 1.86-1.95 (t, 4H), 1.53-1.60 (t, 4H), 1.08 (d, 24H).

Scheme 16. Synthesis of i-TEMPOD-8.

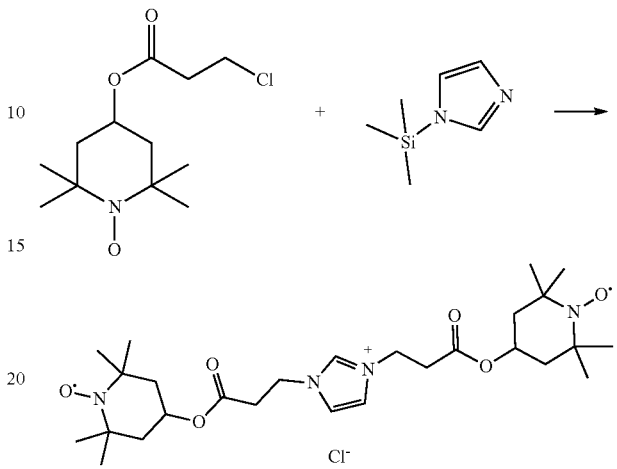

i-TEMPOD-8 was prepared as follows: 1.1 g (4.186 mmol, ~2 equiv.) 4-(2-chloroacetate) TEMPO and 0.280 g of 1-(trimethylsilyl)-1H-imidazole (2.00 mmol, 1 equiv.) were dissolved in 50 mL anhydrous acetone and sealed in a 250 mL thick-walled pressure bottle under N$_2$ protection. Then the mixture was stirred at 40° C. for 24 h. The precipitation was collected by filtration and washed with acetone (10 mL×3). Finally, the product was obtained after dried in vacuum, yield 90% (1.197 g).

The synthesized i-TEMPOD-8 was reduced by phenyl hydrazine for $^1$H NMR test. $^1$H NMR (400 MHZ, D$_2$O-d$_6$): δ 8.41 (d, 2H), 7.42 (s, 1H), 4.98 (s, 2H), 4.33 (d, 4H), 2.87 (s, 4H), 1.87 (d, 4H), 1.51 (d, 4H), 1.11 (s, 24H).

Scheme 17. Synthesis of i-TEMPOD-9.

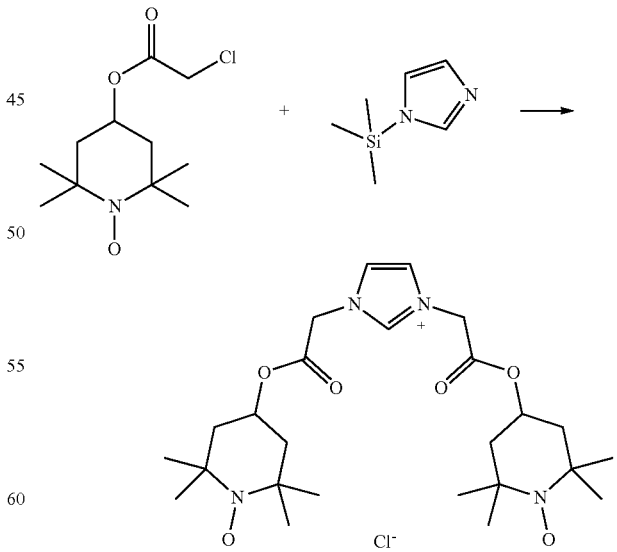

i-TEMPOD-9 was prepared as follows: 1.0 g 4-(2,2,6,6-tetramethyl-1-oxyl-4-piperidoxyl) ethoxy chloride (4.27 mmol, ~2 equiv.) and 0.282 g of 1-(trimethylsilyl)-1H-imidazole (2.0 mmol, 1 equiv.) were dissolved in 50 mL anhydrous acetone and sealed in a 250 mL thick-walled pressure bottle under $N_2$ protection. Then the mixture was stirred at 40° C. for 24 h. The precipitation was collected by filtration and washed with acetone (10 mL*3). Finally, the product was obtained after dried in a vacuum, yield 82% (1.0 g).

The synthesized i-TEMPOD-9 was reduced by phenyl hydrazine for $^1$H NMR test. $^1$H NMR (400 MHZ, $D_2O-d_6$): δ 8.45 (s, 1H), 7.47 (s, 1H), 7.32 (s, 1H), 4.92-5.13 (m, 4H), 4.65-4.68 (t, 6H), 1.99 (d, 4H), 1.34-1.65 (m, 8H), 1.15 (d, 24H).

Di-Cationic (Divalent) TEMPO Dimers:

Scheme 18. Synthesis of i-TEMPOD-10.

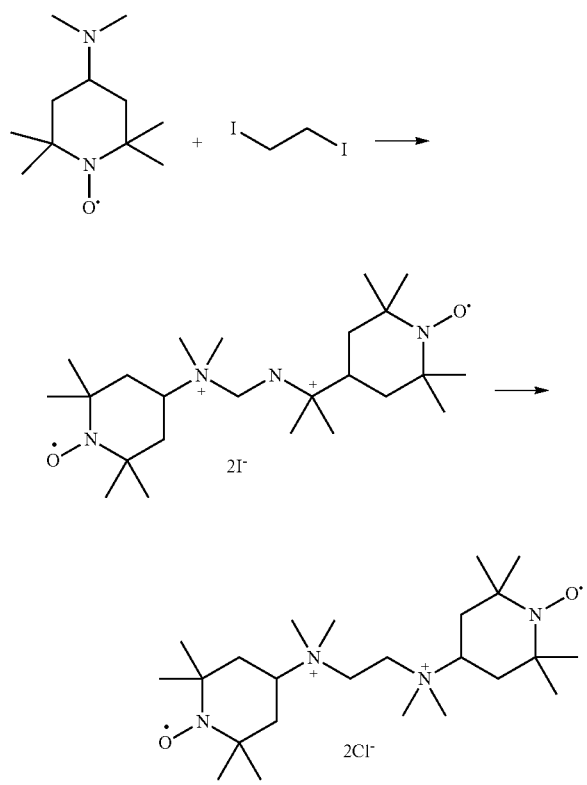

i-TEMPOD-10 was prepared as follows: 4-Dimethylamine TEMPO (1.99 g, 10 mmol, 2.0 equiv.) and 1.41 g (5.0 mmol, 1 equiv.) of 1,2-diiodoethane were mixed and dissolved in 100 mL acetone. The mixture was placed in a thick-walled pressure bottle and stirred at 60° C. for 36 h under $N_2$ protection. Upon completion, the system was cooling down to room temperature, the precipitate was then obtained through filtration and washed with acetone (20 mL×3). The product was dried at 40° C. under vacuum overnight and the yield is 88%. (2.99 g). After drying, the powder was dissolved in 20.0 mL of deionized water and flushed through an anion exchange column with an Amberlite IRA-900 chloride form anion exchange resin. The solvent was removed, and the resulting orange solid is 2.84 g (yield: 95%).

The synthesized i-TEMPOD-10 was reduced by phenyl hydrazine for $^1$H NMR test. $^1$H NMR (400 MHZ, $D_2O-d_6$): δ 3.85-3.89 (t, 2H), 3.64 (s, 4H), 2.97 (d, 12H), 2.02-2.05 (t, 4H), 1.64-1.70 (t, 4H), 1.13 (d, 24H).

Scheme 19. Synthesis of i-TEMPOD-11 (N+N+TEMPOD).

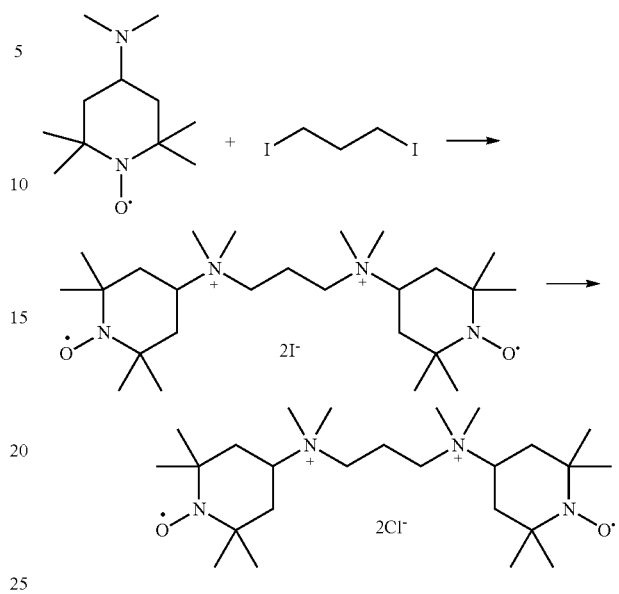

i-TEMPOD-11 was prepared as follows: 4-Dimethylamine TEMPO (1.99 g, 10 mmol, 2.0 equiv.) and 1.48 g (5.0 mmol, 1 equiv.) of 1,2-diiodoethane were mixed and dissolved in 100 mL acetone. The mixture was placed in a thick-walled pressure bottle and stirred at 60° C. for 36 h under $N_2$ protection. Upon completion, the system was cooling down to room temperature, the precipitate was then obtained through filtration and washed with acetone (20 mL×3). The product was dried at 40° C. under vacuum overnight and the yield is 90%. (3.12 g). After drying, the powder was dissolved in 20.0 mL of deionized water and flushed through an anion exchange column with an Amberlite IRA-900 chloride form anion exchange resin. The solvent was removed, and the resulting orange solid is 2.18 g (yield: 95%).

The synthesized i-TEMPOD-11 was reduced by phenyl hydrazine for $^1$H NMR test. $^1$H NMR (400 MHZ, $D_2O-d_6$): δ 3.65-3.71 (t, 2H), 3.29-3.34 (t, 4H), 3.00 (s, 12H), 2.20 (s, 2H), 2.08 (d, 4H), 1.67-1.73 (t, 4H), 1.15 (d, 24H).

Scheme 20. Synthesis of i-TEMPOD-12.

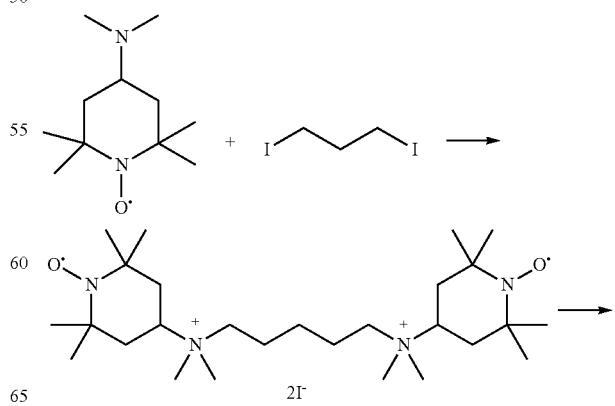

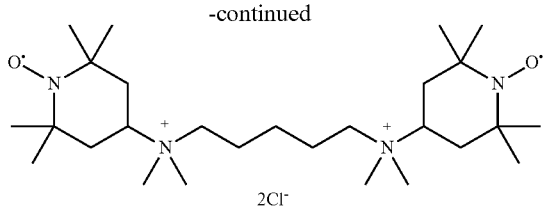

i-TEMPOD-12 was prepared as follows: 4-Dimethylamine TEMPO (1.99 g, 10 mmol, 2.0 equiv.) and 1.62 g (5.0 mmol, 1 equiv.) of 1,5-diiodopentane were mixed and dissolved in 100 mL acetone. The mixture was placed in a thick-walled pressure bottle and stirred at 60° C. for 36 h under $N_2$ protection. Upon completion, the system was cooling down to room temperature, the precipitate was then obtained through filtration and washed with acetone (20 mL×3). The product was dried at 40° C. under vacuum overnight and the yield is 89% (3.21 g). After drying, the powder was dissolved in 20.0 mL of deionized water and flushed through an anion exchange column with an Amberlite IRA-900 chloride form anion exchange resin. The solvent was removed, and the resulting orange solid is 3.05 g (yield: 95%).

The synthesized i-TEMPOD-12 was reduced by phenyl hydrazine for $^1$H NMR test. $^1$H NMR (400 MHZ, $D_2O$-$d_6$): δ 3.55-3.62 (t, 2H), 3.23-3.27 (t, 4H), 2.92-2.94 (d, 12H), 2.04 (d, 4H), 1.65-1.76 (m, 8H), 1.30-1.33 (m, 2H), 3.65-3.71 (t, 2H), 3.29-3.34 (t, 4H), 3.00 (s, 12H), 2.20 (s, 2H), 2.08 (d, 4H), 1.67-1.73 (t, 4H), 1.13 (d, 24H).

The system was stirred at 70° C. for 12 h. Then ester ether (50 mL) was added and stirred for 20 min. Finally, the precipitate was obtained through filtration and washed with ester ether (20 mL×3). The product was dried at 40° C. under vacuum overnight and the yield is 92%. (2.32 g).

The synthesized i-TEMPOD-13 was reduced by phenyl hydrazine for $^1$H NMR test. $^1$H NMR (400 MHZ, $D_2O$-$d_6$): δ 7.61 (s, 4H), 4.48 (s, 4H), 3.51-3.58 (t, 2H), 2.92 (s, 12H), 2.21 (d, 4H), 1.75-1.82 (t, 4H), 1.12 (d, 24H).

Scheme 22. Synthesis of i-TEMPOD-14.

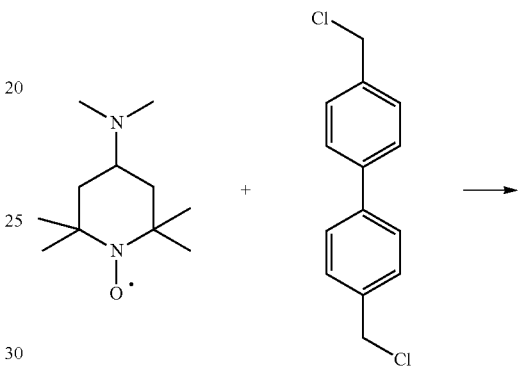

Scheme 21. Synthesis of i-TEMPOD-13

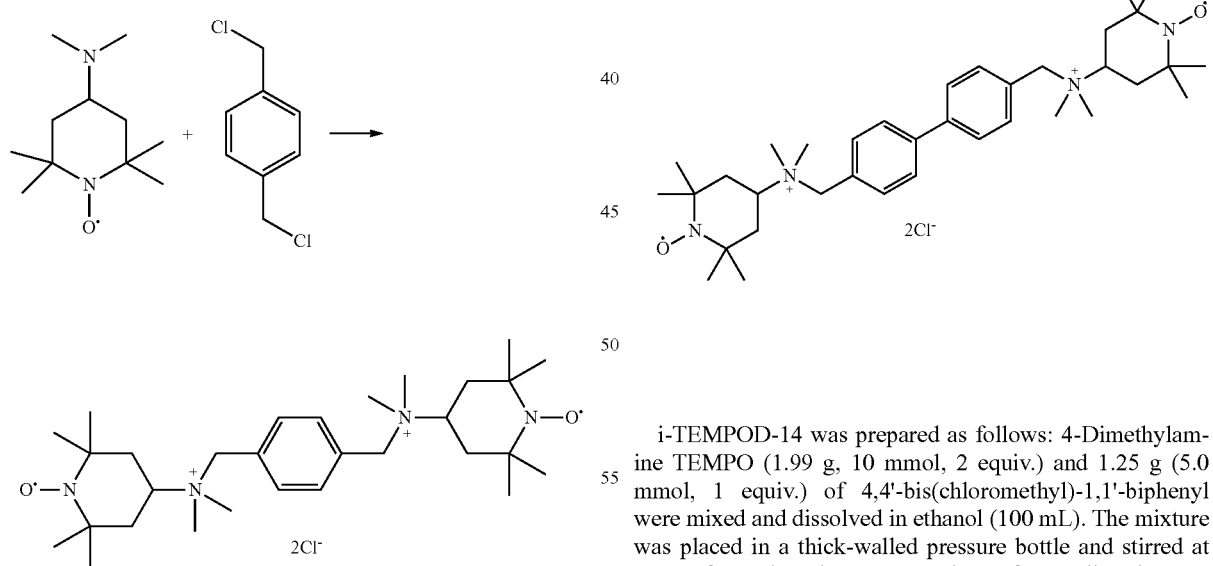

i-TEMPOD-13 was prepared as follows: 4-Dimethylamine TEMPO (1.99 g, 10 mmol, 2 equiv.) and 0.878 g (5.0 mmol, 1 equiv.) of 1,4-bis(chloromethyl)benzene were mixed and dissolved in acetone (100 mL). The mixture was placed in a thick-walled pressure bottle under $N_2$ protection.

i-TEMPOD-14 was prepared as follows: 4-Dimethylamine TEMPO (1.99 g, 10 mmol, 2 equiv.) and 1.25 g (5.0 mmol, 1 equiv.) of 4,4'-bis(chloromethyl)-1,1'-biphenyl were mixed and dissolved in ethanol (100 mL). The mixture was placed in a thick-walled pressure bottle and stirred at 80° C. for 12 h under $N_2$ protection. After cooling down to room temperature, the precipitate was obtained through filtration and washed with acetone (20 mL×3). The product was dried at 40° C. under vacuum overnight and the yield is 85%. (2.46 g).

The synthesized i-TEMPOD-14 was reduced by phenyl hydrazine for $^1$H NMR test. $^1$H NMR (400 MHZ, $D_2O$-$d_6$): δ 7.70 (d, 4H), 7.48 (d, 4H), 4.24 (s, 4H), 3.36-3.42 (t, 2H), 2.73 (s, 12H), 2.01 (d, 4H), 1.65-1.72 (t, 4H), 1.12 (d, 24H).

Scheme 23. Synthesis of i-TEMPOD-15.

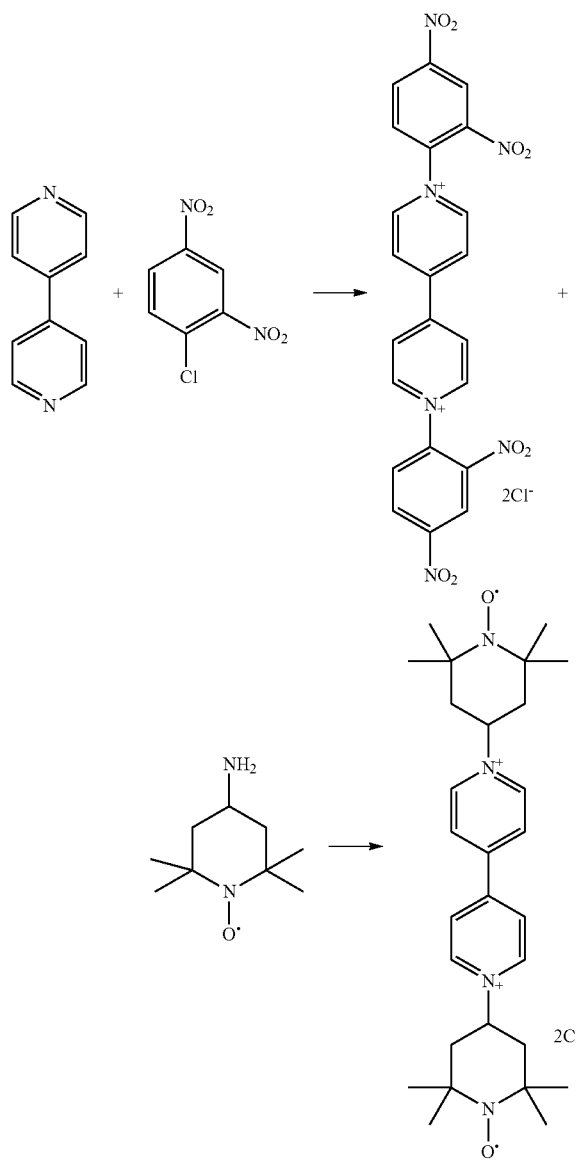

i-TEMPOD-15 was prepared as follows:

Step 1: The Zincke salt 4,4'-bipyridinium-1,1'bis-(2,4-dinitrophenyl) dichloride was synthesized according to the literature. (Do Pim, W. D.; Mendonça, F. G.; Brunet, G.; Facey, G. A.; Chevallier, F.; Bucher, C.; Baker, R. T.; Murugesu, M. Anion-Dependent Catalytic C—C Bond Cleavage of a Lignin Model within a Cationic Metal-Organic Framework. *ACS Appl. Mater. Interfaces* 2021, 13 (1), 688-695.)

Step 2: 0.56 g (1 mmol, 1 equiv.) 4,4'-bipyridinium-1,1'bis-(2,4-dinitrophenyl) dichloride and 0.43 g (2.5 mmol, 2.5 equiv.) 4-amino TEMPO were dissolved in 50 mL ethanol. The reaction was stirred at 80° C. for 48 h under $N_2$ protection. Upon completion, the solvent was removed by rotary evaporator and the resulting slurry was redissolved in DI water (100 mL). The aqueous solution was washed with ethyl ester (50 mL×3) and the resulting Vi-TEMPO was obtained by removing the water.

The synthesized i-TEMPOD-15 was reduced by phenyl hydrazine for $^1$H NMR test. $^1$H NMR (400 MHZ, $D_2O-d_6$): δ 9.04 (d, 4H), 8.37 (d, 4H), 5.03 (s, 2H), 2.17 (d, 4H), 2.05-2.11 (t, 4H), 1.22 (d, 24H).

Scheme 24. Synthesis of i-TEMPOD-16.

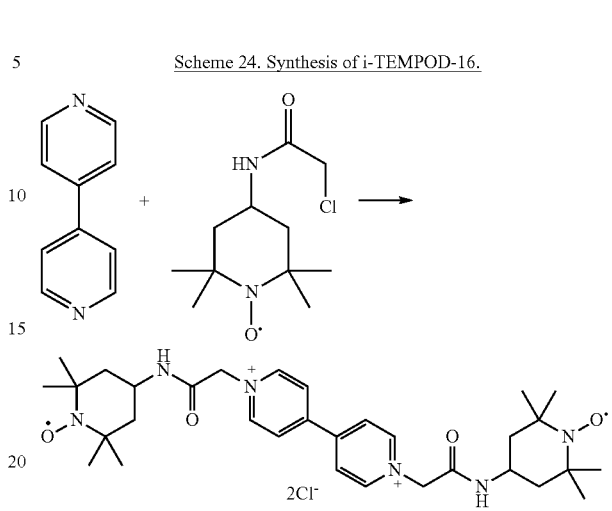

i-TEMPOD-16 was prepared as follows: 4-(2-chloroamide) TEMPO (1.67 g, 6.72 mmol, 1.1 equiv.) and 4,4'-bipyridine (0.5 g, 3.2 mmol, 1 equiv.) were dissolved in 100 mL ethanol. The reaction system was sealed in a thick-walled pressure bottle under $N_2$ protection and stirred at 70° C. for 24 h. Upon completion, the precipitate was obtained through filtration and washed with acetone (20 mL×3). The product was dried at 40° C. under vacuum overnight and the yield is 82%. (1.06 g).

The synthesized i-TEMPOD-16 was reduced by phenyl hydrazine for $^1$H NMR test. $^1$H NMR (400 MHZ, $D_2O-d_6$): δ 8.82 (s, 2H), 8.60 (s, 2H), 8.34 (s, 2H), 8.12 (s, 2H), 5.26 (s, 2H), 4.08 (s, 4H), 1.85 (d, 4H), 1.44-1.50 (t, 4H), 1.10 (s, 24H).

Scheme 25. Synthesis of i-TEMPOD-17.

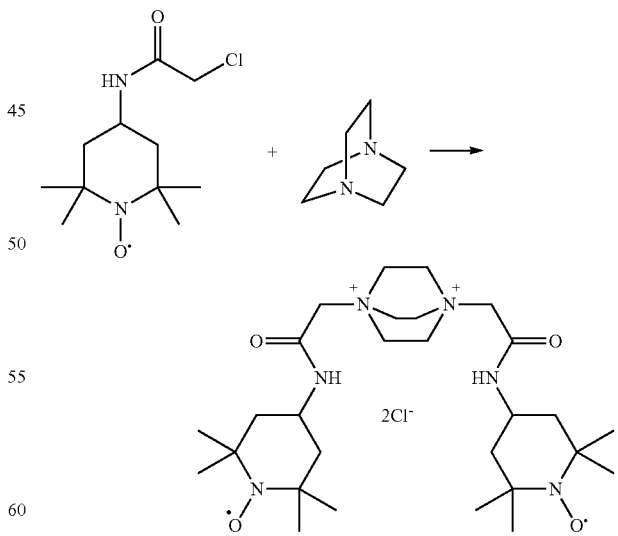

i-TEMPOD-17 was prepared as follows: 1.0 g (4.05 mmol, 2 equiv.) of 4-(2-chloroacetate) TEMPO and 0.225 g of 1,4-Diazabicyclo[2.2.2]octane (2.0 mmol, ~1 equiv.) were mixed together, 30 mL acetone was added. The mixture was sealed in a 100 mL thick-walled pressure bottle under N₂ protection and stirred at 50° C. for 12 h. After the reaction completed, ether ester (30 mL) was introduced. The precipitate was collected by filtration and washed with ether ester (30 mL×3). The product was dried in a vacuum at 40° C. overnight and the yield is 85% (1.9 g).

The synthesized i-TEMPOD-17 was reduced by phenylhydrazine for $^1$H NMR test. $^1$H NMR (400 MHZ, D$_2$O-d$_6$): δ 6.71-6.76 (t, 2H), 4.06-4.16 (m, 16H), 1.81-1.88 (m, 4H), 1.38-1.45 (t, 4H), 1.12 (d, 24H).

Scheme 26. Synthesis of i-TEMPOD-19.

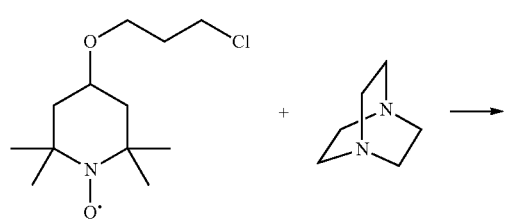

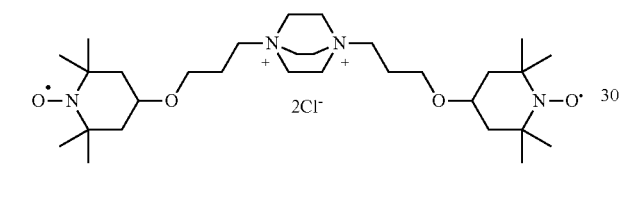

i-TEMPOD-19 was prepared as follows: 1.0 g (4.03 mmol, 2 equiv.) of 4-(2,2,6,6-tetramethyl-1-oxyl-4-piperidoxyl) propyl chloride and 0.225 g of 1,4-Diazabicyclo[2.2.2]octane (2.0 mmol, ~1 equiv.) were mixed together, 50 mL ethanol was added. The mixture was sealed in a 100 mL thick-walled pressure bottle under N₂ protection and stirred at 90° C. for 96 h. After the reaction was completed, the solvent was removed by a rotary evaporator. The resulting mixture was dissolved in DI water and washed with ether ester (50 mL×10). The product was dried in a vacuum at 40° C. overnight and the weight is 1.22 g (yield: 65%).

The synthesized i-TEMPOD-19 was reduced by phenylhydrazine for $^1$H NMR test. $^1$H NMR (400 MHZ, D$_2$O-d$_6$): δ 3.66-3.72 (t, 2H), 3.47-3.50 (t, 4H), 3.15-3.21 (m, 16H), 1.96 (d, 4H), 1.81-1.87 (m, 4H), 1.30-1.36 (t, 4H), 1.10 (d, 24H).

Scheme 27. Synthesis of i-TEMPOD-20.

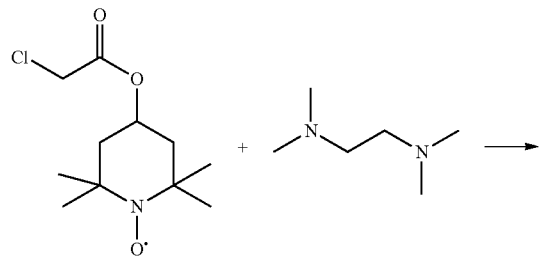

-continued

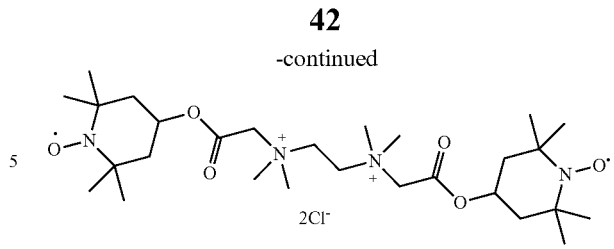

i-TEMPOD-20 was prepared as follows: 1.0 g (4.03 mmol, 2 equiv.) of 4-(2-chloroacetate) TEMPO and 0.232 g of tetramethylethylenediamine (2.0 mmol, ~1 equiv.) were mixed together, 50 mL ethanol was added. The mixture was sealed in a 100 mL thick-walled pressure bottle under N₂ protection and stirred at 70° C. for 24 h. After the reaction was completed, the solvent was removed by a rotary evaporator. The resulting mixture was dissolved in DI water and washed with ether ester (50 mL×10). The product was dried in a vacuum at 40° C. overnight and the weight is 0.98 g (yield: 80%).

The i-TEMPOD-20 was reduced by phenylhydrazine for $^1$H NMR test. $^1$H NMR (400 MHZ, D$_2$O-d$_6$): δ 3.96-4.04 (m, 2H), 3.71-3.75 (m, 4H), 3.11 (s, 12H), 2.98-3.02 (m, 4H), 1.89-1.94 (q, 4H), 1.41-1.48 (t, 4H), 1.14 (d, 24H).

Scheme 28. Synthesis of i-TEMPOD-21.

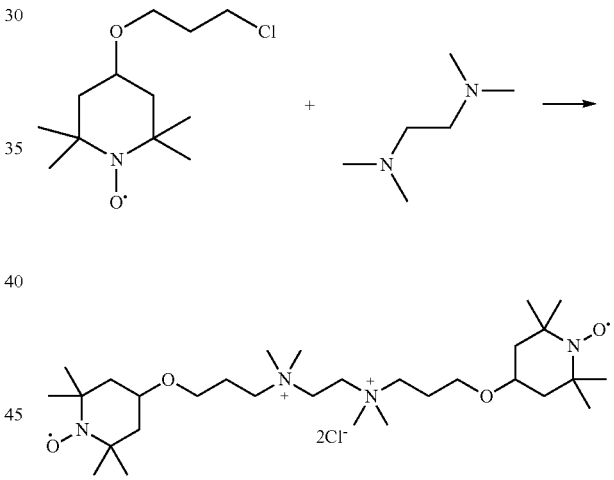

i-TEMPOD-21 was prepared as follows: 1.0 g (4.03 mmol, 2 equiv.) of 4-(2,2,6,6-tetramethyl-1-oxyl-4-piperidoxyl) propyl chloride and 0.232 g of tetramethylethylenediamine (2.0 mmol, ~1 equiv.) were mixed together, 50 mL ethanol was added. The mixture was sealed in a 100 mL thick-walled pressure bottle under N₂ protection and stirred at 90° C. for 96 h. After the reaction was completed, the solvent was removed by a rotary evaporator. The resulting mixture was dissolved in DI water and washed with ether ester (50 mL×10). The product was dried in a vacuum at 40° C. overnight and the weight is 1.04 g (yield: 85%).

The synthesized i-TEMPOD-21 was reduced by phenylhydrazine for $^1$H NMR test. $^1$H NMR (400 MHZ, D$_2$O-d$_6$): δ 4.03 (d, 2H), 3.89 (s, 4H), 3.57 (s, 4H), 3.45 (s, 4H), 3.15 (s, 12H), 1.95-2.05 (m, 8H), 1.36 (d, 4H), 1.14 (d, 24H).

Scheme 29. Alternate synthetic route of i-TEMPOD-1 (N+TEMPO).

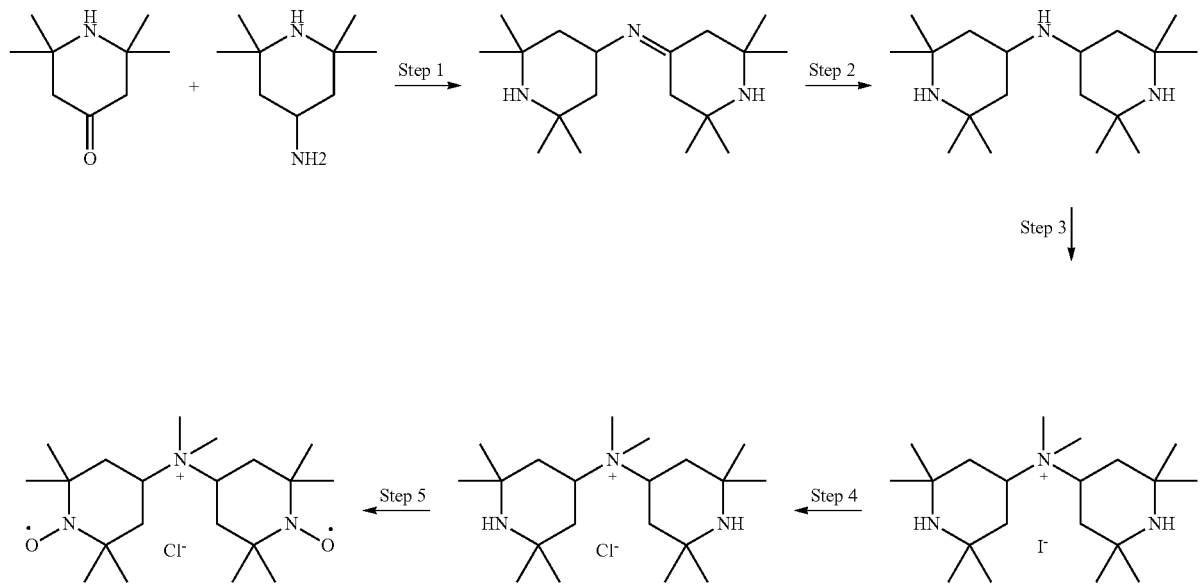

i-TEMPOD-1 (N+TEMPO) was alternately prepared as follows:

Step 1: A solution of 2,2,6,6-tetramethylpiperidinyl-4-one (155 g, 1 mol) and 2,2,6,6-tetramethylpiperidinyl-4-amine (156 g, 1 mmol) in 1 L of ether was allowed to stand over 4 Å molecular sieves at 40° C. for 12 h. Filtration and removal of solvent followed by distillation afforded N,N-bis(2,2,6,6-tetramethylpiperidine)imine (280.0 g, 90%) as a white solid. $^1$H NMR (400 MHZ, D$_2$O-d$_6$): δ 3.79-3.84 (t, 1H), 2.18 (s, 2H), 2.02 (s, 2H), 1.35 (d, 2H), 1.18 (d, 2H), 1.02-1.14 (m, 24H).

Step 2: The Schiff's base obtained was dissolved in dry MeOH (200 mL) and NaBH$_4$ (38 g, 1 mol) was added to this. Progress of the reaction was monitored by TLC. After 3 h the solvent was removed and product was extracted with CH$_2$Cl$_2$ (3×20 mL). The organic phase was dried using anhydrous sodium sulfate and removed to obtain the reduce compounds N,N-bis(2,2,6,6-tetramethylpiperidine)amine. Yield 95% (252.2 g). $^1$H NMR (400 MHZ, D$_2$O-d$_6$): δ 2.95-3.01 (t, 1H), 1.63-1.67 (q, 4H), 1.05 (d, 24H), 0.72-0.78 (t, 4H).

Step 3 and 4: 5.0 g (16.9 mmol, 1 equiv.) bis(2,2,6,6-tetramethylpiperidin-4-yl)amine was dissolved in 60 mL methanol, NaHCO$_3$ (1.42 g, 16.9 mmol, 1 equiv.) and CH$_3$I (3.17 mL, 50.7 mmol, 2.0 equiv.) was added subsequently. The mixture was sealed in a 250 mL thick-walled pressure bottle and the reaction was flux for 24 h. Upon completion, the solvent was removed by a rotary evaporator. The light-yellow solid was fully dissolved in 100 ml of water, the aqueous phase was washed with EtOAc (100 mL×3). The aqueous phase was combined and evaporated. After drying, the powder was dissolved in 20.0 mL of deionized water and flushed through an anion exchange column with an Amberlite IRA-900 chloride form anion exchange resin. The solvent was removed, and the resulting orange solid is 6.2 g (yield: 95%). $^1$H NMR (400 MHZ, D$_2$O-d$_6$): δ 3.76-3.82 (t, 2H), 2.93 (d, 6H), 2.05 (d, 4H), 1.71-1.77 (t, 4H), 1.23 (s, 12H), 1.15 (s, 12H).

Step 5: The above TEMPO chloride salt (3.60 g, 10 mmol) was dissolved in 50 mL of water and the pH of solution was tune to 12 by slowly adding sodium hydroxide aqueous solution (2 M). Then sodium tungstate (65 mg), Na$_2$EDTA (5.6 mg), and 2.3 mL hydrogen peroxide were added successively. The solution was stirred for 3 days at room temperature. Then another 1.2 mL hydrogen peroxide was added and stirred for another 3 days. Upon completion, the water was removed and the solid was dissolved in 10 mL methanol. Acetone was added slowly until the complete generation of white precipitate, which was the mixture of sodium tungstate and Na$_2$EDTA. After filtration, 50 mL acetone was added into the filtrate again to obtain the product as an orange precipitate. After filtration, the product was dried in the vacuum oven at 60° C. overnight and was obtained in a yield of 3.7 g (95%). The synthesized i-TEMPOD-1 was reduced by phenyl hydrazine for $^1$H NMR test. $^1$H NMR (400 MHZ, D$_2$O-d$_6$): δ 3.66-3.72 (t, 2H), 2.82 (s, 6H), 2.00 (d, 4H), 1.70-1.76 (t, 4H), 1.14 (d, 24H).

Scheme 30. Synthesis route of Dex-Viologen.

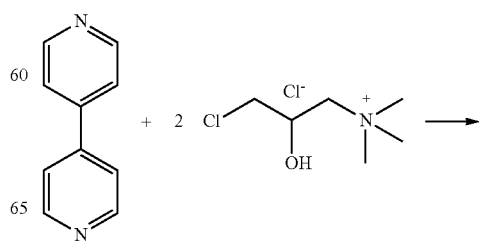

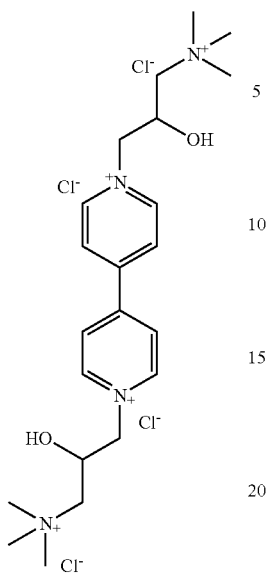

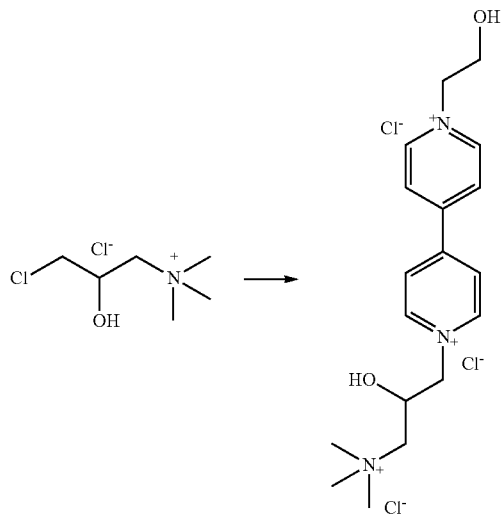

Dex-Viologen was prepared as follows:

4,4-dipyridyl and 3-chloro-2-hydroxypropyl trimethylammonium chloride (aka. dextrosil) were obtained from Oakridge Chemical and Tokyo Chemical Industry Co., respectively, and used without further purification. Firstly, 12 g (0.077 mol) of 4,4-dipyridyl was added to 60 mL (0.22 mol) of 3-chloro-2-hydroxypropyl trimethylammonium chloride (65 wt % in water) in an autoclave reactor. The solution was then transferred to a stainless-steel autoclave with PTFE liner (100 mL) and heated to 120° C. for 24 hr. After the reaction, ethanol and then acetone were added to the resultant aqueous solution in sequential order in a 1:9:10 (product:ethanol:acetone) volume ratio to precipitate out the pure product. The off-white product was filtered, washed with acetone, and vacuum dried. A high overall yield of 71% (33 g) was obtained. Dex-Vi: $^1$H NMR (D$_2$O δ 4.80, 400 MHz): δ 3.30 (s, 9H), 3.71 (quint, 4H), 4.69 (q, 2H), 4.86 (q, 2H), 5.03 (d, 2H). The structure was confirmed by $^1$H NMR.

Dex-EtOH-Viologen was prepared as follows:

Step 1: A mixture of 2-chloroethanol (8 g, 0.1 mol) and 4,4'-bipyridine (15.6 g, 0.1 mol) in toluene (10 mL) was stirred at 110° C. for 48 h. The resulting precipitate 1-(2-hydroxyethyl)-[4,4'-bipyridin]-1-ium chloride salt was filtered and dried under vacuum (14.16 g, 60%). $^1$H NMR (400 MHZ, D$_2$O-d$_6$): δ 8.88 (d, 2H), 8.58 (d, 2H), 8.28 (d, 2H), 7.74 (d, 2H), 4.72 (s, 1H), 4.69 (s, 1H), 4.03-4.07 (t, 2H). The structure was confirmed by $^1$H NMR.

Step 2: 1-(2-hydroxyethyl)-[4,4'-bipyridin]-1-ium chloride salt (12.3 g, 0.05 mol, 1 equiv.) and 3-Chloro-2-hydroxy-N,N,N-trimethylpropan-1-aminium chloride (17.4 g, 65% in water, 0.06 mol, 1.2 equiv.) were mixed together and sealed in thick-walled pressure bottle. The reaction system was stirred at 120° C. for 24 h under N$_2$ protection. Upon completion, the reaction system was cool down to room temperature, 50 mL DI water was added and washed with ethyl acetate (50 mL×3). The water was removed by a rotary evaporator. Then the product was dried in vacuum at 60° C. and yield 92% (20.0 g). $^1$H NMR (400 MHZ, D$_2$O-d$_6$): δ 9.08-9.12 (m, 4H), 8.54-8.59 (m, 4H), 4.96 (d, 1H), 4.75-4.81 (m, 2H), 4.58-4.65 (m, 1H), 4.06-4.09 (m, 1H), 3.57-3.70 (m, 4H), 3.24 (s, 9H). The structure was confirmed by $^1$H NMR.

Scheme 31. Synthesis route of Dex-EtOH-Viologen.

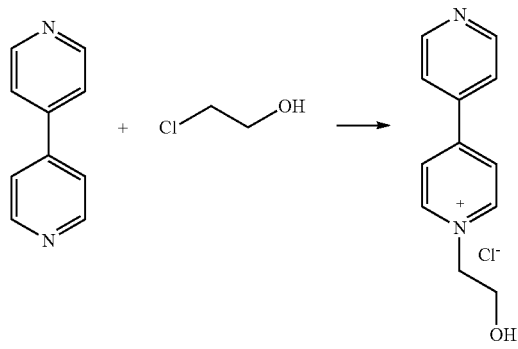

Scheme 32. Alternate one-pot hydrothermal synthesis route of Dex-EtOH-Viologen.

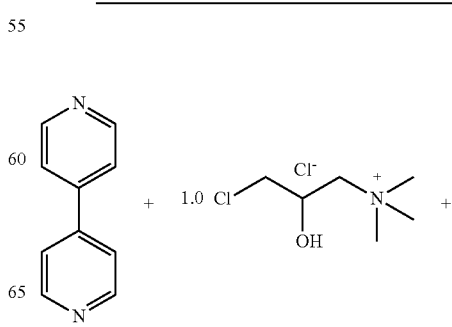

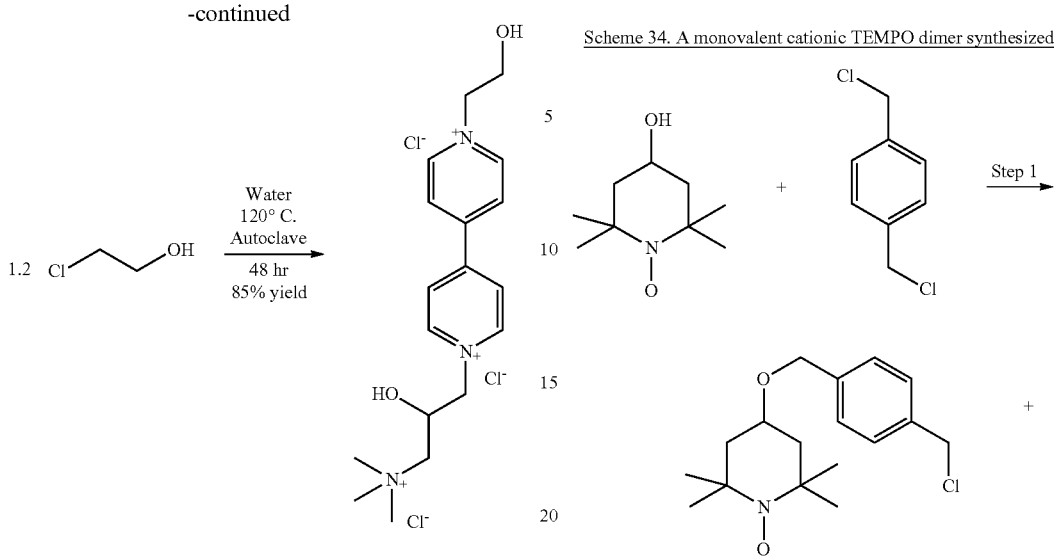

Mono-Cationic (Monovalent) TEMPO Dimers:

Scheme 33. A monovalent cationic TEMPO dimer synthesized as follows:

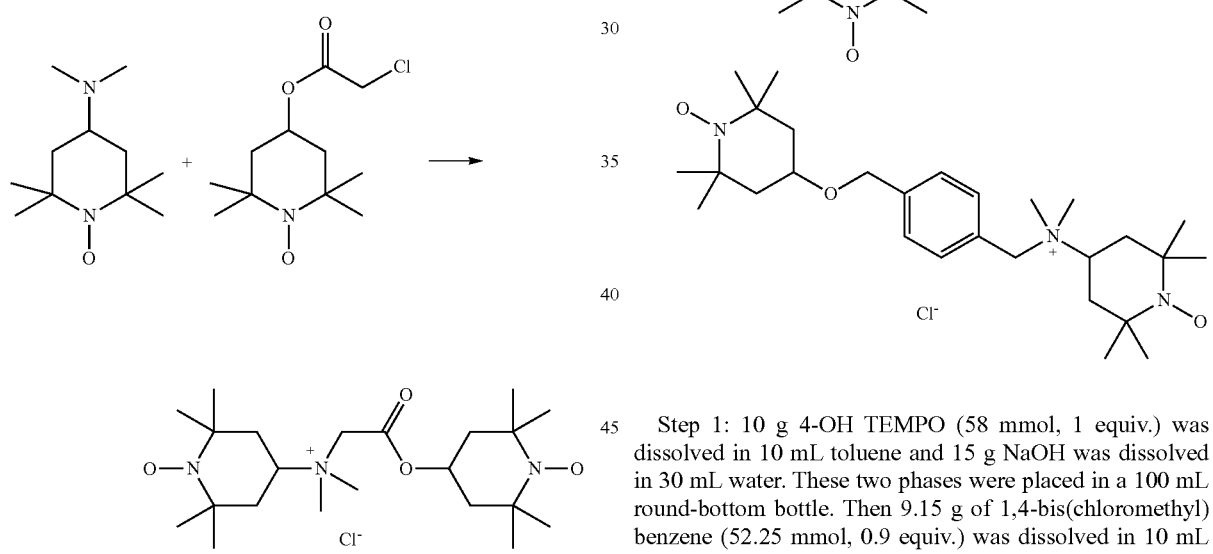

4-dimethylamino TEMPO (1.99 g, 10 mmol, 1 equiv.) and 4-(2-chloroacetate) TEMPO (2.73 g, 11 mmol, 1.1 equiv.) were mixed, and the mixture was sealed in a thick-walled pressure bottle under $N_2$ protection. The system was stirred at 40° C. for 12 h under $N_2$ protection. Ester ether (50 mL) was added and stirred for 20 min. Finally, the precipitate was obtained through filtration and washed with ester ether (20 mL×3). The product was dried at 40° C. under vacuum overnight and the yield was 85% (3.8 g). The synthesized TEMPO product was reduced by phenyl hydrazine for $^1$H NMR test. $^1$H NMR (400 MHZ, $D_2O$-$d_6$): δ 5.14 (s, 1H), 4.02-4.09 (t, 1H), 2.98-3.06 (d, 8H), 1.96 (d, 4H), 1.56-1.69 (m, 4H), 1.07-1.14 (t, 24H).

Scheme 34. A monovalent cationic TEMPO dimer synthesized as follows

Step 1: 10 g 4-OH TEMPO (58 mmol, 1 equiv.) was dissolved in 10 mL toluene and 15 g NaOH was dissolved in 30 mL water. These two phases were placed in a 100 mL round-bottom bottle. Then 9.15 g of 1,4-bis(chloromethyl) benzene (52.25 mmol, 0.9 equiv.) was dissolved in 10 mL toluene and then added dropwise to the mixture. The reaction was stirred at room temperature for 24 h. Upon completion, ether ester (150 mL) was added. The two phases were separated in a separatory funnel and the organic phase was washed with deionized water (200 mL×3). Dried with anhydrous $Na_2SO_4$ and the organic solvent was evaporated, giving a viscous red solid. The residue was finally purified by flash column chromatography on silica gel (EtOAc: hexane=1:10) to afford the desired product as a red powder.

Step 2: 1.00 g of 4-(4-(chloromethyl)benzyl)oxy)-TEMPO (3.22 mmol, 1.1 equiv.) and 0.583 g 4-dimethylamino TEMPO (2.92 mmol, 1 equiv.) were dissolved in 10 mL acetone. The reaction was sealed in a thick-walled pressure bottle, stirred at 40° C. for 48 h. Upon completion, ether ester was added, and the resulting precipitate was collected by filtration, washed with ether ester and dried in vacuum overnight. Yield: 90%. (1.34 g)

Tempo Trimer Synthesis

Scheme 35. A trivalent cationic TEMPO dimer synthesized as follows:

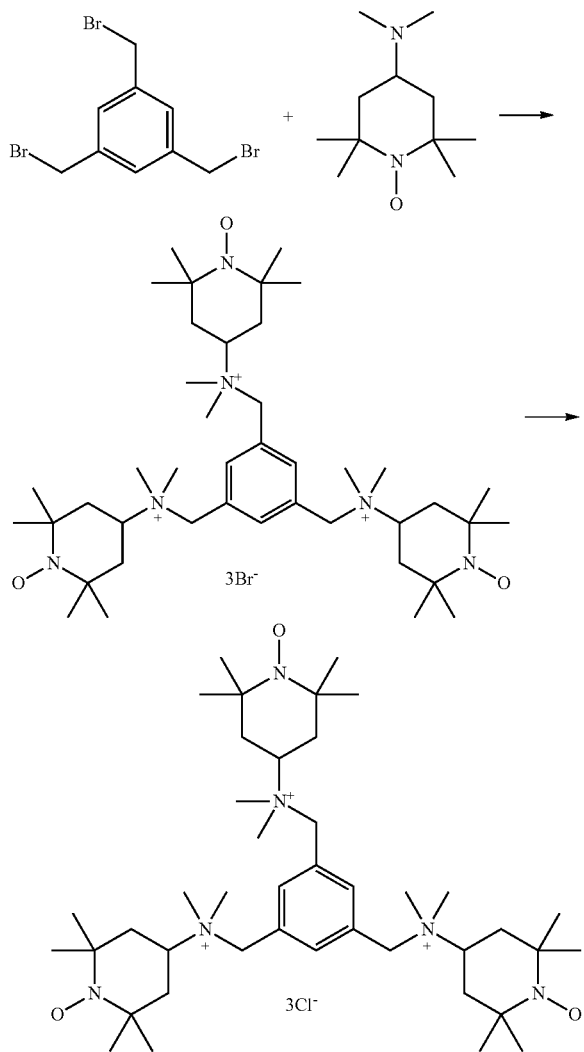

1 g of 1,3,5-tris(bromomethyl)benzene (2.8 mmol, 1 equiv.) and 1.95 g of 4-dimethylamino TEMPO (9.81 mmol, 3.5 equiv.) were dissolved in 30 mL acetone and the reaction was stirred at 40° C. for 24 h. Upon completion, ester ether (100 mL) was added and the resulting precipitate was collected by filtration and washed with ester ether (20×3). The orange powder was dried in vacuum at 40° C. for 12 h. After drying, the powder was dissolved in 20.0 mL of deionized water and flushed through an anion exchange column with an Amberlite IRA-900 chloride form anion exchange resin. Yield was 73% (1.44 g).

Example 2: Electrochemical Characterization of Ionic TEMPO Dimer Synthesis

The 21 i-TEMPODs synthesized in Example 1 were electrochemically characterized. Four representative TEMPO dimers, two mono-cation and two di-cation, were selected based on redox potential, feasible capacity, chemical/electrochemical stability, and synthetic ease for further in-depth evaluation.

To delineate structure-property relationships for rationalized TEMPO dimer molecular engineering, the formal potential (E°) of each i-TEMPOD was measured using Cyclic Voltammetry (CV). All 21 exhibited highly positive E° values ranging from +0.804 V to +0.981 V vs. SHE that are close to the OER potential limit of neutral pH aqueous electrolyte (Table 1). These results show a clear relationship between E° and the electronic properties of the 4-position functionalization for TEMPO derivatives. As the electron withdrawing strength of the functionalization increased, more energy was required to remove an electron from the TEMPO core, leading to a higher E°. Accordingly, the E° of the TEMPO dimer and thus the output voltage of the RFB can be tuned based on the 4-position functionalization as follows: ether <amide≈ester <$sp^2$ ammonium <$sp^3$ ammonium. Meanwhile, linker identity away from the 4-position of TEMPO core had minimal effect on E°.

TABLE 1

Summary of i-TEMPOD formal potentials determined from CV. Note asymmetric i-TEMPODs have two separate redox events denoted by (#).

| i-TEMPOD-# | $E_{1/2}$ vs. SHE |
|---|---|
| 1 | 0.962 |
| 2(1) | 0.846 |
| 2(2) | 0.976 |
| 3(1) | 0.854 |
| 3(2) | 0.960 |
| 4(1) | 0.840 |
| 4(2) | 0.948 |
| 5 | 0.903 |
| 6 | 0.839 |
| 7 | 0.841 |
| 8 | 0.845 |
| 9 | 0.833 |
| 10 | 0.981 |
| 11 | 0.941 |
| 12 | 0.950 |
| 13 | 0.965 |
| 14 | 0.942 |
| 15 | 0.931 |
| 16 | 0.845 |
| 17 | 0.855 |
| 18 | 0.873 |
| 19 | 0.804 |
| 20 | 0.845 |
| 21 | 0.804 |

The mono-cation dimers (N+TEMPOD and Eth-N+TEMPOD) and the two di-cation dimers (N+N+TEMPOD and Eth-DABCO-TEMPOD) were further characterized. These four i-TEMPODs each demonstrated facile diffusion and electron transfer kinetics in CV and Electrochemical Impedance Spectroscopy (EIS) study (Table 2). A negative correlation was found between electron transfer rate constant ($k^0$) and molecular size for these dimers, but no trend was found with 4-position functionalization.

TABLE 2

PEIS Z-fitting data based on ideal Randle equivalent circuit. Note asymmetric i-TEMPODs have two separate redox events denoted by (#).

| i-TEMPOD | Ru (Ohm) | Rct (Ohm) | W1 (σ) | C1 (uF) |
|---|---|---|---|---|
| N + TEMPOD | 27.54 | 17.43 | 246 | 264.7 |
| Eth-N + TEMPOD (1) | 36.62 | 36.23 | 444 | 303.6 |
| Eth-N + TEMPOD (2) | 36.71 | 28.12 | 425 | 373 |
| N + N + TEMPOD | 21.37 | 56.05 | 211 | 239.7 |

TABLE 2-continued

PEIS Z-fitting data based on ideal Randle equivalent circuit. Note asymmetric i-TEMPODs have two separate redox events denoted by (#).

| i-TEMPOD | Ru (Ohm) | Rct (Ohm) | W1 (σ) | C1 (uF) |
|---|---|---|---|---|
| Eth-DABCO-TEMPOD | 23.19 | 163.5 | 246 | 220.7 |

The i-TEMPODs have extremely high water solubility and can form a water-in-catholyte state when saturated. For non-phenyl ring containing TEMPO dimers, their solubility in pure water ranged from 1.7 M to 2.5 M, corresponding in 3.4 M to 5 M redox active electron concentrations. Each of these saturated dimer solutions measured on average a 1.25 g·mL$^{-1}$ density, resulting in a range of 1 to 20 estimated water molecules per TEMPO dimer (Table 3). This heightened theoretical maximum capacity of dimers ultimately results from increasing the size of the TEMPO core at the 4-position with redox active mass (i.e., other TEMPO cores) without significantly increasing electron averaged mass (M/n). These are in contrast with extended TEMPO monomer strategies that inflate the mass with redox inert functionalization. The resultant high intramolecular coordination environment between water and i-TEMPODs not only delivers maximized theoretical solubility but also extends the voltage window of water, which is especially relevant for catholytes with highly positive formal potential, such as TEMPO. OER is deterred with the WiC strategy as there are limited water molecules in solution and the intramolecular force between the redox molecule salt and the solvating water molecules must be broken, creating kinetic barriers to the oxidation of water at the positive electrode. These WiC phenomena contribute to the concurrently high capacity and high stability RFB cycling of i-TEMPODs.

TABLE 3

Experimental solubilities and densities of select i-TEMPODs to determine number of coordinated water.

| i-TEMPOD-# | Water Solubility (M) | Density (g/mL) | # Coordinated H$_2$O per TEMPOD |
|---|---|---|---|
| 1 | 2.1 | 1.23 | 11 |
| 2 | 2.1 | 1.27 | 9 |
| 3 | 2 | 1.26 | 10 |
| 4 | 2.5 | 1.25 | 3 |
| 9 | 2 | 1.28 | 6 |
| 11 | 1.5 | 1.21 | 20 |
| 17 | 1.8 | 1.22 | 4 |
| 18 | 1.7 | 1.24 | 13 |
| 19 | 2 | 1.25 | 1 |

When determining the maximum cycling concentration with the water-miscible i-TEMPODs, the active molecule solubility no longer limits volumetric capacity as the interaction between the dissolved species and the water molecules are very thermodynamically favorable, and each TEMPO dimer is able to dissolve with a minimal amount of coordinated water. Instead, the cycling concentration will be limited by the electrolyte viscosity and its relation to pumping energy cost. The viscosity of representative TEMPO monomer and dimer solutions was experimentally measured at various volumetric capacities in their reduced (uncharged) states. FIG. 35A compares the viscosity of the i-TEMPODs to previously known TEMPO monomers, which are designated "OH", "Nine", and "TMAP". Descriptions of these monomers can be found in: T. Liu, X. Wei, Z. Nie, V. Sprenkle, W. Wang, A Total Organic Aqueous Redox Flow Battery Employing a Low Cost and Sustainable Methyl Viologen Anolyte and 4-HO-TEMPO Catholyte. *Adv. Energy Mater.* 6 (2016); T. Janoschka, N. Martin, M. D. Hager, U. S. Schubert, An Aqueous Redox-Flow Battery with High Capacity and Power. The TEMPTMA/MV System. *Angew. Chemie—Int. Ed.* 55, 14427-14430 (2016); and Y. Liu, M. A. Goulet, L. Tong, Y. Liu, Y. Ji, L. Wu, R. G. Gordon, M. J. Aziz, Z. Yang, T. Xu, A Long-Lifetime All-Organic Aqueous Flow Battery Utilizing TMAP-TEMPO Radical. *Chem.* 5, 1861-1870 (2019).

In general, when comparing TEMPO dimers, viscosity increases with molecular weight and the number of positive charges, as these two factors both increase intramolecular interactions. These data provide valuable insight into designing water-miscible TEMPO dimers with optimized energy density. The smallest dimer, N+TEMPOD, had nearly equal viscosity at a given volumetric capacity to the state-of-the-art extended monomer, TMAP-TEMPO. It is also worth noting that for all TEMPO species, viscosity is expected to increase upon oxidation (charging) because of the additional positive charge in the oxoammonium form.

The permeability of N+TEMPOD, Eth-N+TEMPOD, N+N+TEMPOD, and Eth-DABLO-TEMPOD through a low ionic-conductivity (AMVN) anion-exchanged membrane was measured, and even the smallest N+TEMPOD displayed compatibility and no detectible crossover with the AMVN membrane. Crossover of the TEMPO species is critical to RFB lifetime as it lowers the catholyte capacity through material loss and the anolyte capacity through chemical/electrochemical side reactions. Additionally, when cycled with the AMVN membrane, none of the four TEMPO dimers demonstrated observable decay. Even at a high concentration of 2 M N+TEMPOD (4 M electron concentration), which corresponds to no capacity decay was shown after over 100 days of cycling.

For AORFBs with kinetically facile redox species, such as TEMPO, the device resistance and power capability are mainly limited by membrane resistance. For example, for the high concentration N+TEMPOD flow battery, the high-frequency resistance was 97% of the DC resistance at 50% state-of-charge (SOC). However, the TEMPO monomers—OH-TEMPO, N$^{me}$-TEMPO, and TMAP-TEMPO—all displayed high permeability through the high-power DSVN membrane (FIG. 35B and Table 4), and extended TEMPO monomer RFB cycling demonstrations have been with low-power, highly selective AMV/AMVN anion-exchange membranes in literature. In contrast, even the smallest TEMPO dimer, N+TEMPOD, showed minimal crossover with the lower resistance DSVN membrane, enabling high-power, high-energy efficiency RFB devices. To showcase this important but often overlooked metric for evaluating TEMPO performance, a systematic comparison of the RFB power and cycling performances with AMVN and DSVN membranes for the TEMPO monomers and dimers was conducted. The high frequency area specific resistance of DSVN flow cells was 42% that of AMVN at 50% SOC. As a result, the DSVN high concentration N+TEMPOD flow battery displayed an energy efficiency of 87% at 60 mA-cm$^2$ while AMVN exhibited an energy efficiency of 68% at identical conditions. This is unprecedented for pH neutral AORFBs. High-concentration N+TEMPOD cycling demonstrated remarkable capacity retention in RFB cycling with DSVN after 24 days of continuous cycling. This confirms high cycling stability, high power, and high volumetric capacity can be simultaneously obtained with the i-TEMPOD WiC design.

TABLE 4

Permeabilities of TEMPO species through DSVN and AMVN anion-exchange membranes.

|  | TEMPO | DSVN (cm² · s) | AMVN (cm² · s) |
|---|---|---|---|
| Monomers | OH | 6.1E−10 | 1.4E−10 |
|  | Nme | 2.3E−10 | NA |
|  | TMAP | 9.2E−11 | 1.9E−11 |
| i-TEMPODs | N+ | 2.5E−11 | Below 1E−13 |
|  | N+ N+ | 1.4E−11 | Below 1E−13 |
|  | Eth-N+ | 2.1E−11 | Below 1E−13 |
|  | Eth-DABCO | 3.1E−11 | Below 1E−13 |

This overall ideal catholyte performance—voltage, volumetric capacity, and stability—is unprecedented in AORFB systems.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean "one or more" or can mean "only one". Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An ionic cyclic nitroxyl radical oligomer having one of the following structures:

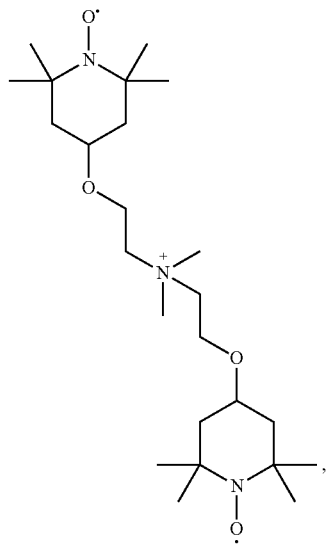

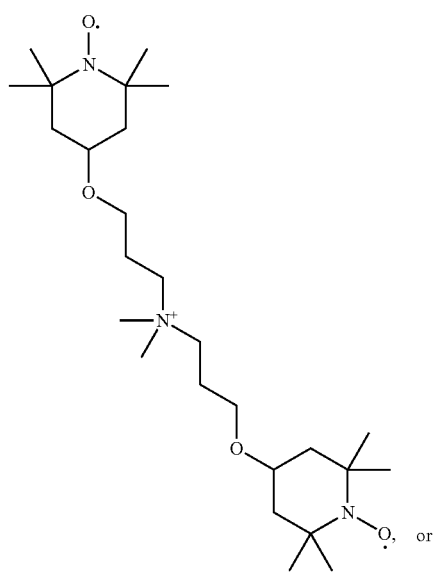

-continued

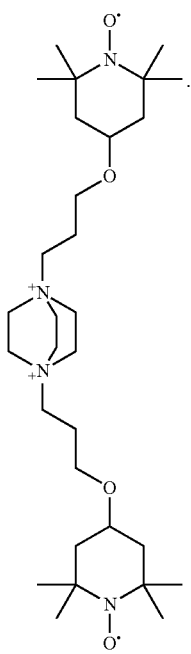

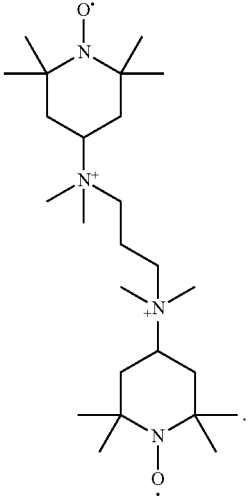

4. An ionic cyclic nitroxyl radical oligomer having one of the following structures:

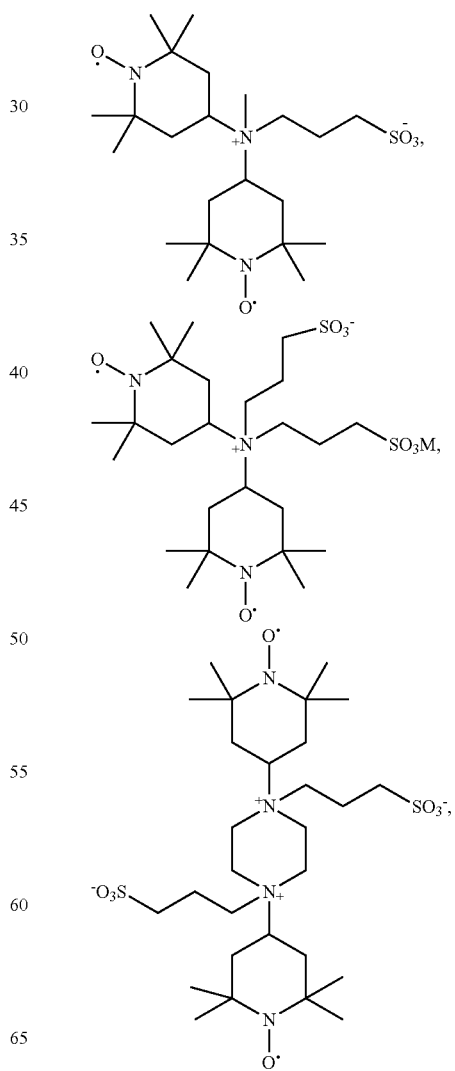

2. An electrochemical cell comprising:

an anode;

optionally, an anolyte in contact with the anode;

a cathode; and a catholyte in contact with the cathode, the catholyte comprising an ionic cyclic nitroxyl radical oligomer of claim 1.

3. An electrochemical cell comprising:

an anode;

optionally, an anolyte in contact with the anode;

a cathode; and a catholyte in contact with the cathode, the catholyte comprising an ionic cyclic nitroxyl radical oligomer, wherein the ionic cyclic nitroxyl radical has one of the following structures:

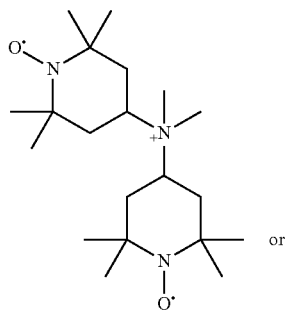

or

-continued
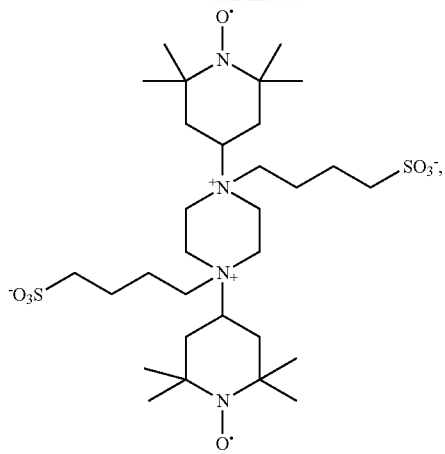
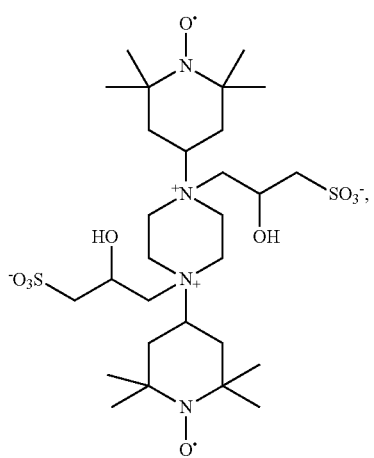
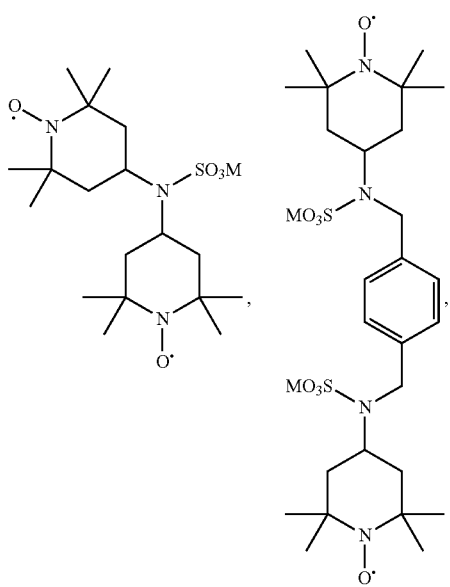
-continued
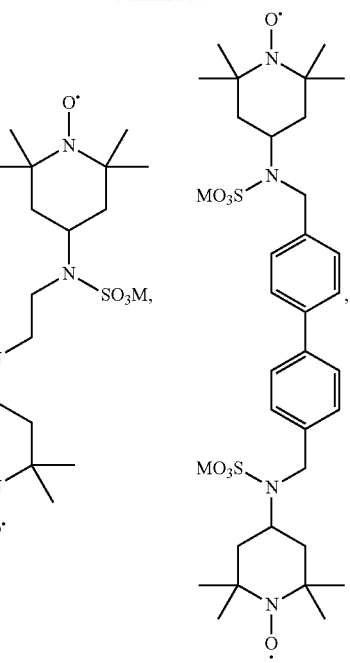
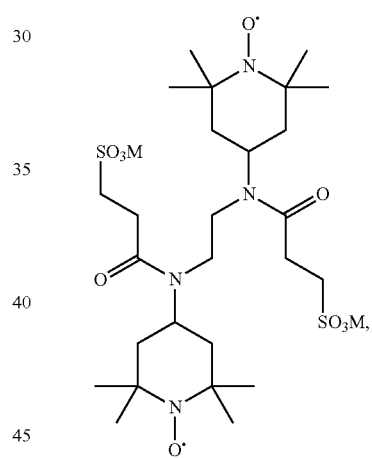
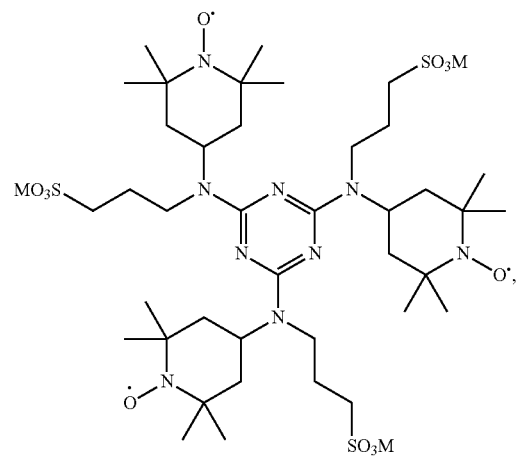

-continued

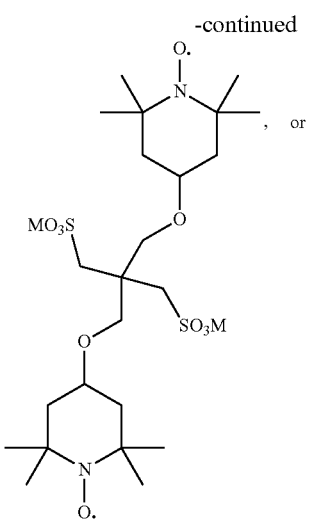, or

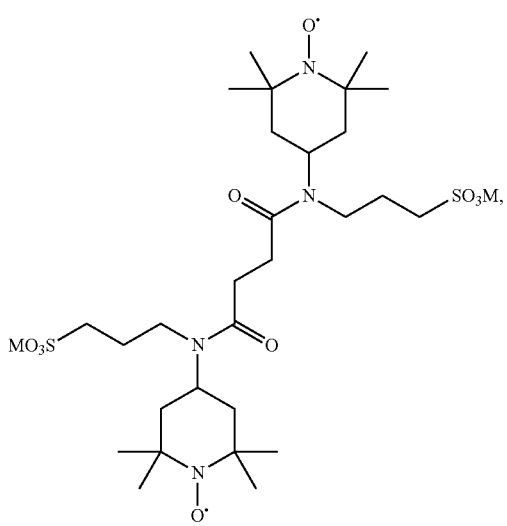

5. An electrochemical cell comprising:
an anode;
optionally, an anolyte in contact with the anode;
a cathode; and
a catholyte in contact with the cathode, the catholyte comprising an ionic cyclic nitroxyl radical oligomer of claim 4.

6. The ionic cyclic nitroxyl radical oligomer of claim 1 having the following structure:

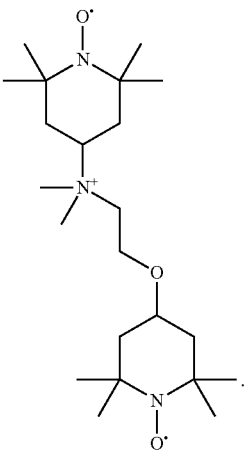

7. The ionic cyclic nitroxyl radical oligomer of claim 1 having the following structure:

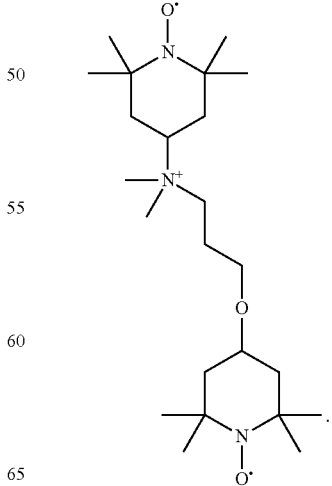

8. The ionic cyclic nitroxyl radical oligomer of claim 1 having the following structure:

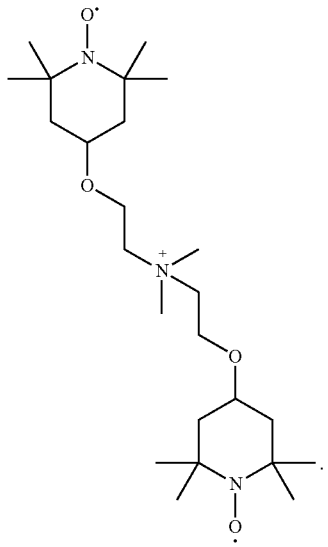

9. The ionic cyclic nitroxyl radical oligomer of claim 1 having the following structure:

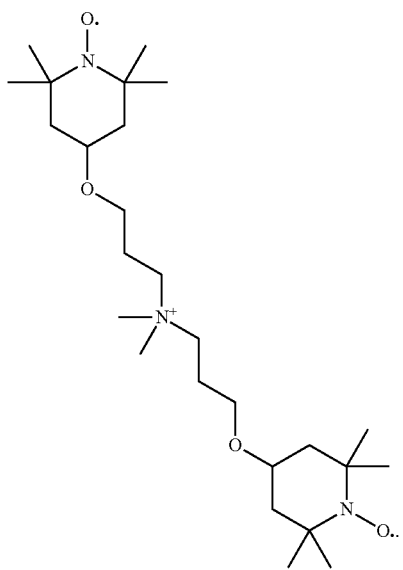

10. The ionic cyclic nitroxyl radical oligomer of claim 1 having the following structure:

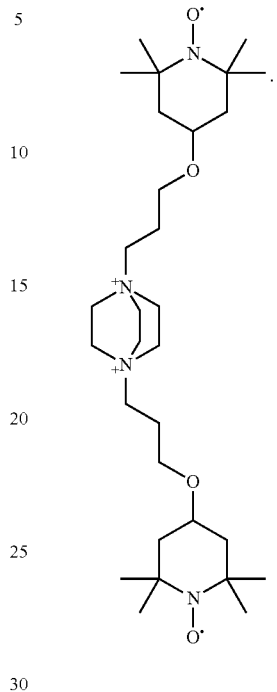

11. An ionic cyclic nitroxyl radical oligomer of claim 4 having the following structure:

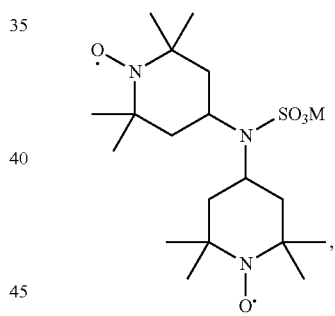

wherein M is a counterion.

12. An ionic cyclic nitroxyl radical oligomer of claim 4 having the following structure:

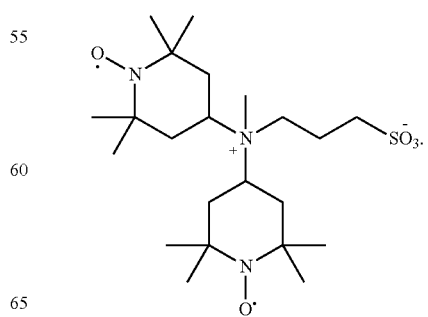

13. An ionic cyclic nitroxyl radical oligomer of claim 4 having the following structure:

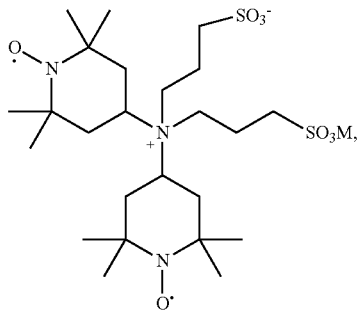

wherein M is a counterion.

14. An ionic cyclic nitroxyl radical oligomer of claim 4 having the following structure:

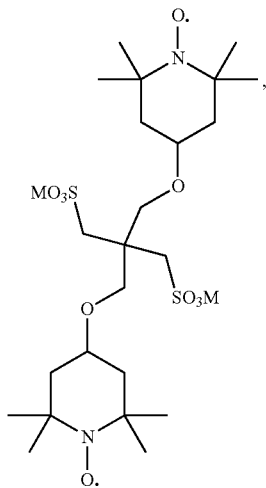

wherein M is a counterion.

15. An ionic cyclic nitroxyl radical oligomer of claim 4 having one of the following structures:

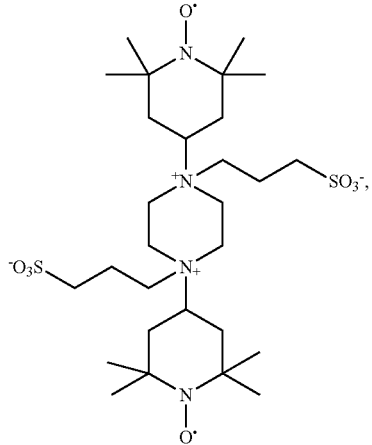

-continued

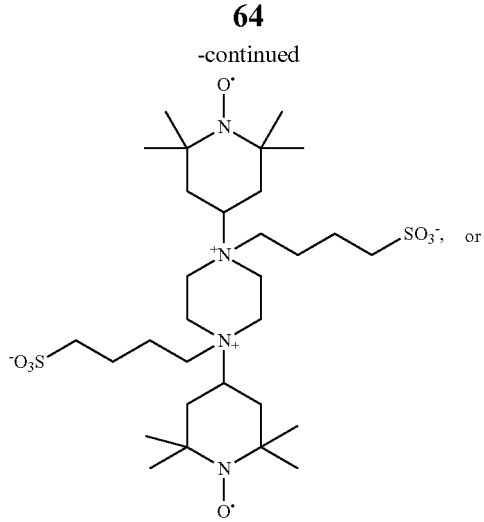

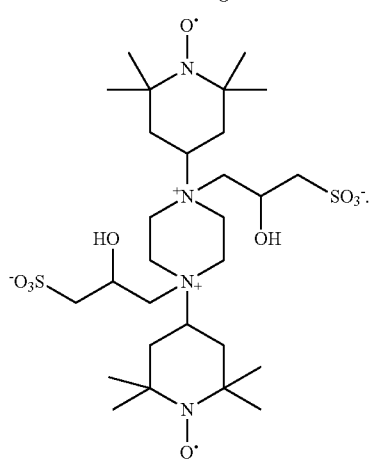

16. An ionic cyclic nitroxyl radical oligomer of claim 4 having one of the following structures:

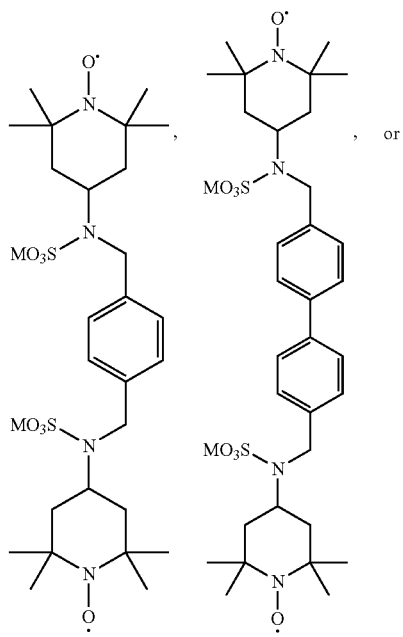

-continued

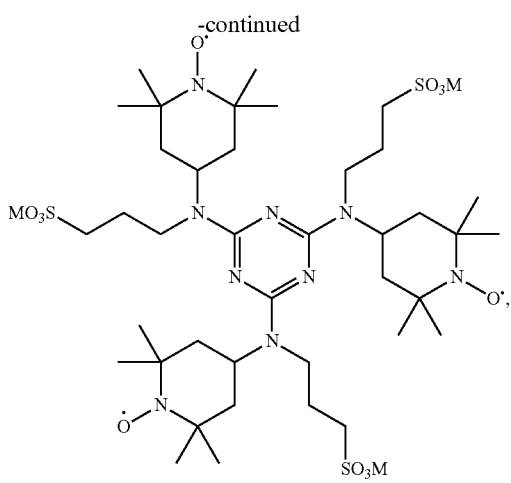

wherein M is a counterion.

17. An ionic cyclic nitroxyl radical oligomer of claim 4 having the following structure:

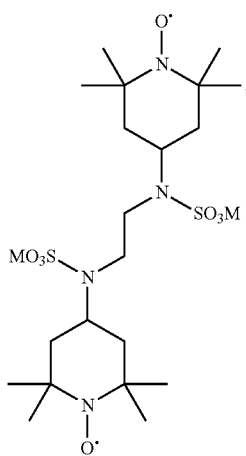

wherein M is a counterion.

18. An ionic cyclic nitroxyl radical oligomer of claim 4 having one of the following structures:

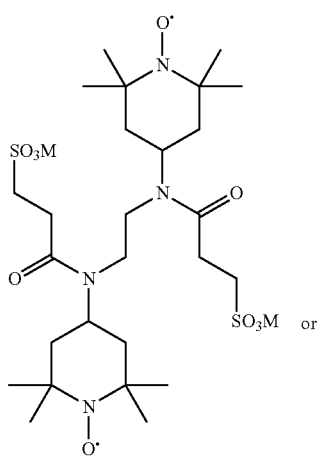

-continued

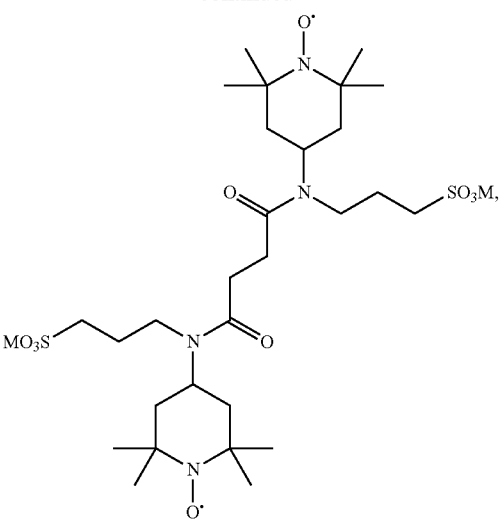

wherein M is a counterion.

19. The electrochemical cell of claim 2, wherein the ionic cyclic nitroxyl radical oligomer has the following structure:

20. The electrochemical cell of claim 2, wherein the ionic cyclic nitroxyl radical oligomer has the following structure:

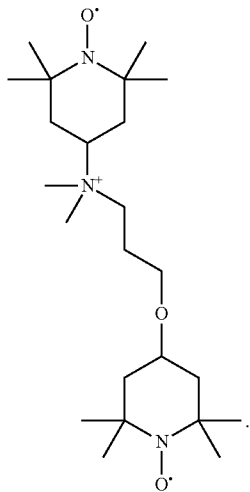

21. The electrochemical cell of claim 2, wherein the ionic cyclic nitroxyl radical oligomer has the following structure:

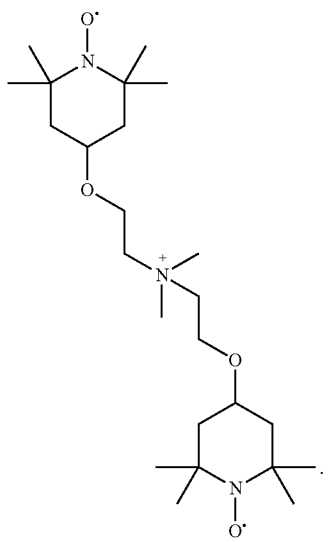

22. The electrochemical cell of claim 2, wherein the ionic cyclic nitroxyl radical oligomer has the following structure:

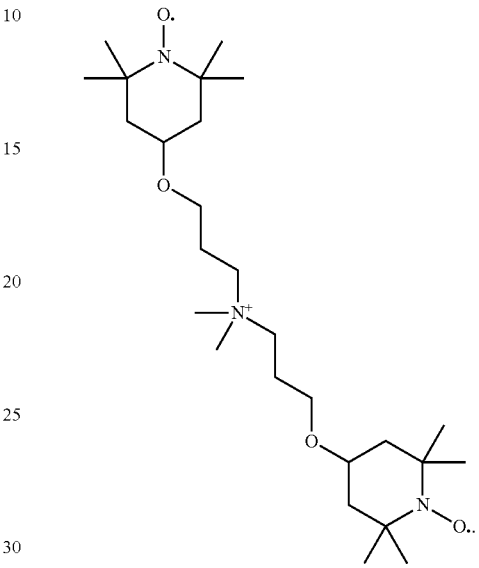

23. The electrochemical cell of claim 2, wherein the ionic cyclic nitroxyl radical oligomer has the following structure:

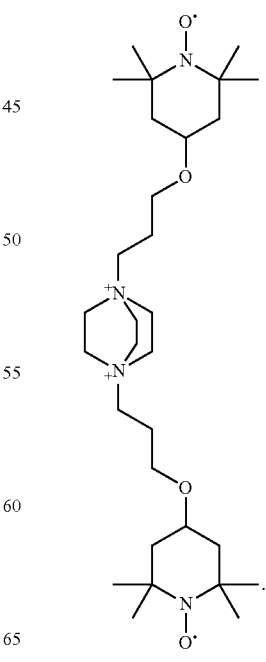

24. The electrochemical cell of claim 3, wherein the ionic cyclic nitroxyl radical oligomer has the following structure:
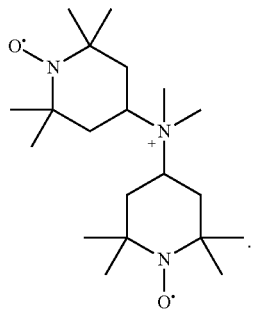
25. The electrochemical cell of claim 3, wherein the ionic cyclic nitroxyl radical oligomer has the following structure:
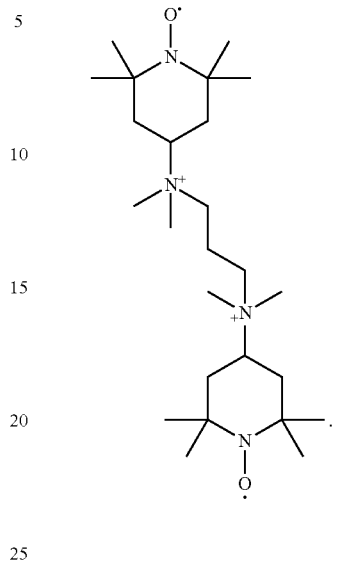
* * * * *